United States Patent
Smith et al.

(10) Patent No.: US 11,110,977 B2
(45) Date of Patent: Sep. 7, 2021

(54) OFF-ROAD VEHICLE

(71) Applicant: Oshkosh Corporation, Oshkosh, WI (US)

(72) Inventors: Chad K. Smith, Omro, WI (US);
Robert S. Messina, Oshkosh, WI (US);
Chris K. Yakes, Oshkosh, WI (US);
Mark J. Charniak, Neenah, WI (US);
Neil E. DeKarske, Oshkosh, WI (US);
Mike A. Koenigs, Oakfield, WI (US);
Michael S. Poetter, Neenah, WI (US);
Devon C. Palmer, Oshkosh, WI (US);
Jesse D. Gander, Larsen, WI (US);
Jason J. Zuleger, Appleton, WI (US);
Megan N. Schultz, Oshkosh, WI (US);
Troy D. Lind, Oshkosh, WI (US);
Michael R. Yanacek, Omro, WI (US);
Kevin L. Pennau, Oshkosh, WI (US);
Andrew L. Drach, Neenah, WI (US);
Steve Volkman, Oshkosh, WI (US);
Nathaniel J. Harter, Sobieski, WI (US); Justin N. Rittenhouse, Marshallville, OH (US); Peter K. Kramer, Oshkosh, WI (US); Annelise L. Kotenberg, Oshkosh, WI (US);
Christopher J. Rukas, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/224,309

(22) Filed: Dec. 18, 2018

(65) Prior Publication Data
US 2019/0185077 A1 Jun. 20, 2019

Related U.S. Application Data

(60) Provisional application No. 62/607,734, filed on Dec. 19, 2017, provisional application No. 62/607,764, (Continued)

(51) Int. Cl.
 *B62D 47/00* (2006.01)
 *B62D 21/18* (2006.01)
 (Continued)

(52) U.S. Cl.
 CPC ............ *B62D 47/003* (2013.01); *B60K 11/04* (2013.01); *B60K 11/08* (2013.01); *B60K 13/02* (2013.01);
 (Continued)

(58) Field of Classification Search
 CPC .... B62D 47/003; B62D 23/005; B62D 25/06; B62D 21/183; B62D 33/02; B60K 11/04;
 (Continued)

(56) References Cited

U.S. PATENT DOCUMENTS 5,171,121 A 12/1992 Smith et al.
6,105,984 A 8/2000 Schmitz et al.
(Continued)

FOREIGN PATENT DOCUMENTS

WO WO-2008/115461 9/2008

OTHER PUBLICATIONS

Anonymous: "Steyr Puch Pinzgauer 712 M 1,5 t, 6x6—Steyr Puch Pinzgauer 712 M Lieferw 1,5 t gl 6x6—Leichte Geladewagen—Radfahrzeuge militarfahrzeuge.ch", Jun. 6, 2017, 5 pps.
(Continued)

*Primary Examiner* — Jacob B Meyer
(74) *Attorney, Agent, or Firm* — Foley & Lardner LLP

(57) ABSTRACT

A vehicle includes a chassis, a suspension system coupled to the chassis, a front axle, a first rear axle, and a second rear
(Continued)

axle coupled to the chassis by the suspension system, and a powertrain coupled to the chassis and at least one of the front axle, the first rear axle, and the second rear axle. The powertrain is configured to drive the at least one of the front axle, the first rear axle, and the second rear axle. The chassis, the suspension system, the front axle, the first rear axle, and the second rear axle provide a payload capacity rating of at least 1,750 pounds. The vehicle has an overall width between 60 inches and 80 inches.

15 Claims, 35 Drawing Sheets

Related U.S. Application Data filed on Dec. 19, 2017, provisional application No. 62/607,653, filed on Dec. 19, 2017, provisional application No. 62/607,649, filed on Dec. 19, 2017, provisional application No. 62/607,727, filed on Dec. 19, 2017, provisional application No. 62/607,768, filed on Dec. 19, 2017, provisional application No. 62/607,759, filed on Dec. 19, 2017.

(51) Int. Cl.

| | |
|---|---|
| B60K 11/08 | (2006.01) |
| B60K 13/02 | (2006.01) |
| B60K 13/04 | (2006.01) |
| B60K 17/346 | (2006.01) |
| B60N 2/30 | (2006.01) |
| F02M 35/08 | (2006.01) |
| F01P 3/18 | (2006.01) |
| B60T 1/06 | (2006.01) |
| B60K 17/348 | (2006.01) |
| B62D 23/00 | (2006.01) |
| B62D 25/06 | (2006.01) |
| B60K 11/04 | (2006.01) |
| B60K 17/00 | (2006.01) |
| F16D 55/226 | (2006.01) |
| F02M 35/10 | (2006.01) |
| B62D 33/02 | (2006.01) |

(52) U.S. Cl.
CPC ............. *B60K 13/04* (2013.01); *B60K 17/00* (2013.01); *B60K 17/348* (2013.01); *B60K 17/3462* (2013.01); *B60N 2/30* (2013.01); *B60T 1/065* (2013.01); *B62D 21/183* (2013.01); *B62D 23/005* (2013.01); *B62D 25/06* (2013.01); *F01P 3/18* (2013.01); *F02M 35/082* (2013.01); *F02M 35/086* (2013.01); *B62D 33/02* (2013.01); *F02M 35/10236* (2013.01); *F16D 55/226* (2013.01)

(58) Field of Classification Search
CPC ........ B60K 17/00; B60K 11/08; B60K 13/02; B60K 13/04; B60K 17/3462; B60K 17/348; F02M 35/086; F02M 35/082; F02M 35/10236; B60N 2/30; F01P 3/18; B60T 1/065; F16D 55/226
See application file for complete search history.

(56) References Cited

U.S. PATENT DOCUMENTS

| | | | |
|---|---|---|---|
| 6,247,713 B1 | 6/2001 | Konop | |
| 6,478,317 B2 | 11/2002 | Konop | |
| 6,516,914 B1 | 2/2003 | Andersen et al. | |
| 6,520,494 B1 | 2/2003 | Andersen et al. | |
| 6,757,597 B2 | 6/2004 | Yakes et al. | |
| 6,779,806 B1 | 8/2004 | Breitbach et al. | |
| 6,885,920 B2 | 4/2005 | Yakes et al. | |
| 7,073,620 B2 | 7/2006 | Braun et al. | |
| 7,111,858 B2 | 9/2006 | Manser et al. | |
| 7,140,461 B2 | 11/2006 | Morrow | |
| 7,164,977 B2 | 1/2007 | Yakes et al. | |
| 7,198,130 B2 | 4/2007 | Schimke | |
| 7,226,080 B2 | 6/2007 | Humphries | |
| 7,234,534 B2 | 6/2007 | Froland et al. | |
| 7,258,194 B2 | 8/2007 | Braun et al. | |
| 7,270,346 B2 | 9/2007 | Rowe et al. | |
| 7,277,782 B2 | 10/2007 | Yakes et al. | |
| 7,302,320 B2 | 11/2007 | Nasr et al. | |
| 7,357,203 B2 | 4/2008 | Morrow et al. | |
| 7,379,797 B2 | 5/2008 | Nasr et al. | |
| 7,419,021 B2 | 9/2008 | Morrow et al. | |
| 7,445,075 B2 * | 11/2008 | Ozawa ................ | B62D 31/003 |
| | | | 180/291 |
| 7,448,460 B2 | 11/2008 | Morrow et al. | |
| 7,472,914 B2 | 1/2009 | Anderson et al. | |
| 7,520,354 B2 | 4/2009 | Morrow et al. | |
| 7,689,332 B2 | 3/2010 | Yakes et al. | |
| 7,711,460 B2 | 5/2010 | Yakes et al. | |
| 7,784,554 B2 | 8/2010 | Grady et al. | |
| 7,848,857 B2 | 12/2010 | Nasr et al. | |
| 7,878,750 B2 | 2/2011 | Zhou et al. | |
| 7,931,103 B2 | 4/2011 | Morrow et al. | |
| 8,000,850 B2 | 8/2011 | Nasr et al. | |
| 8,029,021 B2 * | 10/2011 | Leonard ............... | B62D 33/063 |
| | | | 280/785 |
| 8,139,109 B2 | 3/2012 | Schmiedel et al. | |
| 8,376,719 B2 | 2/2013 | Grady et al. | |
| 8,382,125 B2 * | 2/2013 | Sunsdahl ............... | B62K 25/00 |
| | | | 280/5.511 |
| 8,561,735 B2 | 10/2013 | Morrow et al. | |
| 8,596,648 B2 | 12/2013 | Venton-Walters et al. | |
| 8,739,892 B2 | 6/2014 | Moore et al. | |
| 8,746,719 B2 * | 6/2014 | Safranski .............. | B60G 3/20 |
| | | | 280/124.148 |
| 8,801,017 B2 | 8/2014 | Ellifson et al. | |
| 8,821,130 B2 | 9/2014 | Venton-Walters et al. | |
| 8,827,019 B2 * | 9/2014 | Deckard ............... | F16H 57/027 |
| | | | 180/68.1 |
| 8,947,531 B2 | 2/2015 | Fischer et al. | |
| 8,991,840 B2 | 3/2015 | Zuleger et al. | |
| 9,004,574 B1 | 4/2015 | Fisher | |
| 9,016,703 B2 | 4/2015 | Rowe et al. | |
| 9,045,014 B1 | 6/2015 | Verhoff et al. | |
| 9,174,686 B1 | 11/2015 | Messina et al. | |
| 9,291,230 B2 | 3/2016 | Ellifson et al. | |
| 9,327,150 B2 | 5/2016 | Moore et al. | |
| 9,328,986 B1 | 5/2016 | Pennau et al. | |
| 9,365,251 B2 * | 6/2016 | Safranski ............. | B60K 17/348 |
| 9,420,203 B2 | 8/2016 | Broggi et al. | |
| 9,492,695 B2 | 11/2016 | Betz et al. | |
| 9,499,033 B1 | 11/2016 | Nixon et al. | |
| 9,540,052 B2 * | 1/2017 | Burt, II ............... | B62D 33/0617 |
| 9,555,701 B2 * | 1/2017 | Borowicz .............. | B60K 17/28 |
| 9,579,969 B2 | 2/2017 | Crist et al. | |
| 9,581,153 B2 | 2/2017 | Venton-Walters et al. | |
| 9,656,640 B1 | 5/2017 | Verhoff et al. | |
| 9,669,679 B2 | 6/2017 | Zuleger et al. | |
| 9,694,671 B2 | 7/2017 | Wildgrube et al. | |
| 9,694,776 B2 | 7/2017 | Nelson et al. | |
| 9,707,869 B1 | 7/2017 | Messina et al. | |
| 9,731,594 B2 | 8/2017 | Wildgrube | |
| 9,764,613 B2 | 9/2017 | Rowe et al. | |
| 9,809,080 B2 | 11/2017 | Ellifson et al. | |
| 9,889,777 B2 * | 2/2018 | Proulx .................... | B60N 2/01 |
| 9,932,073 B2 * | 4/2018 | Dube ..................... | B60K 13/02 |
| 9,950,617 B2 * | 4/2018 | Jacobson ................ | B60N 2/04 |
| 9,969,259 B2 * | 5/2018 | Safranski ............. | B60K 17/348 |
| 10,011,189 B2 * | 7/2018 | Sunsdahl ................ | B60N 2/01 |
| 10,035,648 B2 | 7/2018 | Haddick et al. | |
| 10,081,290 B2 * | 9/2018 | Fohrenkamm ........... | B60P 3/42 |
| 10,099,622 B2 | 10/2018 | Handschke et al. | |
| 10,106,032 B2 | 10/2018 | Crist et al. | |
| D837,702 S | 1/2019 | Gander et al. | |

(56) References Cited

U.S. PATENT DOCUMENTS

| | | | |
|---|---|---|---|
| 10,207,555 B2* | 2/2019 | Mailhot | B60R 21/13 |
| D843,281 S | 3/2019 | Gander et al. | |
| 10,730,426 B2* | 8/2020 | Fohrenkamm | A01B 51/02 |
| 2002/0071336 A1 | 6/2002 | Smith et al. | |
| 2004/0084956 A1* | 5/2004 | Mayenburg | B60T 17/18 |
| | | | 303/2 |
| 2006/0071044 A1* | 4/2006 | Stanfield | B60R 9/00 |
| | | | 224/274 |
| 2007/0088469 A1 | 4/2007 | Schmiedel et al. | |
| 2008/0150350 A1 | 6/2008 | Morrow et al. | |
| 2009/0174158 A1* | 7/2009 | Anderson | B60G 21/073 |
| | | | 280/5.507 |
| 2009/0194347 A1 | 8/2009 | Morrow et al. | |
| 2010/0301668 A1 | 12/2010 | Yakes et al. | |
| 2013/0200604 A1* | 8/2013 | Bergman | A62C 27/00 |
| | | | 280/783 |
| 2014/0374179 A1* | 12/2014 | Deckard | B62D 33/02 |
| | | | 180/68.3 |
| 2015/0047917 A1* | 2/2015 | Burt, II | B60K 5/00 |
| | | | 180/292 |
| 2015/0090515 A1* | 4/2015 | Safranski | B62D 63/04 |
| | | | 180/233 |
| 2015/0329148 A1* | 11/2015 | Borowicz | B60N 2/04 |
| | | | 180/291 |
| 2015/0352949 A1* | 12/2015 | Jacobson | B60K 17/16 |
| | | | 180/53.1 |
| 2016/0090130 A1* | 3/2016 | Nakao | B60P 3/423 |
| | | | 296/26.08 |
| 2016/0311253 A1 | 10/2016 | Palmer et al. | |
| 2017/0036717 A1* | 2/2017 | Wakabayashi | B60K 11/06 |
| 2017/0253221 A1 | 9/2017 | Verhoff et al. | |
| 2017/0267052 A1 | 9/2017 | Zuleger et al. | |
| 2017/0361491 A1 | 12/2017 | Datema et al. | |
| 2017/0361492 A1 | 12/2017 | Datema et al. | |
| 2018/0056746 A1 | 3/2018 | Ellifson et al. | |
| 2018/0178705 A1* | 6/2018 | Fohrenkamm | B60P 3/42 |
| 2018/0312025 A1* | 11/2018 | Danielson | B60G 21/055 |
| 2018/0326843 A1* | 11/2018 | Danielson | F16H 57/035 |
| 2019/0023173 A1* | 1/2019 | Fohrenkamm | A01B 51/02 |
| 2019/0039407 A1 | 2/2019 | Smith | |
| 2019/0185077 A1* | 6/2019 | Smith | B60T 1/065 |
| 2019/0211915 A1* | 7/2019 | Davis | B62D 21/183 |
| 2020/0010125 A1* | 1/2020 | Peterson | B60G 21/05 |
| 2020/0122560 A1* | 4/2020 | Ward | B60K 17/34 |
| 2020/0164742 A1* | 5/2020 | Safranski | B62D 63/04 |

OTHER PUBLICATIONS

International Search Report and Written Opinion Received for International Application No. PCT/US2018/066263, dated May 20, 2019, 26 pages.

* cited by examiner

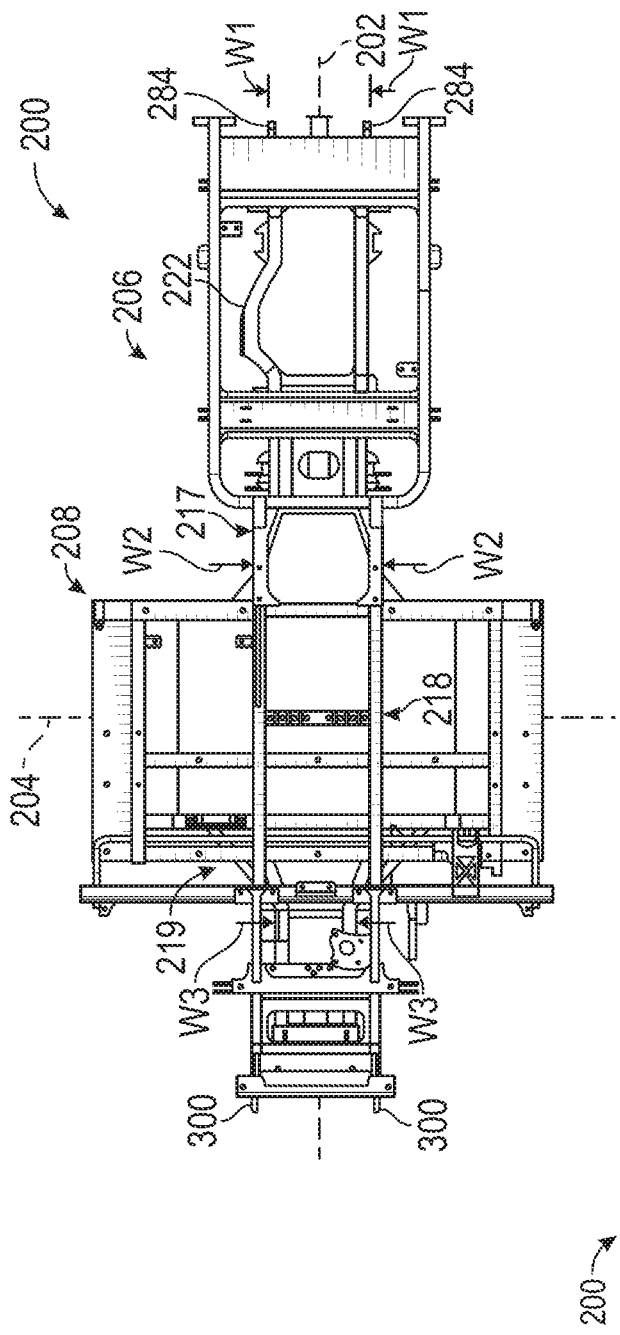
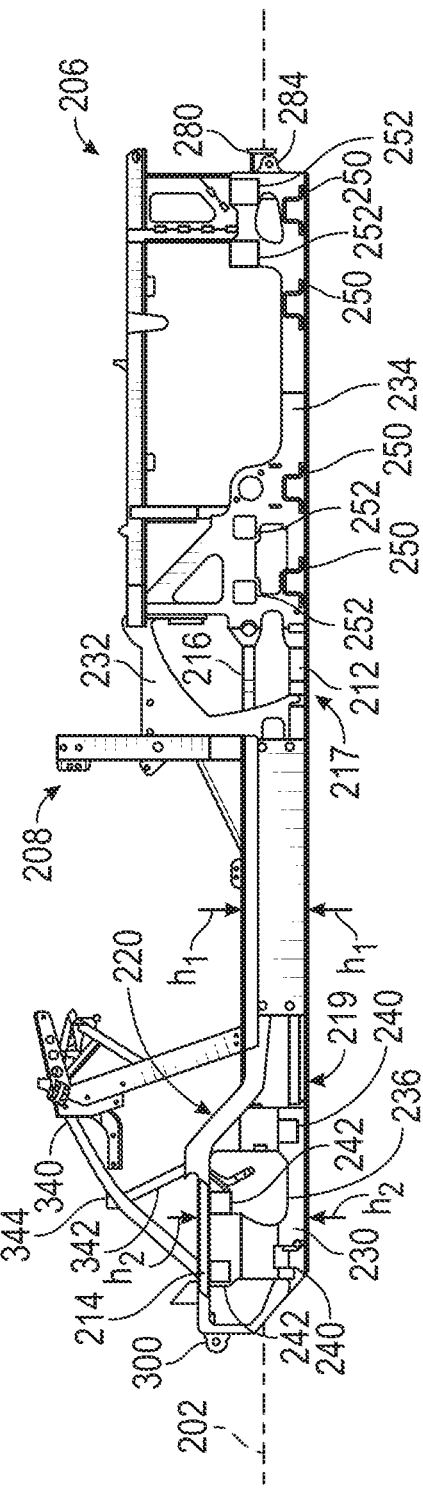
FIG. 11
FIG. 12

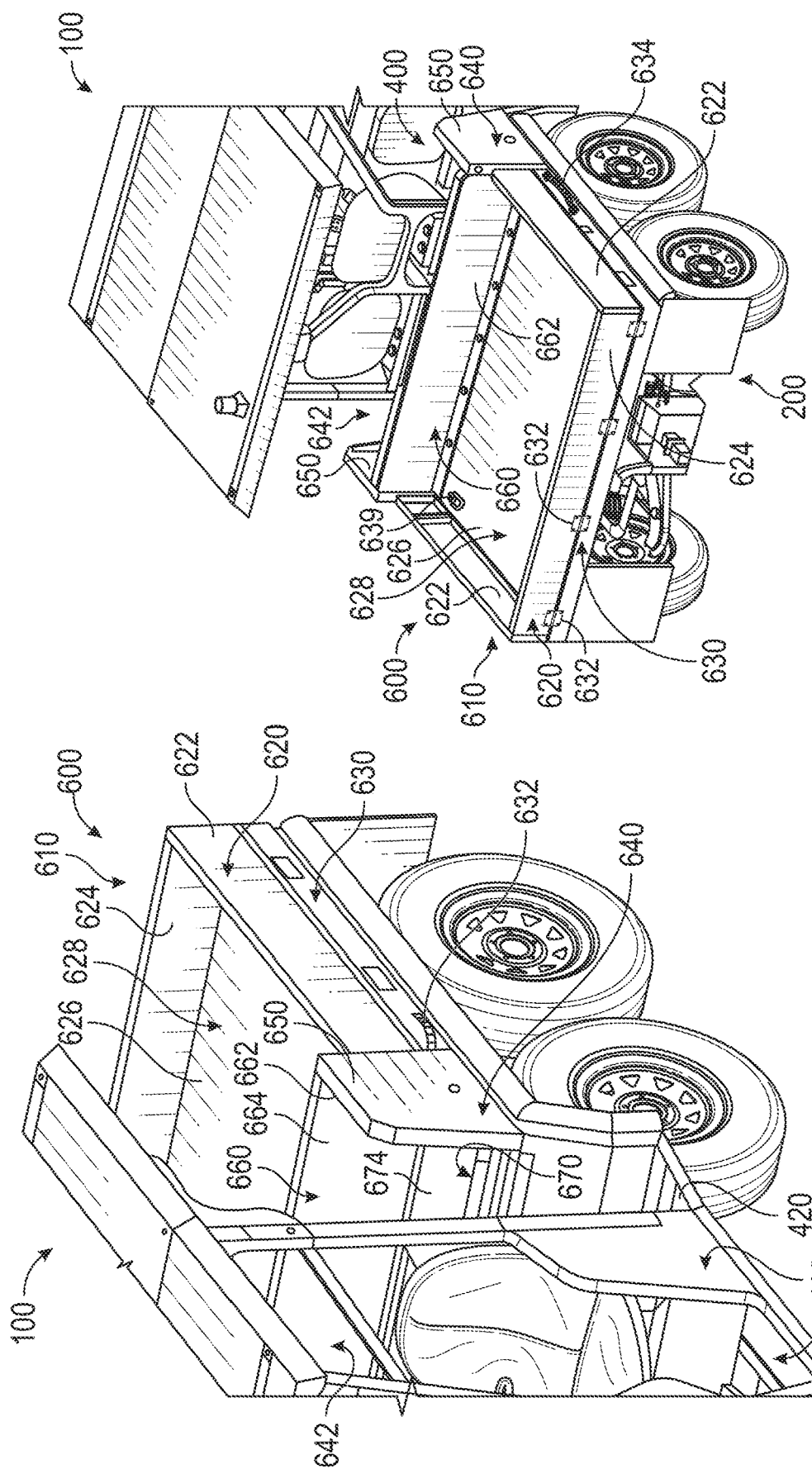

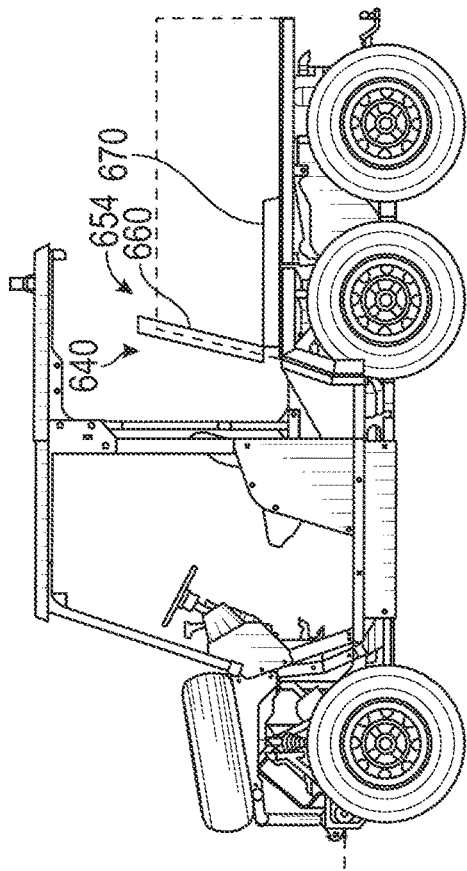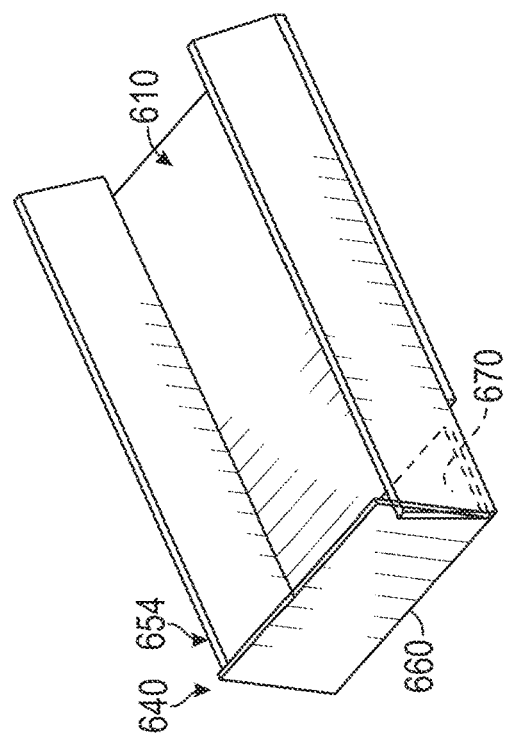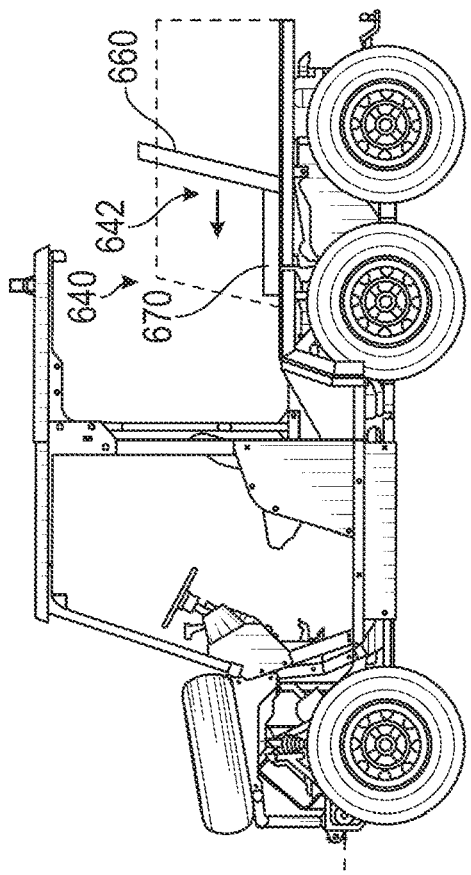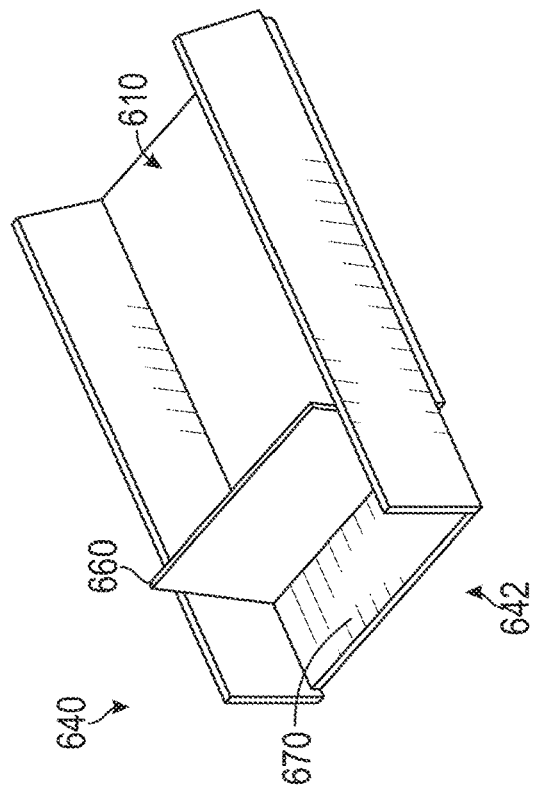

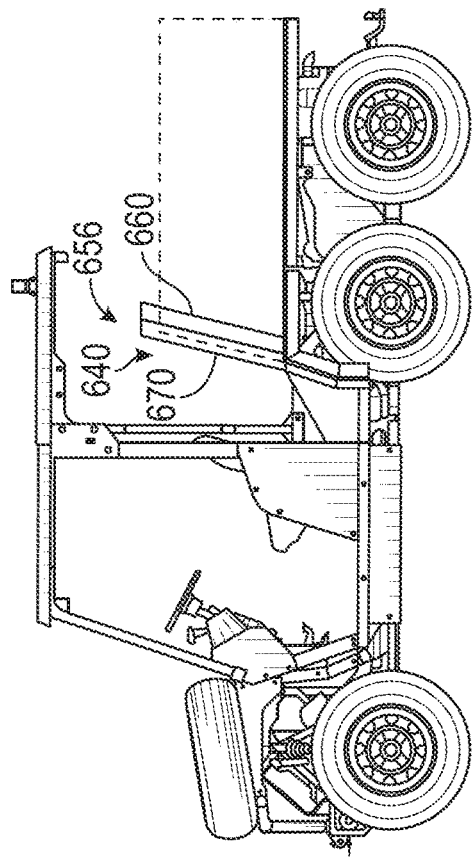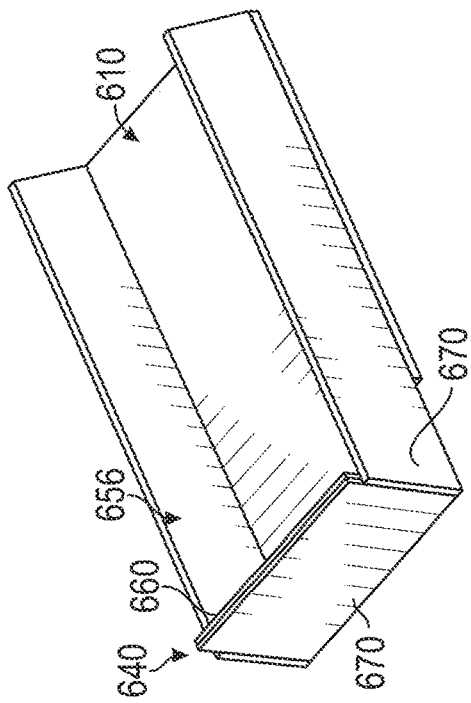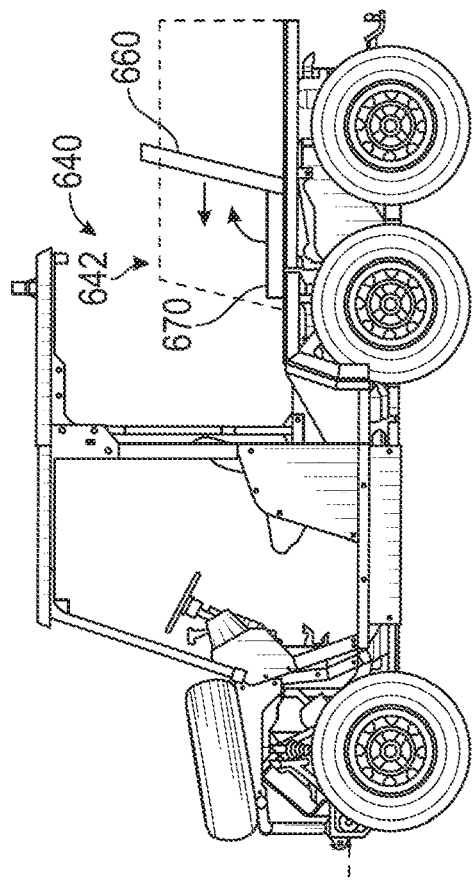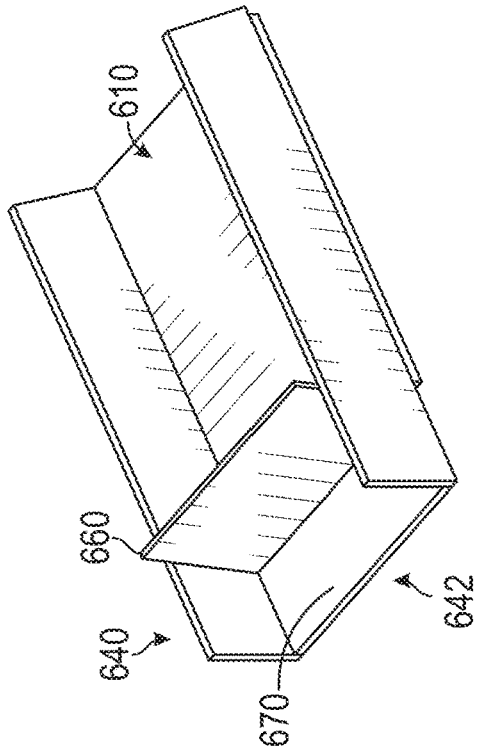

OFF-ROAD VEHICLE

CROSS-REFERENCE TO RELATED PATENT APPLICATIONS

The present application claims the benefit of U.S. Provisional Patent Application No. 62/607,649, filed Dec. 19, 2017, U.S. Provisional Patent Application No. 62/607,653, filed Dec. 19, 2017, U.S. Provisional Patent Application No. 62/607,727, filed Dec. 19, 2017, U.S. Provisional Patent Application No. 62/607,734, filed Dec. 19, 2017, U.S. Provisional Patent Application No. 62/607,759, filed Dec. 19, 2017, U.S. Provisional Patent Application No. 62/607,764, filed Dec. 19, 2017, and U.S. Provisional Patent Application No. 62/607,768, filed Dec. 19, 2017, all of which are incorporated herein by reference in their entireties.

BACKGROUND

Off-road recreational vehicles traditionally include non-structural plastic body panels that primarily serve aesthetic purposes. Such off-road recreational vehicles also traditionally have a maximum overall width of less than 65 inches, and a payload capacity rating of less than 1,500 pounds. Further, off-road recreational vehicles often include a cab having two bucket seats and/or a bench seat.

SUMMARY

One embodiment relates to a vehicle. The vehicle includes a chassis, a suspension system coupled to the chassis, a front axle, a first rear axle, and a second rear axle coupled to the chassis by the suspension system, and a powertrain coupled to the chassis and at least one of the front axle, the first rear axle, and the second rear axle. The powertrain is configured to drive the at least one of the front axle, the first rear axle, and the second rear axle. The chassis, the suspension system, the front axle, the first rear axle, and the second rear axle provide a payload capacity rating of at least 1,750 pounds. The vehicle has an overall width between 60 inches and 80 inches.

Another embodiment relates to a vehicle. The vehicle includes a chassis, a cargo bed coupled to the chassis, and a seating assembly coupled to the chassis forward of the cargo bed. The seating assembly includes a front seating section and a rear seating section. The rear seating section includes a pair of fixed side panels, a seat back coupled to the pair of fixed side panels, and a seat bottom coupled to the pair of fixed side panels. The rear seating section is selectively reconfigurable between (i) a seating configuration where the seat back is a headrest of the cargo bed and (ii) an extended bed configuration where the seat back forms a portion of the cargo bed and the seat bottom is the headrest of the cargo bed.

Still another embodiment relates to a vehicle. The vehicle includes a chassis, a front axle, a first rear axle, and a second rear axle coupled to the chassis, and a powertrain coupled to the chassis. The powertrain is configured to drive the front axle, the first rear axle, and the second rear axle. The powertrain includes an engine; a transmission having a transmission input coupled to the engine and a transmission output; a transaxle having a transaxle input coupled to the transmission output, a first transaxle output coupled to the second rear axle, and a second transaxle output; a rear differential having a rear differential input coupled to the second transaxle output, a first rear differential output coupled to the first rear axle, and a second rear differential output; and a front differential having a front differential input coupled to the second rear differential output and a front differential output coupled to the front axle.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 11 is a top view of the frame of FIG. 9, according to an exemplary embodiment;

FIG. 12 is a side view of the frame of FIG. 9, according to an exemplary embodiment;

FIGS. 24 and 25 are various perspective views of a first rear module of the vehicle of FIG. 1 in a first configuration, according to an exemplary embodiment;

FIGS. 32-35 display a process of reconfiguring the first rear module of FIG. 24 from the first configuration to a fifth configuration, according to an exemplary embodiment;

FIGS. 36-39 display a process of reconfiguring the first rear module of FIG. 24 from the first configuration to a sixth configuration, according to an exemplary embodiment;

DETAILED DESCRIPTION

Figure 1:
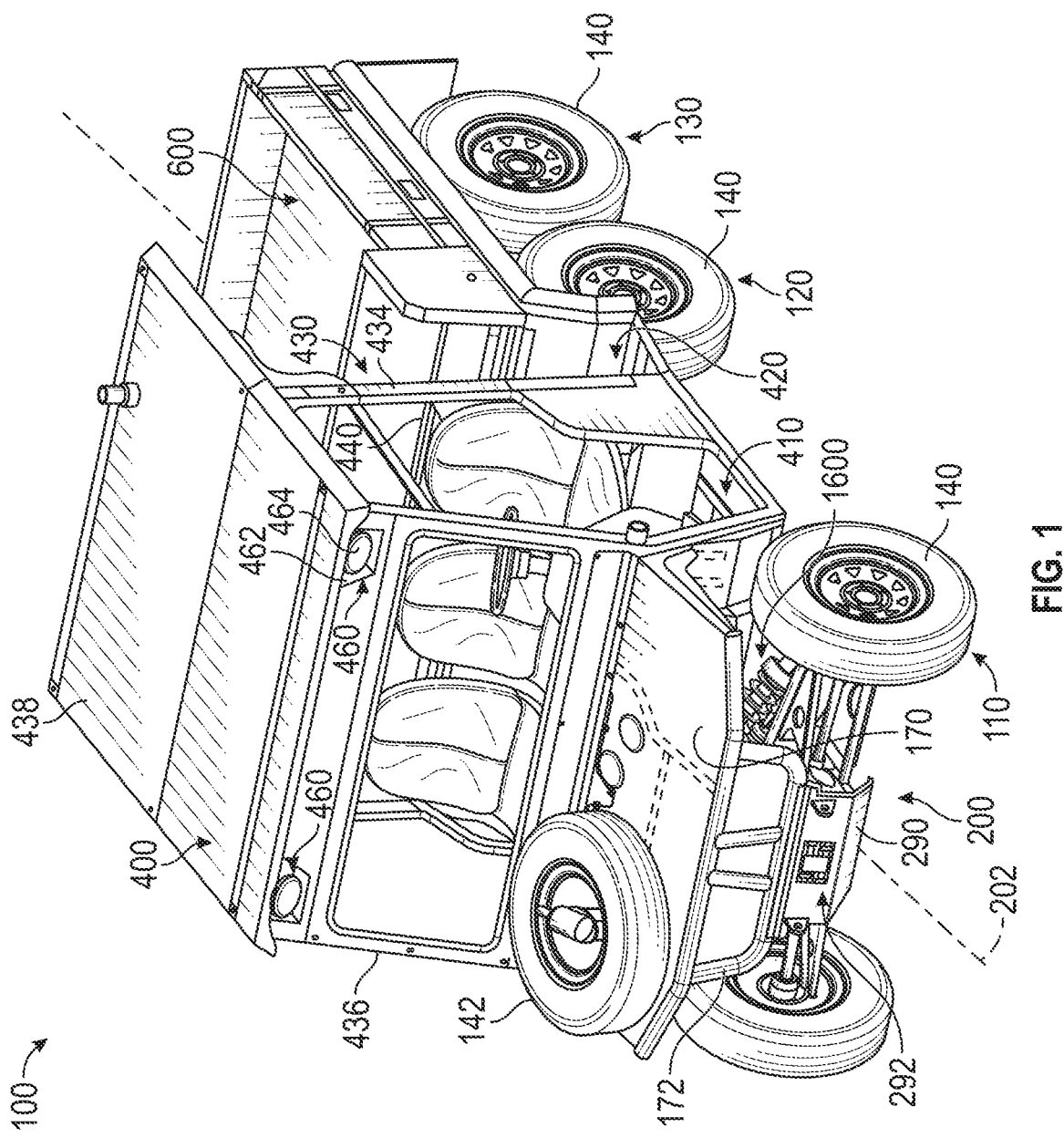
FIG. 1 is a front perspective view of a vehicle, according to an exemplary embodiment.
Figure 2:
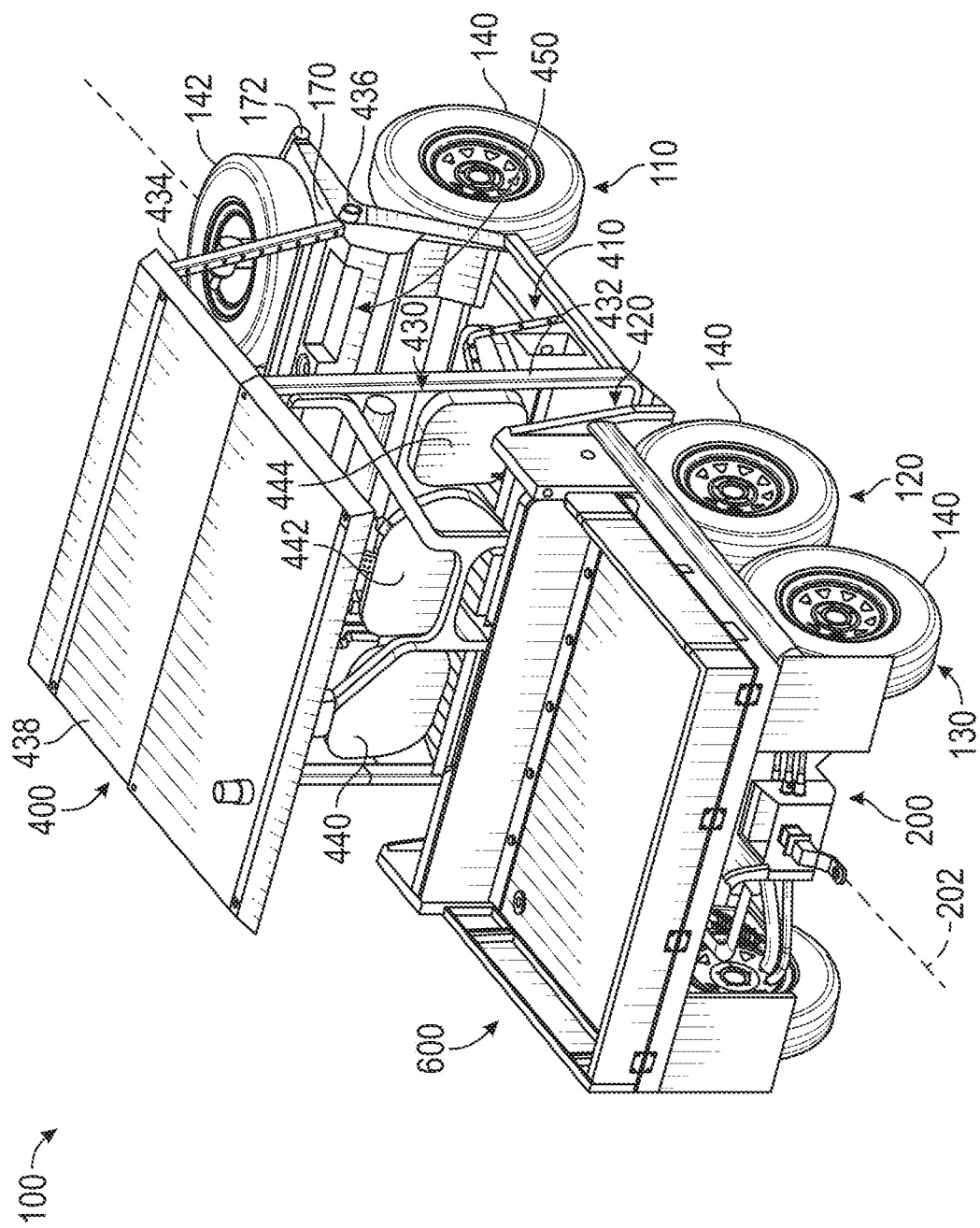
FIG. 2 is a rear perspective view of the vehicle of FIG. 1, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, the off-road vehicle of the present disclosure includes components that facilitate increasing the payload capacity rating thereof relative to utility task vehicles ("UTVs") (e.g., which may have a payload capacity rating of 1,500 pounds or less, etc.). By way of example, the off-road vehicle of the present disclosure may have a payload capacity rating greater than 1,500 pounds (e.g., 1,750 pounds, 2,000 pounds, 2,500 pounds, 2,800 pounds, 3,000 pounds, 3,200 pounds, etc.) and/or a towing capacity greater than 1000 pounds (e.g., 1,250 pounds, 1,500 pounds, 2,000 pounds, 2,500 pounds, 3,000 pounds, etc.). The off-road vehicle of the present disclosure may additionally or alternatively have an increased width relative to UTVs. By way of example, UTVs may have a maximum width of less than 65 inches in order to comply with department of natural resource ("DNR") regulations for trail riding, while the off-road vehicle of the present disclosure may have a width of between 60 inches and 80 inches (e.g., 60 inches, 65 inches, 68 inches, 70 inches, 72 inches, 74 inches, 80 inches, etc.). Thus, the off-road vehicles of the present disclosure are different from UTVs at least in that they (i) have specifically-tailored components that facilitate providing increased payload capacity and/or (ii) are wider. Such off-road vehicles provide significant advantages relative to and/or provide solutions in markets not serviced by UTVs (e.g., utility in construction applications, utility in fire and emergency applications, utility in military applications, etc.). In other embodiments, the off-road vehicle of the present disclosure is another type of vehicle such as a recreational off-highway vehicle, an all-terrain vehicle ("ATV"), a golf cart, and/or still another vehicle.

According to an exemplary embodiment, the off-road vehicle of the present disclosure includes a cab assembly and a hood, cargo, and storage assembly both supported by a chassis. The hood, cargo, and storage assembly includes a hood and a grille (e.g., a brush guard, etc.). Traditionally, off-road vehicles include stylistic, plastic hoods that provide minimal functional protection to components of the vehicle. A separate brush guard may be attached to the front of the chassis of traditional off-road vehicles to protect not only the components under the hood, but the hood itself. The hood of the present disclosure is manufactured from metal and/or plastic (e.g., sheet metal, sheet metal with an outer plastic skin, etc.), and the grille is manufactured from tubular metal. The grille is coupled directly to the hood (e.g., welded, bolted, etc.), and the assembly provides a structurally rigid fascia that does not require a separate brush guard to protect the components under the hood and the hood itself. The cab of the present disclosure may accommodate three bucket seats or a three-person bench seat laterally across the cab. The cab of the present disclosure may also have a roof assembly including a roof panel and a frame. The frame supports the roof panel, but the roof panel itself may have a subframe. A distal end of the roof assembly (e.g., a distal portion of the roof panel, etc.) overhangs a rear section of the cab (e.g., the roof panel may extend beyond the frame, etc.) without a support structure supporting the distal end thereof (e.g., without a C-pillar, etc.).

According to an exemplary embodiment, the off-road vehicle of the present disclosure includes interchangeable rear modules. A first rear module may include a reconfigurable cargo bed module having a cargo bed and a seating assembly. The seating assembly is selectively reconfigurable to extend the cargo bed. A second module may include passenger seating and litter carrying module including multi-purpose seats. The multi-purpose seats are selectively reconfigurable to accommodate both seated passengers and a litter.

According to an exemplary embodiment, the off-road vehicle of the present disclosure includes three axles, namely a front axle (e.g., the number one axle, etc.), a first rear axle (e.g., the number two axle, etc.), and a second rear axle (e.g., the number three axle, etc.). Each of the front axle, the first rear axle, and the second rear axle may be driven by a powertrain of the vehicle. The powertrain includes a primary driver (e.g., an engine, a motor, etc.), a transmission, a transaxle, a rear drive shaft, a rear differential, a front drive shaft, and a front differential, according to an exemplary embodiment. The transmission couples the engine to the transaxle, the rear drive shaft couples the transaxle to the rear differential, and the front drive shaft couples the rear differential to the front differential. In other embodiments, the off-road vehicle does not include a transaxle (e.g., includes another differential, includes a transfer case, etc.). The engine provides a mechanical energy output to the transmission that is provided to the transaxle by the transmission. The transaxle provides (i) a first portion of the mechanical energy received from the transmission to the second rear axle to drive the second rear axle and (ii) a second portion of the mechanical energy received from the transmission to the rear differential. In some embodiments, the transaxle is positioned forward of the second rear axle and rearward of the first rear axle. The rear differential provides (i) a first portion of the mechanical energy received from the transaxle to the first rear axle to drive the first rear axle and (ii) a second portion of the mechanical energy received from the transaxle to the front differential. The rear differential may thereby be referred to as a drive-through differential as the rear differential not only drives the first rear axle, but also the front differential. The front differential provides the mechanical energy received from the rear differential to the front axle to drive the front axle.

According to an exemplary embodiment, the off-road vehicle of the present disclosure includes a cooling system having a radiator disposed underneath a hood of the vehicle. Traditionally, radiators provided with UTVs are arranged in a vertical orientation. Arranging such radiators in a vertical orientation may require the hood line (e.g., the side profile of the hood, etc.) to be elevated to fit the radiator at the front of the UTV, negatively affecting the visibility of the operator and therefore the drivability of the UTV. The hood line may need to be elevated due at least in part to (i) the fixed vertical position of the chassis and/or frame of the vehicle (i.e., the radiator may not be positioned lower due to interference with and/or support thereof by the frame) and/or (ii) the set width of the space claim available for the radiator (i.e., body panels, lights, etc. provided with UTVs may limit the lateral width available for the radiator). The radiator may thereby need to be taller than desired in order to satisfy the cooling requirements of the engine and/or the powertrain of UTVs. The hood covers the radiator (e.g., for aesthetics, for protection, etc.), and covering the taller radiator thereby may require elevating the hood line. To reduce the elevation of the hood line, radiators may be positioned further rearward. However, positioning radiators further rearward may negatively affect the performance of the radiator. The cooling system of the off-road vehicle of the present disclosure includes a bracket configured to orient the radiator at an angle (e.g., relative to a vertical axis, relative to an axis that is perpendicular to an axis defined by a chassis of the off-road vehicle, not perpendicular to an axis defined by a chassis of the off-road vehicle, etc.). The angularly offset radiator may facilitate (i) positioning the radiator at the front end of the vehicle, (ii) lowering the hood line of the hood to increase operator visibility, and thus the drivability of the vehicle, and/or (iii) maintaining or increasing the cooling capacity of the cooling system (e.g., by increasing the size of the radiator, etc.).

According to an exemplary embodiment, the off-road vehicle has a braking system that includes a parking brake assembly. In one embodiment, the parking brake assembly includes (i) a first parking brake that facilitates selectively actuating a first braking assembly associated with the first rear axle and (ii) a second parking brake that facilitates selectively actuating a second braking assembly associated with the second rear axle. The vehicle may additionally or alternatively include a steering system that has a steering rack with an input that is spaced from an end of the steering rack and is disposed toward a center of the vehicle.

Overview

According to the exemplary embodiment shown in FIGS. 1-7, a vehicle, shown as vehicle 100, includes a chassis, shown as frame 200. The vehicle 100 also includes a body assembly including a first portion, shown as cab 400, and a second portion, shown as rear module 600. The cab 400 and the rear module 600 are coupled to the frame 200, according to an exemplary embodiment.

As shown in FIGS. 1-3, 6, and 7, the rear module 600 is disposed behind the cab 400. By way of example, the rear module 600 may be disposed behind the cab 400 relative to a forward travel direction of the vehicle 100. The vehicle 100 may be configured to have a greater top speed in the forward travel direction than in a reverse travel direction. The vehicle 100 may additionally or alternatively have a windshield configured to deflect an airflow otherwise incident upon the driver of the vehicle 100 when moving in the forward travel direction.

Figure 3:
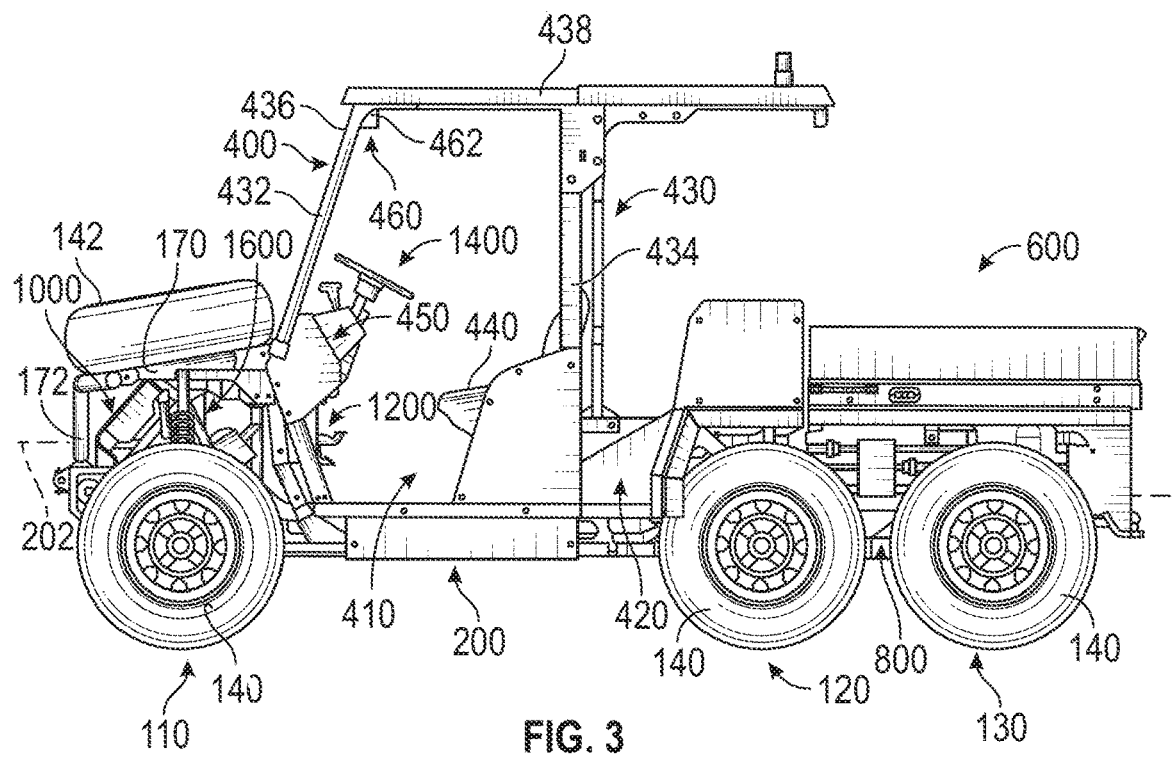
FIG. 3 is a side view of the vehicle of FIG. 1, according to an exemplary embodiment.

As shown in FIG. 3, the vehicle 100 includes a drive system, shown as powertrain 800; a thermal management system, shown as cooling system 1000; a braking system, shown as braking system 1200; and a steering system, shown as steering assembly 1400. The powertrain 800 may include a primary driver such as an engine, a transaxle, a differential, a drive through differential, a drive shaft, and/or still other components. The cooling system 1000 may include various cooling components including a fan, a radiator, fluid conduits, and/or still other components. The braking system 1200 may include various braking components such as brakes (e.g., disc brakes, drum brakes, air brakes, etc.), rotors, brake lines, brake pedals, and/or still other components. The steering assembly 1400 may include various steering components such as a steering wheel, a steering shaft, a steering rack, a power steering pump, tie rods, and/or still other components. As shown in FIGS. 1 and 3-5, the vehicle 100 includes a suspension system, shown as suspension system 1600. The suspension system 1600 may include various suspension components such as coilover spring-shocks, upper control arms, lower control arms, and/or still other components.

As shown in FIGS. 1-3 and 6, the frame 200 defines an axis, shown as longitudinal axis 202. The longitudinal axis 202 may be generally aligned with a frame component (e.g., a frame rail, etc.) of the frame 200 of the vehicle 100 (e.g., front-to-back, etc.). The longitudinal axis 202 may additionally or alternatively be defined by another feature or aspect of the vehicle 100 (e.g., a straight forward and/or rearward travel direction, etc.). As shown in FIGS. 1-5, the vehicle 100 includes a plurality of axles. The plurality of axles include a first axle, shown as front axle 110, a second axle, shown as first rear axle 120, and a third axle, shown as second rear axle 130. According to an exemplary embodiment, the front axle 110, the first rear axle 120, and the second rear axle 130 engage and support the frame 200 of the vehicle 100 via the suspension system 1600. In other embodiments, the vehicle 100 includes only one of the first rear axle 120 and the second rear axle 130 (e.g., only the second rear axle 130 and not the first rear axle 120, only the first rear axle 120 and not the second rear axle 130, etc.). The vehicle 100 may thereby be a two-axle vehicle. The "axles" outlined herein may include solid axle configurations and/or may include pairs of axles (e.g., pairs of half shafts, etc.) each having a set of constant velocity joints and coupling differentials to pairs of hub assemblies, according to various alternative embodiments.

As shown in FIGS. 1-5, each of the front axle 110, the first rear axle 120, and the second rear axle 130 includes tractive assemblies, shown as wheel and tire assemblies 140. The wheel and tire assemblies 140 each have a wheel and a tire. In some embodiments, the wheel is a multi-fit wheel configured to couple to various wheel hubs having different lug bolt patterns, as disclosed in U.S. patent application Ser. No. 16/050,100, filed Jul. 31, 2018, which is incorporated herein by reference in its entirety. In other embodiments, the traditional pneumatic tires of the wheel and tire assemblies 140 are replaced with non-pneumatic tires (i.e., airless tires). The vehicle 100 may thereby include non-pneumatic tires. In still other embodiments, the vehicle 100 additionally or alternatively includes track elements. The front axle 110, the first rear axle 120, and the second rear axle 130 may additionally include the brakes of the braking system 1200, gear reductions, the steering components of the steering assembly 1400, wheel hubs, the suspension components of the suspension system 1600 (e.g., independent suspension components, etc.), and/or other features.

According to an exemplary embodiment, the powertrain 800 is configured to drive each of the front axle 110, the first rear axle 120, and the second rear axle 130 such that the vehicle 100 is a 6×6 vehicle (e.g., six-wheel-drive, all-wheel-drive, etc.). By way of example, the powertrain 800 may be at least selectively coupled to the front axle 110, the first rear axle 120, and the second rear axle 130. Such a 6×6 arrangement may provide increased terrainability, traction, etc. for the vehicle 100 relative to a 2×6 variant, a 4×6 variant, a 2×4 variant, and/or a 4×4 variant. In other embodiments, the powertrain 800 is configured to drive only two of the front axle 110, the first rear axle 120, and the second rear axle 130 (e.g., only the first rear axle 120 and the second rear axle 130 are driven, only the front axle 110 and the first rear axle 120 are driven, only the front axle 110 and the second rear axle 130 are driven, etc.) such that the vehicle 100 is a 4×6 vehicle (e.g., rear-wheel-drive, four-wheel-drive, etc.). In still other embodiments, the powertrain 800 is configured to drive only one of the front axle 110, the first rear axle 120, and the second rear axle 130 (e.g., only the front axle 110 is driven, only the first rear axle 120 is driven, only the second rear axle 130 is driven, etc.) such that the vehicle 100 is a 2×6 vehicle (e.g., front-wheel-drive, two-wheel-drive, etc.). Such a 4×6 or 2×6 arrangement may require a less complex powertrain 800 and/or a powertrain 800 having reduced costs while meeting the various needs of the vehicle 100. In some embodiments, the powertrain 800 is reconfigurable between a 6×6 mode, a 4×6 mode, and/or a 2×6 mode such that the powertrain 800 may drive a varying number of axles based on the current mode of operation thereof. In one embodiment, the powertrain 800 is selectively reconfigurable between the 6×6 mode, the 4×6 mode, and/or the 2×6 mode in response to an operator input to change a mode of operation of the powertrain 800 between the 6×6 mode, the 4×6 mode, and/or the 2×6 mode. In another embodiment, the powertrain 800 is automatically and adaptively reconfigurable between the 6×6 mode, the 4×6 mode, and/or the 2×6 mode by a control system based on the current powertrain needs of the vehicle 100 (e.g., the 6×6 mode may be engaged in response to the vehicle 100 encountering rough terrain, the 2×6 mode may be engaged in response to the vehicle 100 traveling on smooth ground, etc.). Switching between various modes of operation may improve the efficiency of the vehicle 100 (e.g., improved fuel efficiency, etc.) and/or provide other benefits (e.g., reduce wear on certain components of the vehicle 100, etc.).

Figure 4:
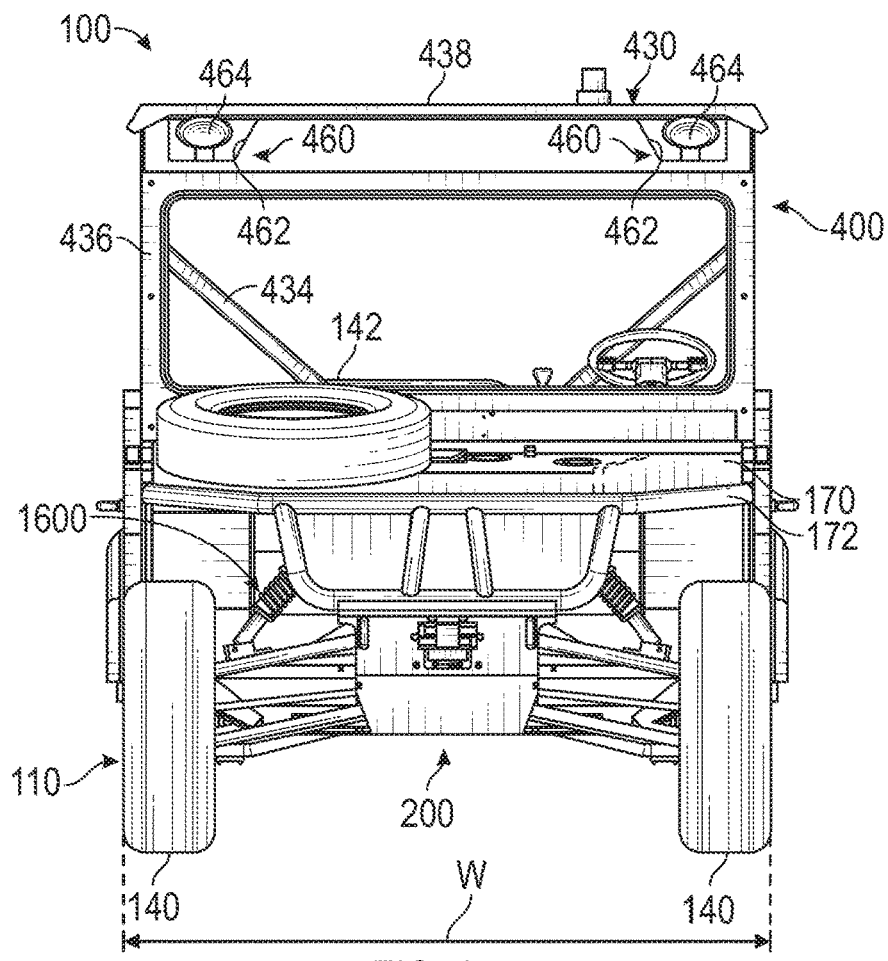
FIG. 4 is a front view of the vehicle of FIG. 1, according to an exemplary embodiment.
Figure 5:
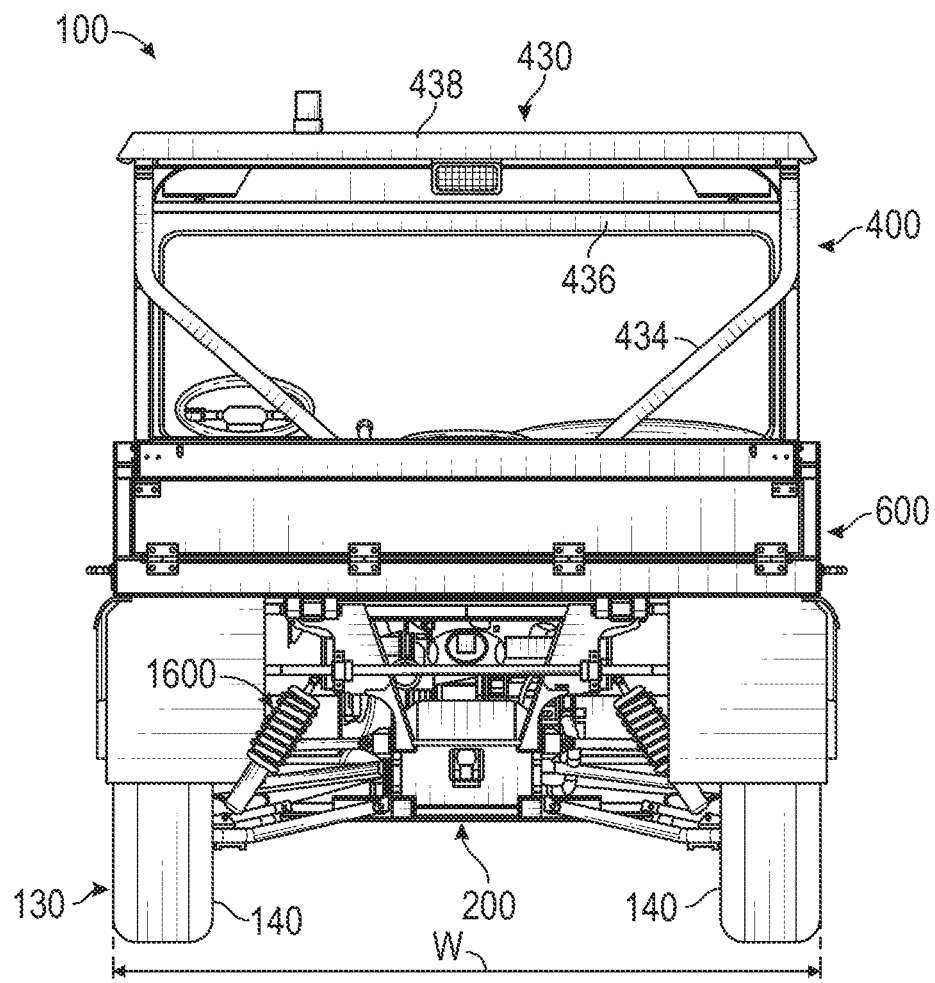
FIG. 5 is a rear view of the vehicle of FIG. 1, according to an exemplary embodiment.
Figure 6:
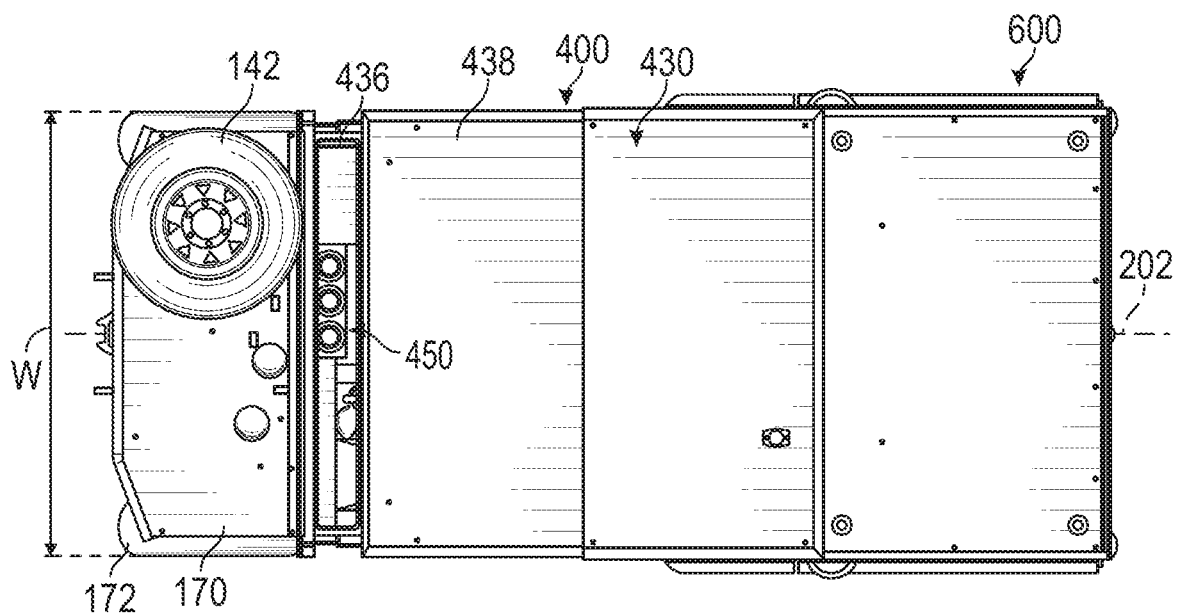
FIG. 6 is a top view of the vehicle of FIG. 1, according to an exemplary embodiment.

As shown in FIGS. 4-6, the vehicle 100 has a width W. The width W as used herein may be the overall width of the vehicle 100 between outermost points on each lateral side of the vehicle 100. According to an exemplary embodiment, the width W of the vehicle 100 is greater than that of a UTV. By way of example, UTVs may typically have a maximum width of less than 65 inches (e.g., 64 inches, etc.) such that they satisfy DNR trail regulations. Such regulations may require that vehicles using DNR trails have a width of less than 65 inches. In one embodiment, the width W of the vehicle 100 is 72 inches. In another embodiment, the width W of the vehicle 100 is 80 inches. In other embodiments, the width W of the vehicle 100 is between 70 inches and 80 inches (e.g., 70, 72, 74, 76, 78, 80, etc. inches). In still other embodiments, the width W of the vehicle 100 is between 60 inches and 70 inches (e.g., 60, 62, 64, 66, 68, 70, etc. inches). In some embodiments, the frame 200 is modular and has a width that is selectively variable to provide various vehicle configurations (e.g., different widths based on customer needs, etc.). According to an exemplary embodiment, increasing the width W of the vehicle 100 relative to UTVs facilitates transporting the vehicle 100 on a car carrier truck and/or trailer. By way of example, car carrier trucks and/or trailers may have tracks spaced to accommodate the track width of on-road automotive vehicles. UTVs, having a much smaller width and thereby a lesser track width than an automotive vehicle, may not bridge the gap between the tracks, and UTVs may not be transportable onboard such car carrier trucks and/or trailers. Advantageously, the vehicle 100, having a greater width W than UTVs and thereby a greater track width, is transportable upon a car carrier truck and/or trailer as it fits onto the spaced tracks of such car carrier trucks and/or trailers.

According to an exemplary embodiment, various components of the vehicle 100 (e.g., the frame 200, the cab 400, the rear module 600, the powertrain 800, the suspension system 1600, etc.) are designed to be more robust and rugged relative to components of UTVs. By way of example, panels of the cab 400 and/or the rear module 600 (e.g., the hood, fenders, bed, etc.) may be functional, high strength steel components, rather than plastic paneling as provided upon UTVs. Such plastic paneling may primarily provide only stylistic, aesthetic features. In some embodiments, at least some of the paneling of the vehicle 100 include plastic (e.g., plastic paneling, sheet metal paneling with a plastic skin, etc.). According to an exemplary embodiment, the more robust components of the vehicle 100 including the frame 200, the suspension system 1600, the cab 400, and the rear module 600, in combination with the front axle 110, the first rear axle 120, and the second rear axle 130, provide a higher payload capacity rating (e.g., including occupants, gear, modules, etc.) relative to UTVs. Payload capacity rating as used herein may be the amount of weight the vehicle 100 is capable of carrying, including passengers and cargo within the cab 400 and the rear module 600, within a preselected engineering factor or design factor (e.g., an engineering factor or design factor of 1.2, 1.5, 2, etc.; an engineering factor or design factor of "X" such that the vehicle 100 is actually capable of carrying "X" times the payload capacity rating from an engineering perspective; etc.). Therefore, the vehicle 100 may be capable of carrying greater payloads than the payload capacity rating that is advertised to the end consumer. By way of example, the vehicle 100 may have a payload capacity rating greater than 1,500 pounds (e.g., but less than 4,000 pounds, etc.). In one embodiment, the vehicle 100 has a payload capacity rating of at least 3,200 pounds. In some embodiments, the vehicle 100 has a payload capacity rating between 1,500 pounds and 3,200 pounds (e.g., 1,750, 2,000, 2,500, 3,000, etc. pounds).

Figure 8A:
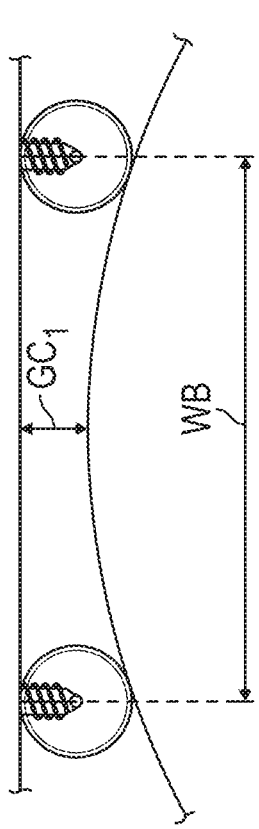
FIGS. 8A and 8B are various views illustrating ground clearance of a two axle vehicle relative to a three axle vehicle, according to an exemplary embodiment.
Figure 8B:
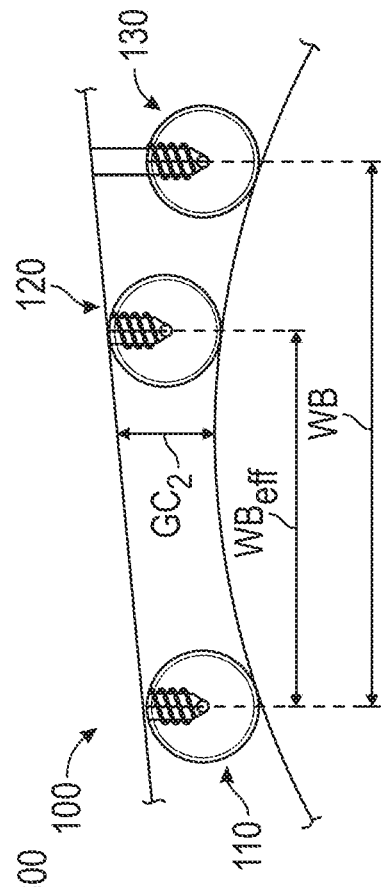
Figure 7:
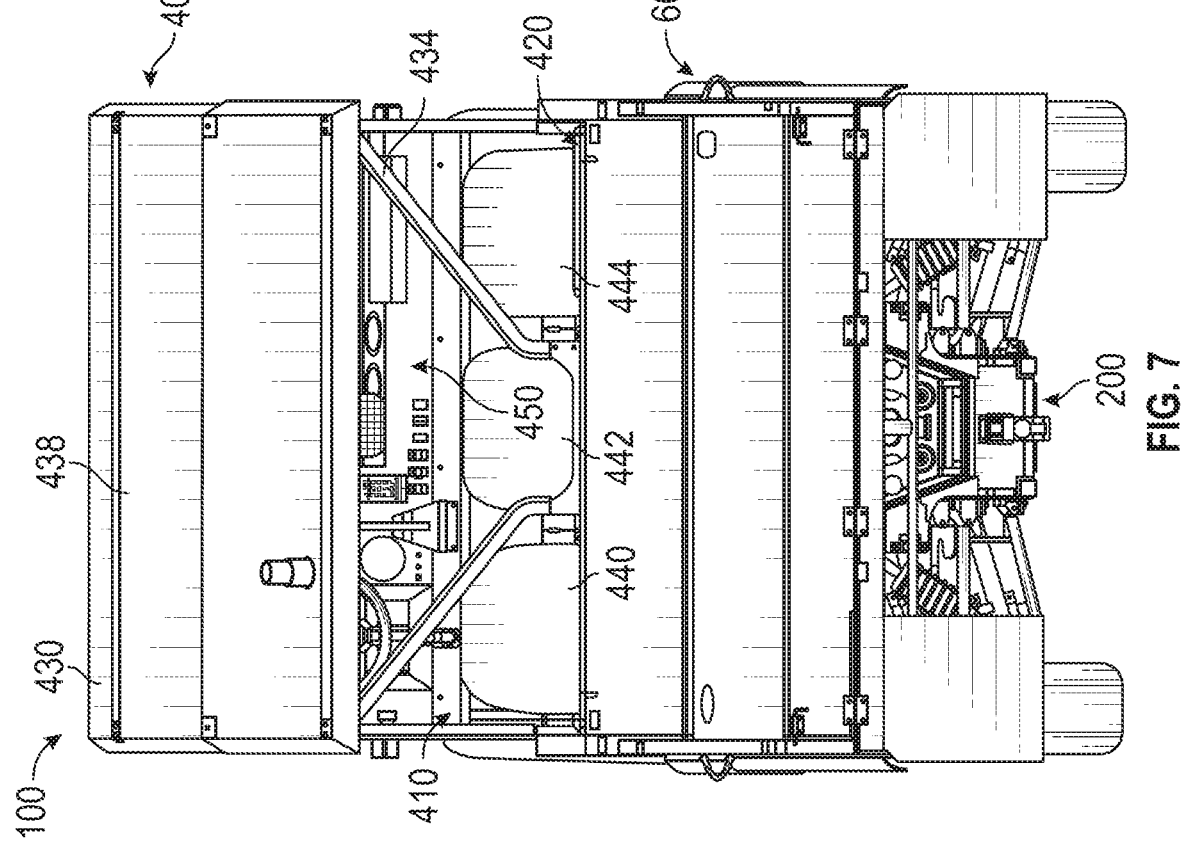
FIG. 7 is a top rear perspective view of the vehicle of FIG. 1, according to an exemplary embodiment.

According to an exemplary embodiment, the vehicle 100 is configured to provide increased off-road mobility relative to a vehicle having a similar wheelbase (e.g., the distance between the front-most to the rearmost axle, the distance between the front axle 110 and the second rear axle 130, etc.) that has only two axles (e.g., a 4×4 UTV having a similar wheelbase, etc.). The vehicle 100 provides significantly greater payloads by leveraging three axles, particularly designed (e.g., certain, additional, more robust, etc.) components, and/or independent suspension. For example, as shown in FIGS. 8A and 8B, vehicles having the same wheel base WB as the vehicle 100, but only including two axles, have reduced ground clearance $GC_1$ on uneven ground relative to the three-axle configuration of the vehicle 100, which has an increased ground clearance $GC_2$. The first rear axle 120 of the vehicle 100 effectively increases the ground clearance of the vehicle 100 in such scenarios by reducing the effective wheelbase $WB_{eff}$ of the vehicle 100 to the distance between the front axle 110 and the first rear axle 120. The vehicle 100 having three axles also more evenly distributes loading throughout the vehicle 100 and facilitates sizing the components of the vehicle 100 to that of a traditional UTV, even with the increased payload capacity rating. A traditional two-axle or three-axle UTV would require components to be of a larger scale (e.g., the scale of a three-quarter ton pickup truck, etc.) to provide a similarly high payload capacity rating.

Frame and Chassis

According to the exemplary embodiment shown in FIGS. 9-23, the frame 200 extends lengthwise along the longitudinal axis 202 and widthwise along a lateral axis 204. The longitudinal axis 202 extends perpendicular to the lateral axis 204. The frame 200 includes a first portion, shown as central portion 206, and a second portion, shown as cab support or cab portion 208. The central portion 206 extends along the length of the vehicle 100 (i.e., parallel to the longitudinal axis 202) from the front-most part of the frame 200 to the rearmost part of the frame 200. The cab portion 208 is coupled to the central portion 206 and extends laterally outward (i.e., parallel to the lateral axis 204) from the central portion 206.

Many of the components of the frame 200 are arranged symmetrically about the longitudinal axis 202. To facilitate description of these components, the term "corresponding" as used hereinafter may refer to a component disposed on the same lateral side of the longitudinal axis 202. By way of example, in the phrase "component A is coupled to the corresponding component B," component A and component B are both located on the same lateral side of the longitudinal axis 202.

Figure 9:
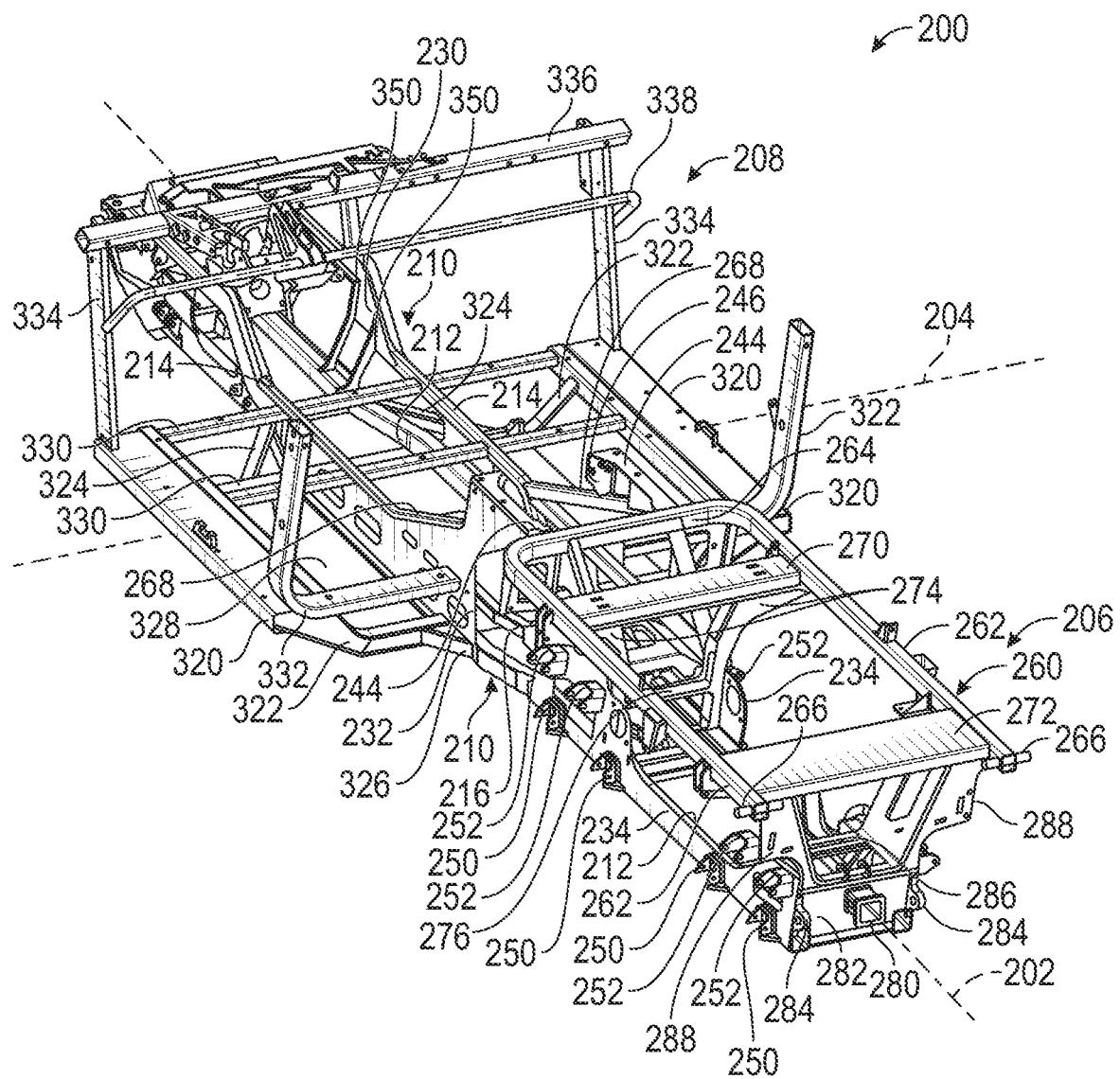
FIG. 9 is a top rear perspective view of a frame of the vehicle of FIG. 1, according to an exemplary embodiment.

As shown in FIGS. 9 and 11, the central portion 206 includes a pair of frame rails 210 that extend along the longitudinal axis 202. The frame rails 210 extend from a front portion of the frame 200 to a rear portion of the frame 200. The frame rails 210 each include a first tubular member, shown as lower rail 212, a second tubular member, shown as front upper rail 214, and a third tubular member, shown as rear upper rail 216. The front upper rail 214 is disposed directly forward of the rear upper rail 216. The front upper rail 214 and the rear upper rail 216 are offset vertically (i.e., perpendicular to the longitudinal axis 202 and the lateral axis 204) above the lower rail 212. The lower rail 212 extends farther rearward than the rear upper rail 216.

As shown in FIGS. 11 and 12, the lower rail 212, the front upper rail 214, and the rear upper rail 216 extend parallel to the longitudinal axis 202 except at a first longitudinal position 217, a second longitudinal position 218, a third longitudinal position 219, and a fourth longitudinal position 220. Additionally, a portion 222 of one of the lower rails 212 bows outward (e.g., to provide clearance for another component, such as an engine of the powertrain 800, etc.) such that it is not parallel to the front upper rails 214. Near the rear end of the frame 200, the lower rails 212 and the rear upper rails 216 extend parallel to one another (e.g., except for the portion 222) and have an overall width $W_1$. At the first longitudinal position 217, the lower rail 212 and the rear upper rail 216 bend laterally outward. Between the first longitudinal position 217 and the second longitudinal position 218, the lower rails 212 and the rear upper rails 216 extend parallel to one another and have an overall width $W_2$. At the second longitudinal position 218, the rear upper rails 216 terminate and meet (e.g., contact, couple to, etc.) the front upper rails 214. The front upper rails 214 extend upward from the lower rails 212 and bend to be in line with the rear upper rails 216. Accordingly, forward of the second longitudinal position 218, the front upper rails 214 and the rear upper rails 216 are in line with one another (e.g., each have the overall width $W_2$). At the third longitudinal position 219, the lower rails 212 bend laterally inward, however, the front upper rails 214 do not bend laterally. Forward of the third longitudinal position 219, the lower rails 212 have an overall width $W_3$. Accordingly, width $W_2$ is greater than both width $W_1$ and width $W_3$. Width $W_1$ may be greater than, equal to, or less than width $W_3$. The first longitudinal position 217 is disposed proximate (e.g., immediately rearward of) a rear end of the cab portion 208. Accordingly, the first longitudinal position 217 may be located longitudinally between the cab 400 and the rear module 600. The second longitudinal position 218 is disposed directly below the cab portion 208. The third longitudinal position 219 is disposed proximate (e.g., directly below) a front end of the cab portion 208.

As shown in FIG. 12, rearward of the fourth longitudinal position 220, an overall height $h_1$ extends between the lower surfaces of the lower rails 212 and the upper surfaces of the front upper rails 214 and the rear upper rails 216. At the fourth longitudinal position 220, the front upper rails 214 bend upward. Forward of the fourth longitudinal position 220, an overall height $h_2$ extends between the lower surfaces of the lower rails 212 and the upper surfaces of the front upper rails 214, where the height $h_2$ is greater than the height $h_1$. The fourth longitudinal position 220 may be forward of the third longitudinal position 219.

As shown in FIGS. 9, 10, 15, and 16, the frame rails 210 each include a first sheet or panel, shown as side panel 230, a second sheet or panel, shown as side panel 232, and a third sheet or panel, shown as side panel 234. The side panel 230, the side panel 232, and the side panel 234 extend between and couple the lower rail 212 to the front upper rail 214 and the rear upper rail 216. The side panel 230, the side panel 232, and the side panel 234 extend laterally outward of the lower rail 212, the front upper rail 214, and the rear upper rail 216. The side panel 230 is disposed partially forward of the side panel 232, and the side panel 232 is disposed forward of the side panel 234. The side panel 230, the side panel 232, and the side panel 234 act as web members to increase the bending resistance of the frame rails 210 as compared to the lower rails 212, the front upper rails 214, and the rear upper rails 216 alone. Accordingly, the side panel 230, the side panel 232, and the side panel 234 increase the payload capacity of the vehicle 100. Advantageously, this increased payload capacity facilitates the use of vehicle 100 in certain applications that would not be suitable for a UTV. By way of example, the vehicle 100 may be used in a defense application to transport a large number of passengers (e.g., 8, 9, 10, 11, 12, etc. passengers) to an off-road location. By way of another example, the vehicle 100 may be used in construction, firefighting, rescue, defense, agriculture, and event management applications when transporting a large payload to an off-road location.

Figure 10:
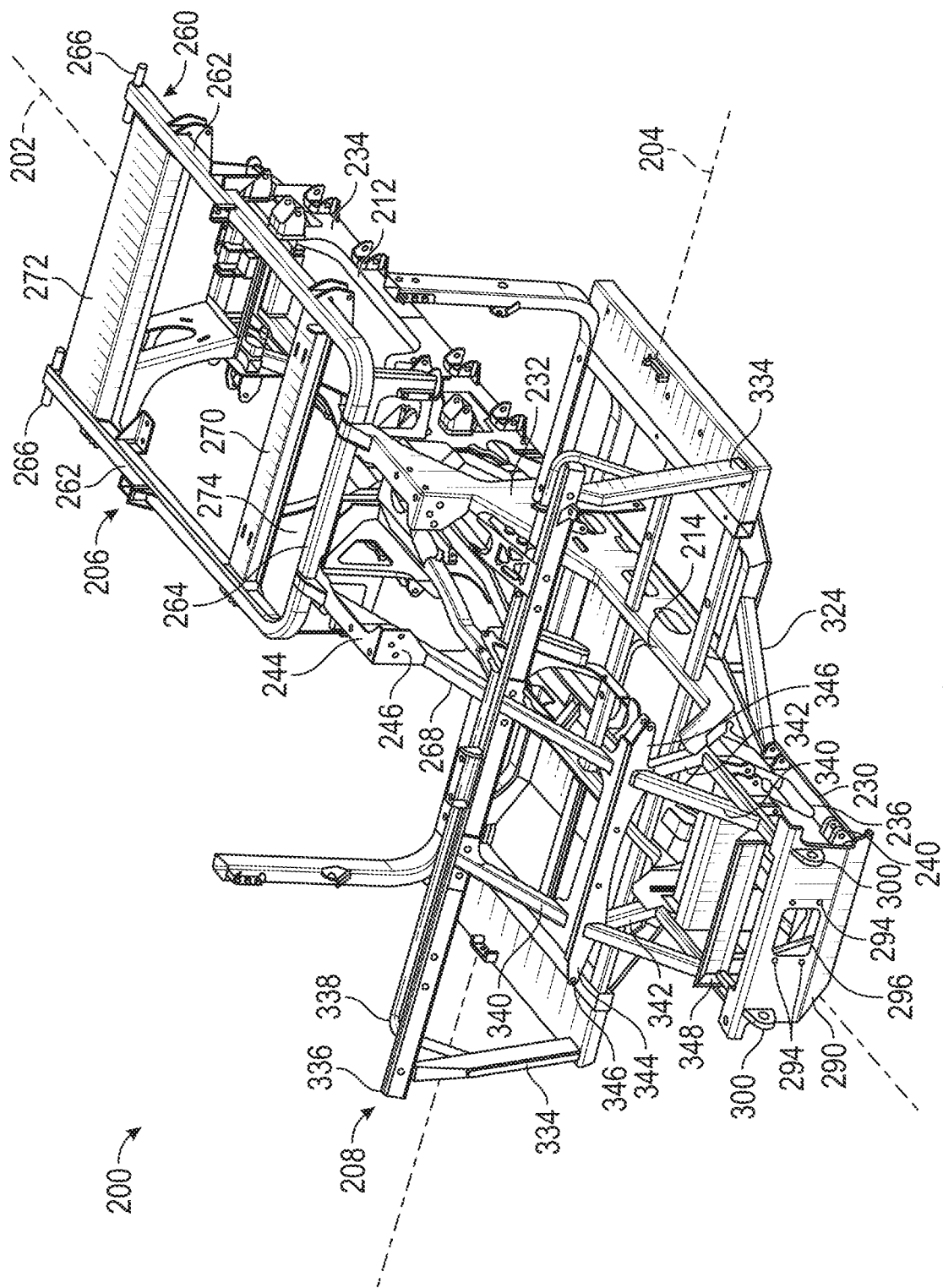
FIG. 10 is a top front perspective view of the frame of FIG. 9, according to an exemplary embodiment.

As shown in FIGS. 10 and 12, the side panels 230 extend between the lower rails 212 and the front upper rails 214 near a front end of the frame 200. The side panels 230 each define an aperture 236 configured to receive a component (e.g., the front axle 110). A pair of lower mounting brackets, shown as suspension mounts 240, and a pair of upper mounting brackets, shown as suspension mounts 242 extend laterally outward from each side panel 230. The suspension mounts 240 may be coupled to the side panels 230, may be coupled to the lower rail 212, and/or may extend across the frame 200 and couple to one another (e.g., such that two suspension mounts 240 form a continuous cross member). The suspension mounts 242 may be coupled to the side panels 230, may be coupled to the front upper rail 214, and/or may extend across the longitudinal axis 202 and couple to one another (e.g., such that two suspensions mounts 242 form a continuous cross member). The suspension mounts 240 and the suspension mounts 242 each define apertures to facilitate rotatably coupling a component of the suspension system 1600 (e.g., a control arm, etc.) to the frame 200.

A portion of each side panel 232 extends along the corresponding front upper rail 214 forward of the fourth longitudinal position 220. From there, each side panel 232 extends rearward of the third longitudinal position 219, where each side panel 232 connects with the corresponding lower rail 212 and the corresponding rear upper rail 216. Near the first longitudinal position 217, each side panel 232 extends above the front upper rail 214 and the rear upper rail 216 and bends inward, forming a substantially horizontal flange or tab 244 and a substantially vertical flange or tab 246. The tabs 244 and the tabs 246 increase the resistance of the frame rails 210 to bending, thereby increasing the payload capacity of the frame 200. In some embodiments, each tab 244 is coupled to the corresponding tab 246. The tab 244 and the tab 246 may additionally facilitate coupling other components to the frame 200. By way of example, the tabs 244 and/or the tabs 246 may be fastened to the rear module 600.

The side panels 234 extend between the first longitudinal position 217 and a rear end of the frame 200. In some embodiments, each side panel 234 (e.g., the side panel 234 associated with a particular frame rail 210) is made from a single piece of material. In other embodiments, each side panel 234 is made up of multiple pieces of material (e.g., to minimize material waste during manufacturing). Near the first longitudinal position 217, each side panel 234 extends above the rear upper rail 216 and bends inward, forming a substantially vertical flange or tab 248. The tabs 248 increase the resistance of the frame rails 210 to bending, thereby increasing the payload capacity of the frame 200. The tabs 248 may be coupled to other components of the frame 200 (e.g., the support member 260, etc.) or other subsystems of the vehicle 100 (e.g., the rear module 600, etc.). A plurality of (e.g., 2, 4, etc.) lower mounting brackets, shown as suspension mounts 250, and a plurality of (e.g., 2, 4, etc.) upper mounting brackets, shown as suspension mounts 252 extend laterally outward from each side panel 234. The suspension mounts 250 may be coupled to the side panels 234 and/or the lower rail 212. As shown in FIG. 9, each suspension mount 250 extends across the longitudinal axis 202 (e.g., such that two opposing suspensions mounts 250 form a continuous cross member). The suspension mounts 252 may be coupled to the side panels 234 and/or the rear upper rail 216. In some embodiments, the suspension mounts 252 may extend across the longitudinal axis 202 (e.g., such that two opposing suspensions mounts 252 form a continuous cross member). The suspension mounts 250 and the suspension mounts 252 each define apertures to facilitate rotatably coupling a component of the suspension system 1600 (e.g., a control arm) to the frame 200. In embodiments that only include one rear axle, one or more of the suspension mounts 250 and/or the suspension mounts 252 may be omitted.

As shown in FIGS. 9 and 10, the frame 200 includes a tubular member, shown as support member 260. The support member 260 may be configured to support the rear module 600. The support member 260 may cooperate with lower rails 212 to support components of the powertrain 800 (e.g., an engine, etc.). In some embodiments, the frame 200 is configured to support multiple different engines (e.g., different sizes, different shapes, etc.). The support member 260 includes a pair of longitudinal portions 262 extending parallel to the longitudinal axis 202 and a lateral portion 264 extending parallel to lateral axis 204 and coupled to the longitudinal portions 262. Accordingly, the support member 260 forms a "U-shape." The longitudinal portions 262 are disposed laterally outside of the frame rails 210 and extend between a rear end of the frame 200 and the first longitudinal position 217. Near a rear end, each longitudinal portion 262 defines an aperture that receives a pin 266. The pins 266 extend laterally from both sides of each longitudinal portion 262. The pins 266 may be configured to couple (e.g., rotatably, pivotally, etc.) the rear module 600 to the frame 200.

As shown in FIGS. 9 and 10, the lateral portion 264 is received by and coupled to the side panels 232 and the side panels 234. The frame 200 further includes a pair of tubular members, shown as braces 268. The braces 268 extend between the lateral portion 264 and the location where the front upper rail 214 and the rear upper rail 216 meet (e.g., at the second longitudinal position 218). The braces 268 couple at least one of the front upper rail 214 and the rear upper rail 216 to the lateral portion 264. The frame 200 further includes a first plate or tubular member, shown as cross member 270, and a second plate or tubular member, shown as cross member 272. The cross member 270 and the cross member 272 extend laterally between the longitudinal portions 262. In some embodiments, the cross member 270 and the cross member 272 couple the longitudinal portions 262 together. The cross member 270 is longitudinally offset forward of the cross member 272. In some embodiments, the support member 260, the cross member 270, and/or the cross member 272 are substantially level with one another to facilitate evenly distributing load from the rear module 600.

As shown in FIGS. 9 and 10, the frame 200 further includes a pair of bent sheet components, shown as vertical supports 274. The vertical supports 274 extend between the frame rails 210 and the support member 260. The vertical supports 274 extend to a top surface of the corresponding lower rail 212. Each side panel 234 extends along a surface of the corresponding vertical support 274 that faces laterally outward. In some embodiments, each rear upper rail 216 extends to the corresponding vertical support 274. Accordingly, each vertical support 274 may be coupled to the corresponding lower rail 212, the corresponding rear upper rail 216, and/or the corresponding side panel 234. Each vertical support 274 extends along an underside of the cross member 270 and the corresponding longitudinal portion 262. In some embodiments, each vertical support 274 extends along a side of the corresponding longitudinal portion 262 that faces laterally outward. Accordingly, each vertical support 274 may be coupled to one or both of the cross member 270 and the support member 260. The frame 200 further includes a tubular member, shown as cross member 276, that extends between and couples to both of the vertical supports 274.

Figure 14:
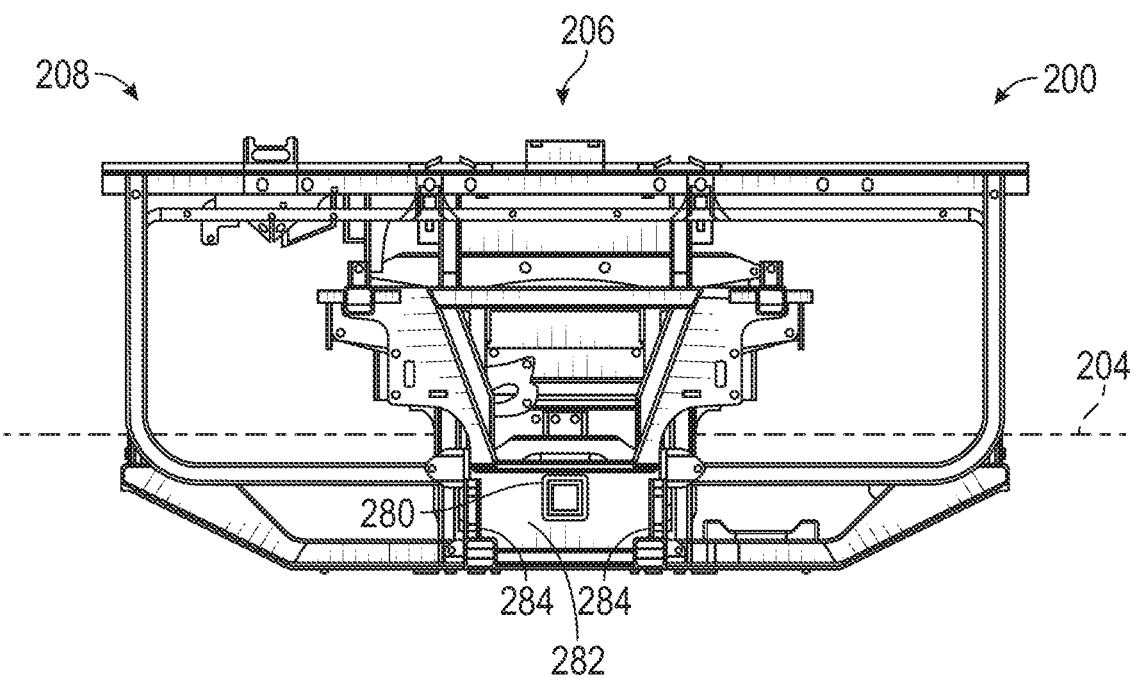
FIG. 14 is a rear view of the frame of FIG. 9, according to an exemplary embodiment.
Figure 15:
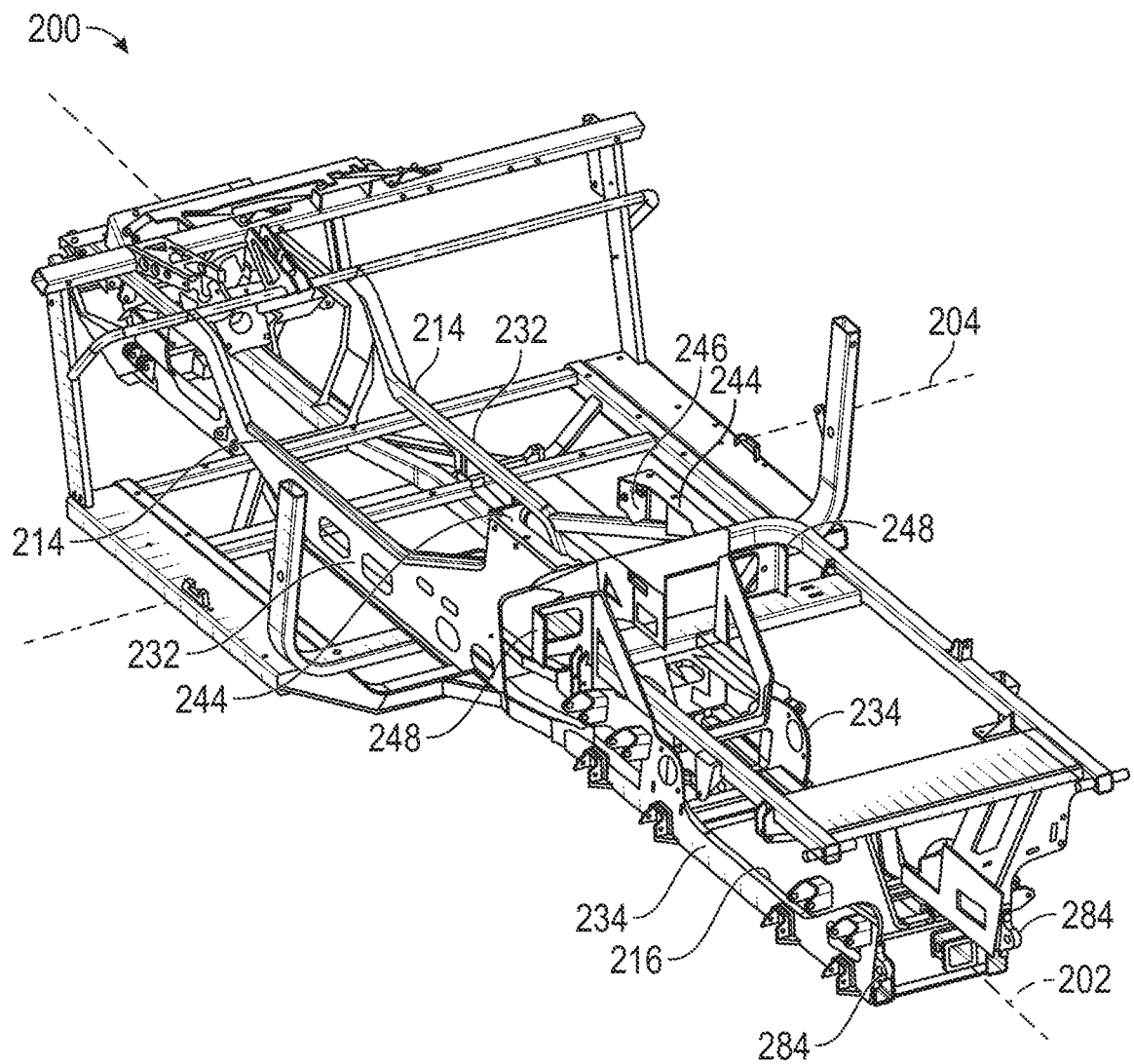
FIG. 15 is a top rear perspective view of the frame of FIG. 9, according to an exemplary embodiment.
Figure 16:
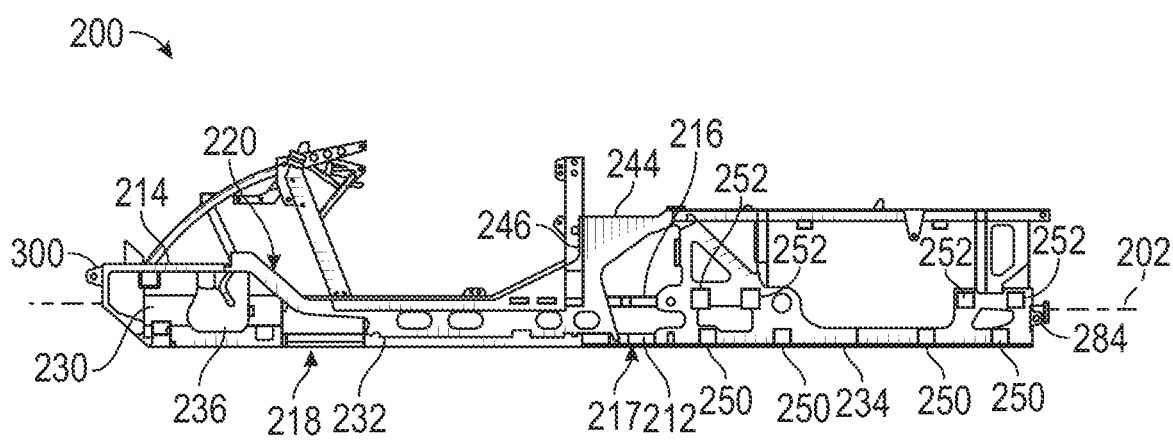
FIG. 16 is a side view of the frame of FIG. 9, according to an exemplary embodiment.

As shown in FIGS. 9 and 14, the frame 200 further includes an attachment mechanism, shown as hitch receiver 280. The hitch receiver 280 is a tubular member configured to receive an adapter (e.g., a ball mount, a pintle hook, etc.) to connect a trailer to the frame 200. The hitch receiver 280 may be configured (e.g., sized, etc.) to receive an adapter of standard size. The hitch receiver 280 may include one or more apertures configured to receive a pin to couple an adapter to the hitch receiver 280. In some embodiments, the hitch receiver 280 is configured to support a greater towing capacity than that of a UTV. In one embodiment, the hitch receiver 280 has a towing capacity of at least 2,500 pounds. In some embodiments, the hitch receiver 280 has a towing capacity of more than 1,000 pounds (e.g., 1,250, 1,500, 2,000, 2,500, 3,000, etc. pounds). The hitch receiver 280 is received by a plate or bent sheet component, shown as hitch plate 282. The hitch plate 282 is coupled to the hitch receiver 280 and at least one of the lower rails 212 and the side panels 234 such that the hitch plate 282 distributes a load on the hitch receiver 280 between the frame rails 210. The hitch plate 282 is located near the rear end of the frame 200.

As shown in FIG. 9, the frame 200 further includes a pair of attachment members or tow eyes, shown as tie downs 284. Each tie down 284 may be included in the corresponding frame rail 210. The tie downs 284 are located between the hitch plate 282 and the side panels 234. The tie downs 284 may be coupled to the hitch plate 282, to the corresponding side panel 234, and/or to the corresponding lower rail 212. The tie downs 284 each define an aperture configured to receive an attachment device (e.g., a hook, a chain, a rope, a cable, a strap, etc.). The tie downs 284 facilitate connecting the vehicle 100 to another object (e.g., while the vehicle 100 tows the other object, while the other object transports or tows the vehicle 100, etc.). By way of example, a user may attach another vehicle to the vehicle 100 by hooking a strap into the tie downs 284 (e.g., to apply a force to an immobilized vehicle). By way of another example, a user may tie ropes through the tie downs 284 to secure the vehicle 100 onto a trailer of another vehicle for transport. In some embodiments, the tie downs 284 are configured to conform to one or more standards (e.g., MIL-209).

As shown in FIG. 9, the frame 200 further includes a tubular member, shown as cross member 286, and a pair of bent sheet components, shown as vertical supports 288. The cross member 286 extends between both of the side panels 234 near the rear of the frame 200. The cross member 286 may be coupled to one or more of the lower rail 212, the side panel 234, and the hitch plate 282. The cross member 286 is offset longitudinally forward of the hitch plate 282, and a top surface of the cross member 286 is substantially level with a top surface of the hitch plate 282. The vertical supports 288 extend between the hitch plate 282, the cross member 286, and the support member 260. The vertical supports 288 rest on a top surface of the hitch plate 282 and a top surface of the cross member 286. Each vertical support 288 may be coupled to the corresponding side panel 234, the hitch plate 282, and/or the cross member 286. Each vertical support 288 extends along an underside of the cross member 272 and an underside of the corresponding longitudinal portions 262. Each vertical support 288 extends along a side of the cross member 272 that faces rearward and along a side of each longitudinal portion 262 that faces laterally outward. Accordingly, each vertical support 288 may be coupled to one or both of the cross member 272 and the support member 260.

Figure 13:
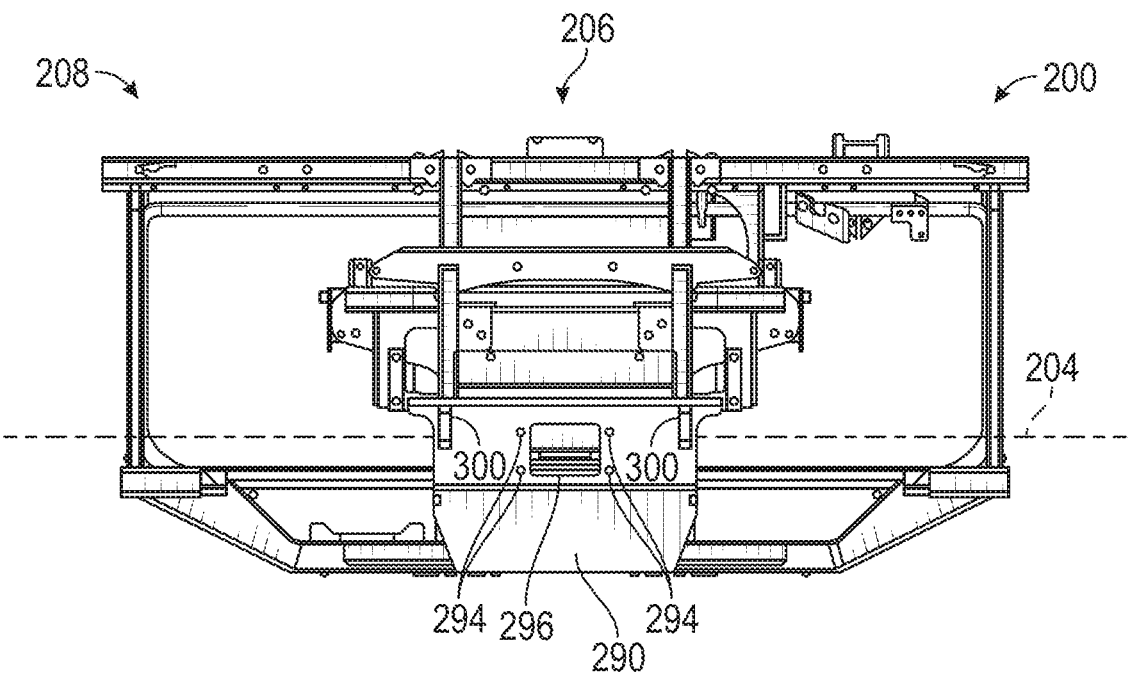
FIG. 13 is a front view of the frame of FIG. 9, according to an exemplary embodiment.

As shown in FIGS. 10 and 13, the frame 200 further includes a bent sheet component, shown as winch panel 290. The winch panel 290 is located near the front end of the frame 200. The winch panel 290 extends along a top side of the front upper rails 214, along a front side of the front upper rails 214 and the lower rails 212, and along an underside of the lower rails 212. Accordingly, the winch panel 290 may be coupled to the front upper rails 214 and/or the lower rails 212. As shown in FIG. 1, the winch panel 290 is configured to support a winch 292. The winch 292 is configured to apply a retracting force on a tensile member (e.g., a cable, a rope, a chain, etc.). As shown in FIG. 13, the winch panel 290 defines a number of apertures 294 configured to receive fasteners that couple the winch 292 to the winch panel 290. As shown in FIG. 13, the winch panel 290 further defines an aperture 296 located between the apertures 294. A first portion of the winch 292 (e.g., a drum, a motor, a gearbox, a spool of cable, etc.) is disposed inside of the frame 200 (e.g., along a rear, inner surface of the winch panel 290) and a second portion of the winch 292 (e.g., a bearing portion, etc.) is disposed outside of the frame 200 (e.g., along a front, outer surface of the winch panel 290). Accordingly, the tensile member of the winch 292 extends from the first portion of the winch 292 through the aperture 296 where an operator may access the tensile member. The winch 292 is configured to apply a retracting force to the tensile member in a substantially longitudinal direction. Advantageously, an arrangement where the winch 292 is disposed inside of the frame 200 facilitates a reduction in overall length of the vehicle 100 when compared to a conventional arrangement where a winch is disposed entirely or almost entirely outside the frame. In some embodiments, the winch 292 is disposed entirely forward of the winch panel 290 such that the winch 292 is disposed entirely outside of the frame 200.

As shown in FIGS. 10 and 12, the frame 200 further includes a pair of attachment members or tow eyes, shown as tie downs 300. Each tie down 300 may be included in the corresponding frame rail 210. The tie downs 300 are located at the front end of each frame rail 210 and extend through apertures in the winch panel 290. The tie downs 300 are located laterally inward of the side panels 230. The tie downs 284 may be coupled to the winch panel 290, to the corresponding side panel 230, to the corresponding lower rail 212, and/or to the corresponding rear upper rail 216. The tie downs 300 each define an aperture configured to receive an attachment device (e.g., a hook, a chain, a rope, a cable, a strap, etc.). The tie downs 300 facilitate connecting the vehicle 100 to another object (e.g., while the vehicle 100 tows the other object, while the other object transports or tows the vehicle 100, etc.). By way of example, a user may attach another vehicle to the vehicle 100 by hooking a strap into the tie downs 300 (e.g., to apply a force to an immobilized vehicle). By way of another example, a user may tie ropes through the tie downs 300 to secure the vehicle 100 onto a trailer of another vehicle for transport. In some embodiments, the tie downs 300 are configured to conform to one or more standards (e.g., MIL-209).

In some embodiments, the frame 200 is modular and has a width that is selectively variable to provide various vehicle configurations (e.g., different widths based on customer needs, etc.). The frame 200 is shown in a first configuration in FIGS. 9-19 and in a second configuration in FIGS. 20-22. It should be understood, however, that the frame 200 may be reconfigurable into yet other configurations. FIG. 23 shows both configurations of the frame 200 overlaid atop one another. The central portion 206 of the frame 200 is mostly unchanged between the two configurations. Each configuration of the frame 200 includes a different cab portion 208. Utilizing a common central portion 206 facilitates customizing the vehicle 100 to the needs of a specific customer while minimizing the number of different assemblies that are manufactured. By way of example, using the same frame rails 210 and the same spacing between the frame rails 210 throughout the different configurations of the frame 200 may facilitate using many of the same components in the various configurations for the other subsystems of the vehicle 100 (e.g., the powertrain 800, the suspension system 1600, etc.) throughout each configuration.

As shown in FIG. 23, the first configuration has a width $W_A$ and the second portion has a width $W_B$. The widths $W_A$ and $W_B$ as used herein may be the overall width of the frame 200 between outermost points on each lateral side of the frame 200. The width $W_A$ is larger than the width $W_B$. In some embodiments, the width $W_A$ is greater than 65 inches (e.g., at least 72 inches, etc.). In some embodiments, the width $W_B$ is at least 60 inches, but less than 65 inches. The greater width of the first configuration may facilitate placing an additional passenger in the cab 400 (e.g., for a total of 3 passengers in the cab 400).

As shown in FIG. 23, both the first configuration and the second configuration have the same length L. The length L as used herein may be the overall length of the frame 200 between outermost points on each longitudinal side of the frame 200. The length remains constant between the first configuration and the second configuration, as the length L is defined by components of the central portion 206 that do not change between the first configuration and the second configuration (e.g., the tie downs 300 and the support member 260).

As shown in FIGS. 9-19, the frame 200 is in the first configuration. In the first configuration, the cab portion 208 of the frame 200 includes a pair of bent sheet components, tubular members, or plates, shown as floor supports 320. The floor supports 320 extend longitudinally along the length of the cab 400 and are located proximate a lateral side of the cab 400. The floor supports 320 are located directly below the level of the floor in the cab 400. Accordingly, an upper surface of each floor support 320 may be substantially level with the upper surfaces of the front upper rails 214 and the rear upper rails 216. The floor supports 320 may be coupled to and support a floor surface of the cab 400. Each floor support 320 is coupled to the central portion 206 of the frame 200 by a pair of tubular members, shown as lateral supports 322. The lateral supports 322 extend from the corresponding lower rail 212 to an underside of the corresponding floor support 320. The lateral supports 322 are each coupled to a lateral side of the corresponding lower rail 212. To further support the cab portion 208, the central portion 206 includes a first pair of tubular members, shown as braces 324, and a second pair of tubular members, shown as braces 326. The braces 324 and the braces 326 are included in both configurations of the frame 200. The braces 324 extend forward of the front lateral supports 322 and couple the front lateral supports 322 to the corresponding lower rail 212. The braces 326 extend rearward of the rear lateral supports 322 and couple the rear lateral supports to the corresponding lower rail 212.

Figure 17:
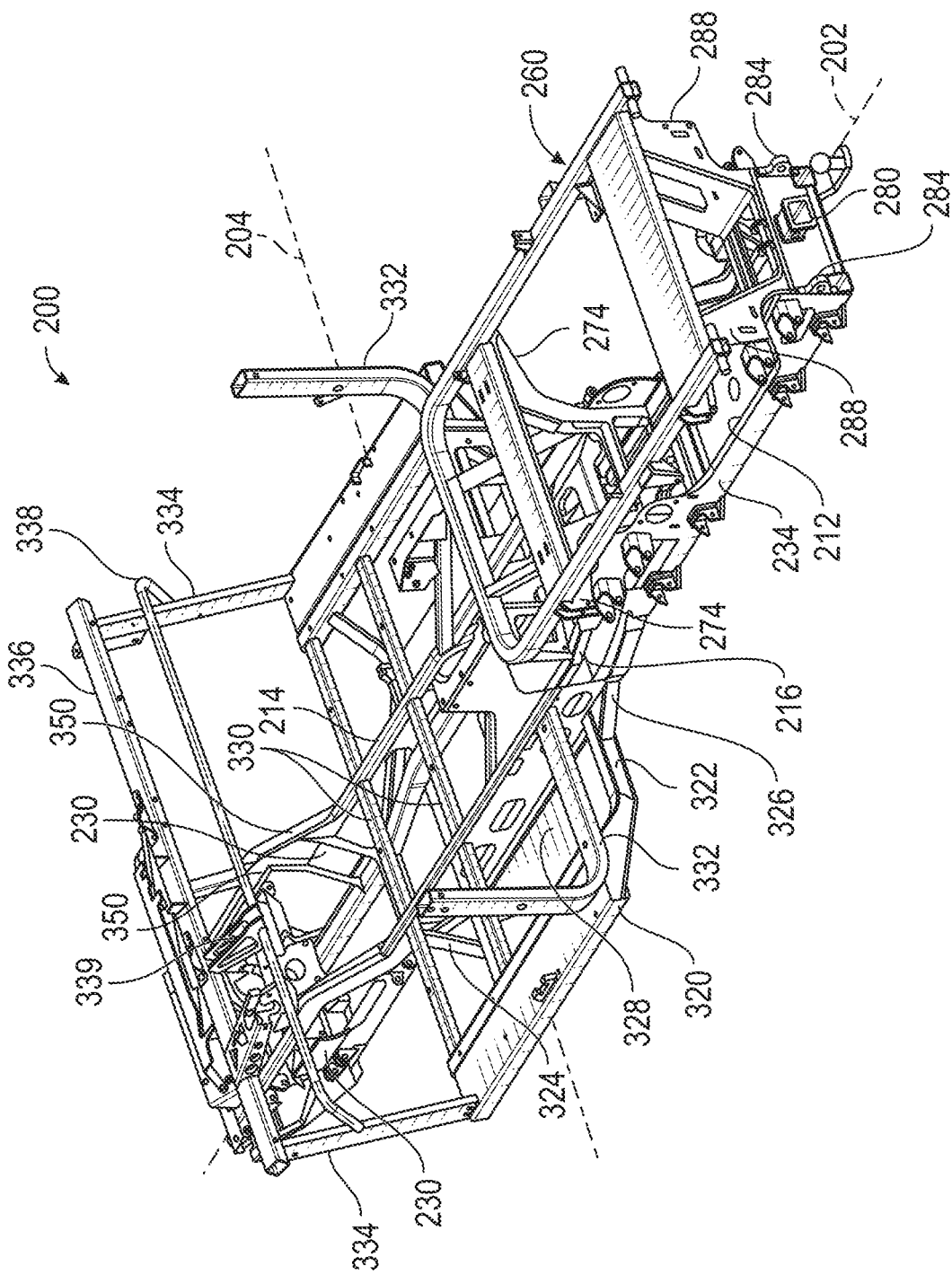
FIG. 17 is a top rear perspective view of the frame of FIG. 9, according to an exemplary embodiment.

As shown in FIGS. 9 and 17, in the first configuration, the cab portion 208 further includes a plate or sheet component, shown as floor pan 328. Each floor pan 328 extends along an underside of the corresponding lateral supports 322 and the corresponding floor support 320. Each floor pan 328 may be coupled to the corresponding floor support 320, the corresponding lateral supports 322, and/or the corresponding lower rail 212. In some embodiments, the floor pans 328 support a fuel tank and/or a battery. The cab portion 208 further includes multiple tubular members, shown as cross members 330. A pair of cross members 330 extend between and couple each floor support 320 and the corresponding front upper rail 214. Another pair of cross members 330 extend between and couple the front upper rails 214 and are in line with the other cross members 330. In some embodiments, the cross members 330 are replaced with a pair of cross members 330 that extend between and couple the floor supports 320. In some embodiments, a pair of cross members 330 extend between the floor supports 320, coupling the floor supports 320 to the front upper rails 214. The cross members 330 are located directly below the level of the floor in the cab 400. Accordingly, an upper surface of each cross member 330 may be substantially level with the upper surfaces of the front upper rails 214.

As shown in FIGS. 9 and 17, in the first configuration, the cab portion 208 further includes a pair of tubular members, shown as rear cab supports 332. The rear cab supports 332 are located near a rear end of the floor supports 320. Each rear cab support 332 extends laterally outward (e.g., substantially horizontally) from the corresponding rear upper rail 216. An upper surface of each rear cab support 332 may be substantially level with upper surfaces of the floor supports 320 and upper surfaces of the front upper rails 214 and the rear upper rails 216. A portion of each floor support 320 is cut away such that the floor support 320 receives the corresponding rear cab support 332. Each rear cab support 332 is coupled to the corresponding rear upper rail 216 and to the corresponding floor support 320. Above the corresponding floor support 320, the rear cab supports 332 bend upward such that the rear cab supports 332 each include a substantially vertical portion. In some embodiments, the substantially vertical portion is directly coupled to a vertical support member of the cab 400.

As shown in FIGS. 9 and 17, in the first configuration, the cab portion 208 further includes tubular members, shown as front cab supports 334. The front cab supports 334 are each coupled to the corresponding floor support 320 near a front side and a laterally outward side of the corresponding floor support 320. Each front cab support 334 extends upward and forward from the corresponding floor support 320. A tubular member, shown as cross member 336, extends laterally along the width of the cab 400. The cross member 336 is coupled to a top end portion of each front cab support 334. In some embodiments, the cross member 336 is the widest portion of the frame 200 such that the cross member 336 defines the width $W_A$. Another tubular member, shown as cross member 338, extends laterally between the front cab supports 334. The cross member 338 is coupled to both of the front cab supports 334 near the vertical midpoint of each front cab support 334. The cross member 338 includes a first portion and a second portion that each extend upward from one of the front cab supports 334. A third portion of the cross member 338 couples the first portion and the second portion. A bracket 339 extends between and couples the cross member 336 and the cross member 338. The cross member 336 and the cross member 338 may be configured to support various components of the cab 400 or other subsystems of the vehicle 100. By way of example, a windshield of the cab 400 may be coupled to the cross member 336. By way of another example, a dashboard of the cab 400 may partially surround and/or couple to the cross member 336 and/or the cross member 338. By way of another example, the cross member 336 may be coupled to a steering wheel of the steering assembly 1400 (e.g., with a bracket).

Figure 18:
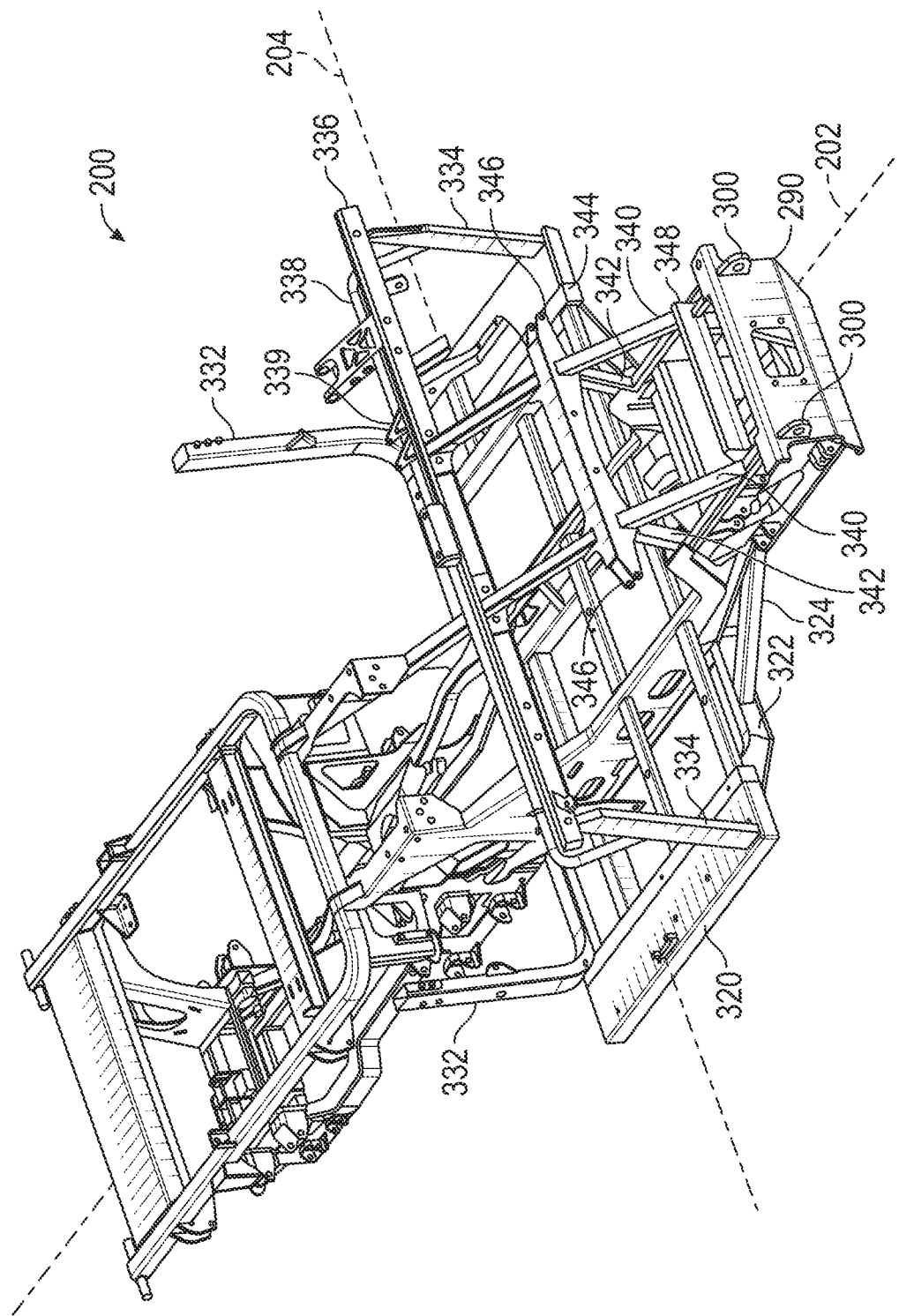
FIG. 18 is a top front perspective view of the frame of FIG. 9, according to an exemplary embodiment.
Figure 19:
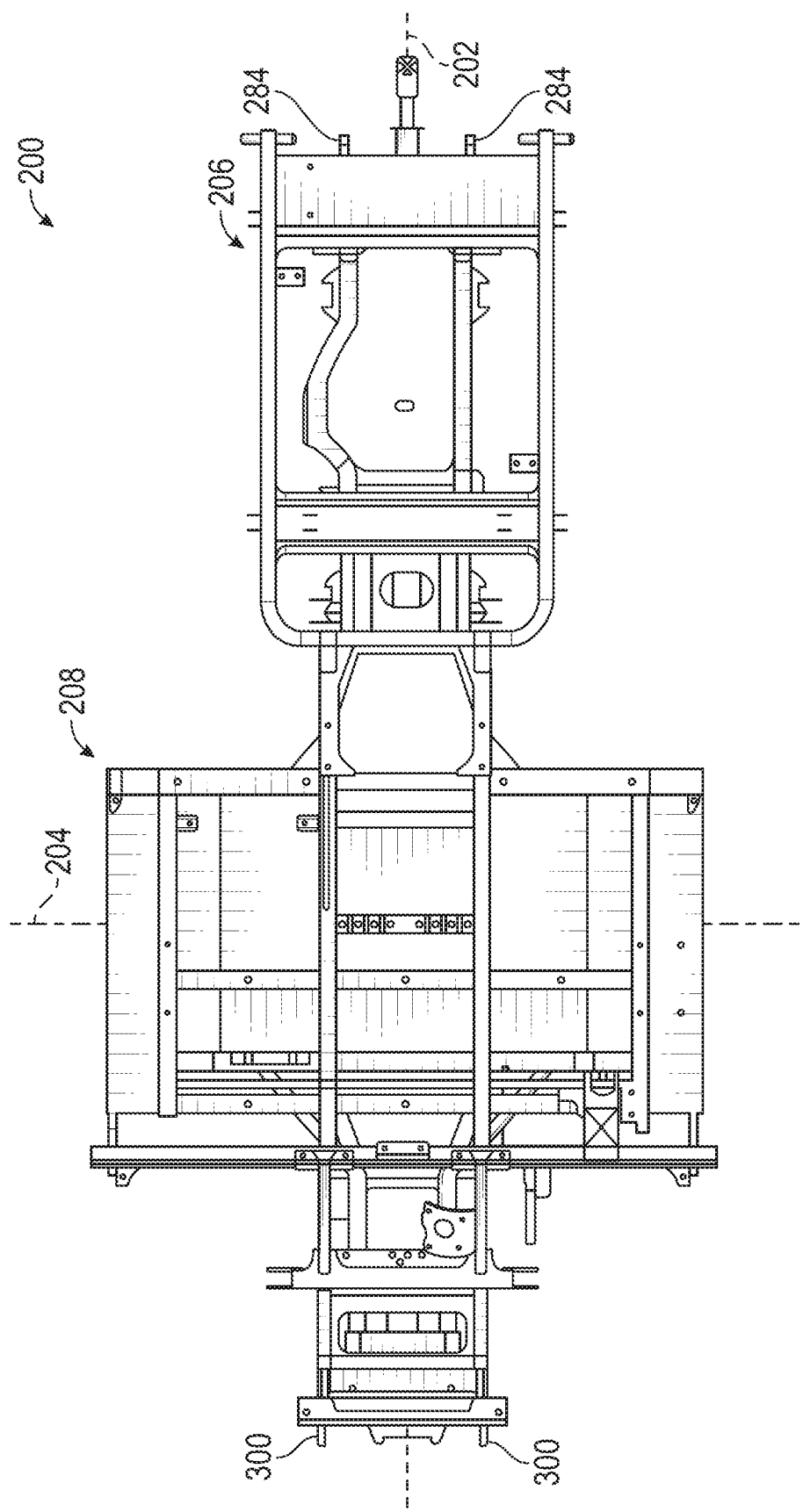
FIG. 19 is a top view of the frame of FIG. 9, according to an exemplary embodiment.

As shown in FIGS. 10, 12, and 18, in the first configuration, the cab portion 208 further includes a first set of tubular members, shown as bracing members 340, and a second set of tubular members, shown as bracing members 342. Each bracing member 340 extends between and is coupled to the cross member 336 and the corresponding front upper rail 214. Each bracing member 342 extends between and is coupled to the corresponding front upper rail 214 and the corresponding bracing member 340. A bent sheet component, shown as cross brace 344, is coupled to each of the bracing members 340 and the bracing members 342. The cross brace 344 couples the bracing member 340 and the bracing member 342 on one lateral side of the frame 200 to the bracing member 340 and the bracing member 342 on the other lateral side of the frame 200. The cross brace 344 extends laterally beyond the bracing members 340 and the bracing members 342 to form a bracket, shown as suspension mount 346, on each side of the frame 200. The suspension mounts 346 each define apertures to facilitate rotatably coupling a component of the suspension system 1600 (e.g., a shock absorber, etc.) to the frame 200. The cab portion 208 further includes a bent sheet component, shown as cross brace 348. The cross brace 348 extends between and couples to the front upper rails 214.

As shown in FIGS. 9 and 17, in the first configuration, the frame 200 further includes sheet components, shown as braces 350. The braces 350 extend along inner surfaces of the corresponding side panels 230 and the front upper rail 214. The braces 350 are coupled to the side panels 230 and to the front upper rails 214. In some embodiments, one or more of the suspension mounts 250 change size, shape, and/or position between the first configuration and the second configuration.

Figure 20:
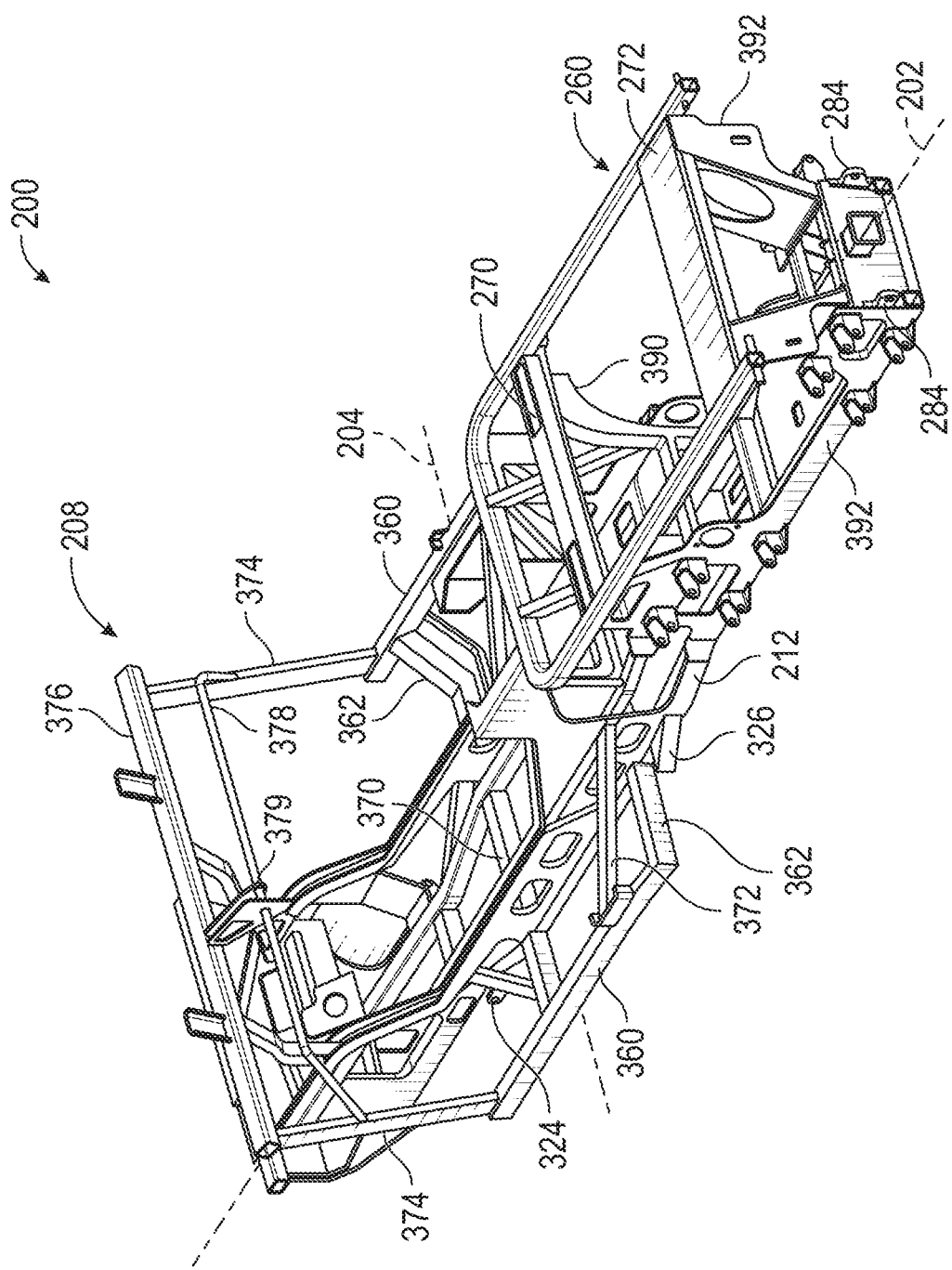
FIG. 20 is a top rear perspective view of a frame of the vehicle of FIG. 1, according to another exemplary embodiment.
Figure 21:
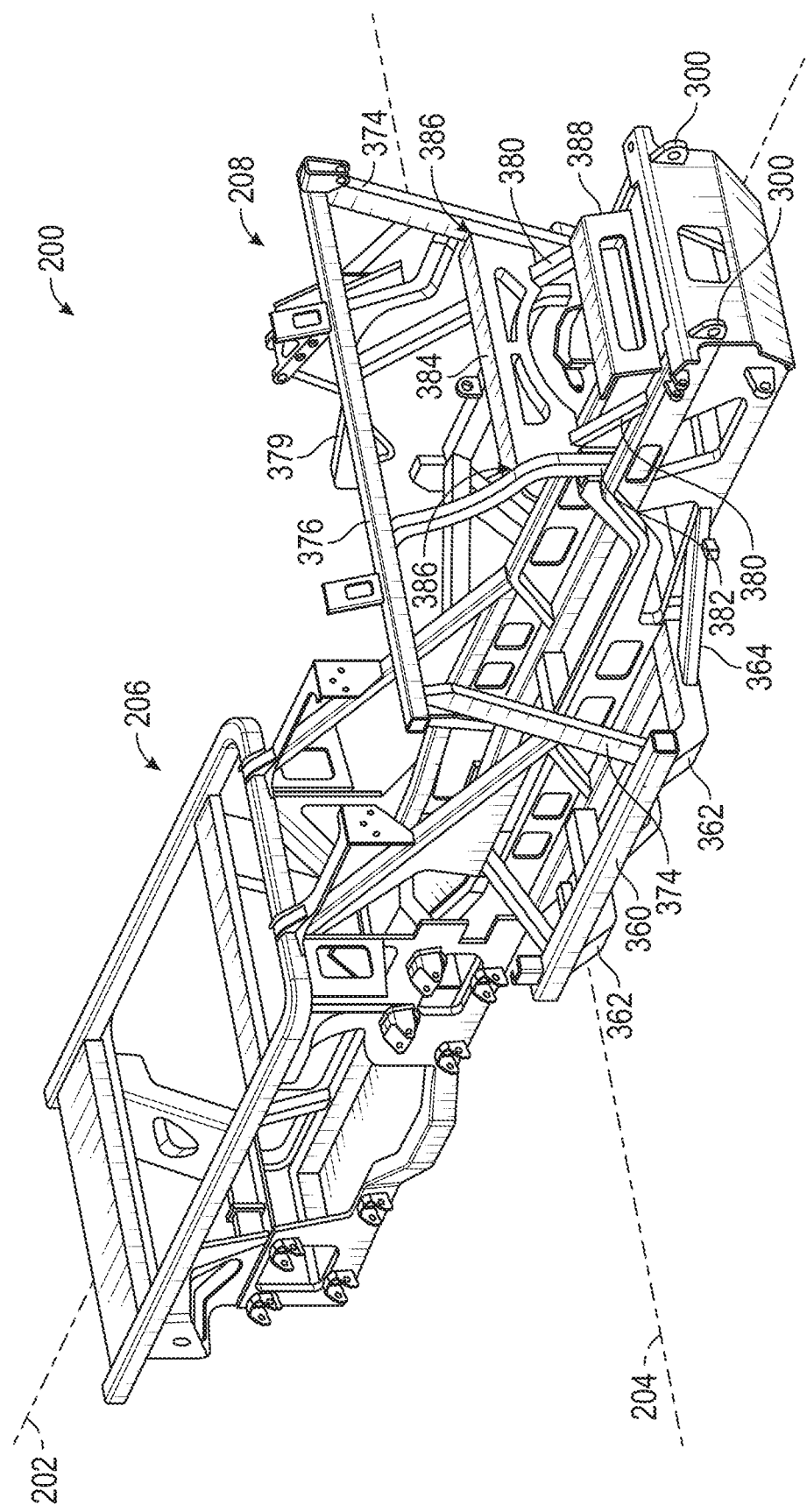
FIG. 21 is a top front perspective view of the frame of FIG. 20, according to an exemplary embodiment.
Figure 22:
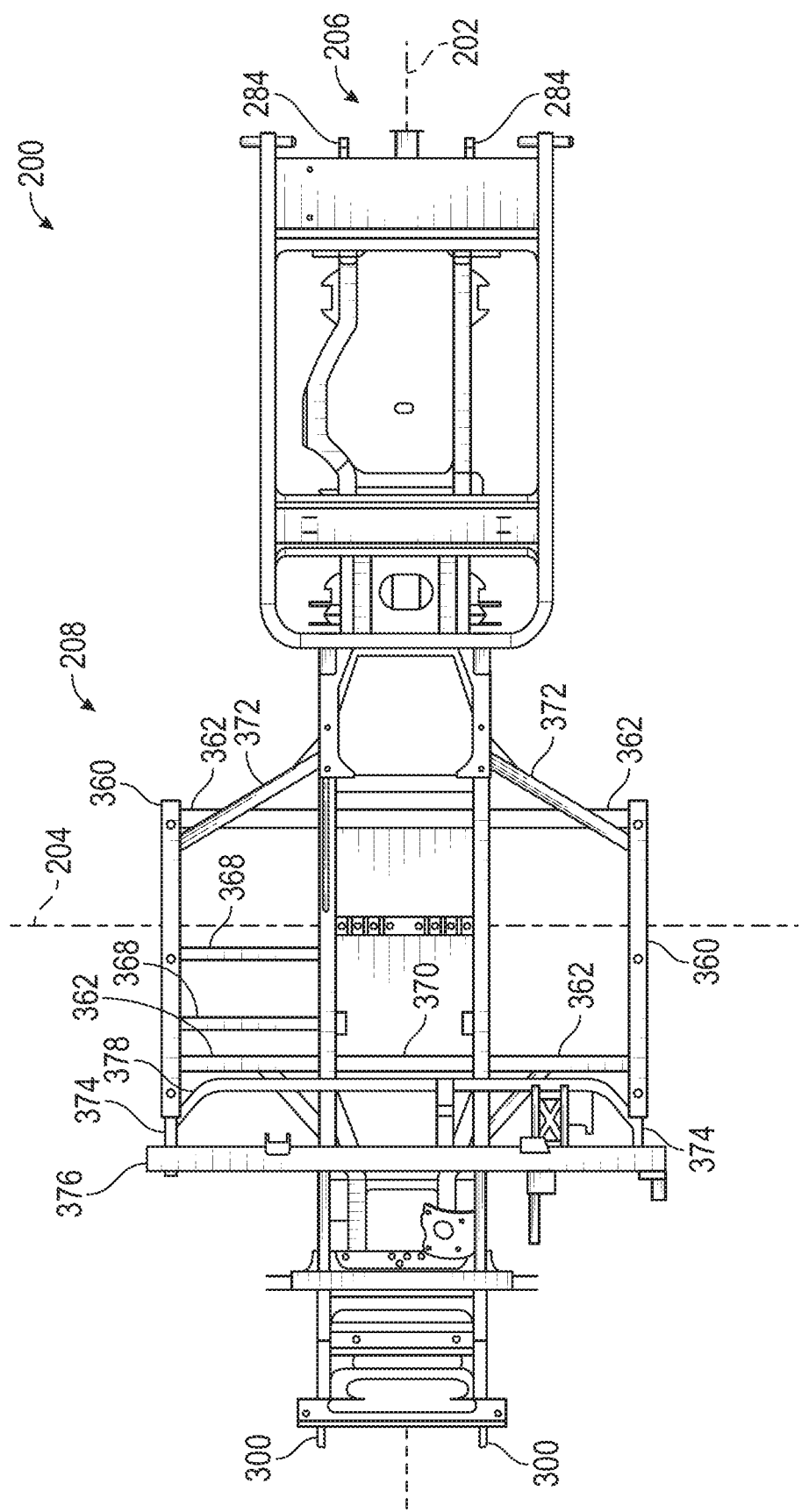
FIG. 22 is a top view of the frame of FIG. 20, according to an exemplary embodiment.
Figure 23:
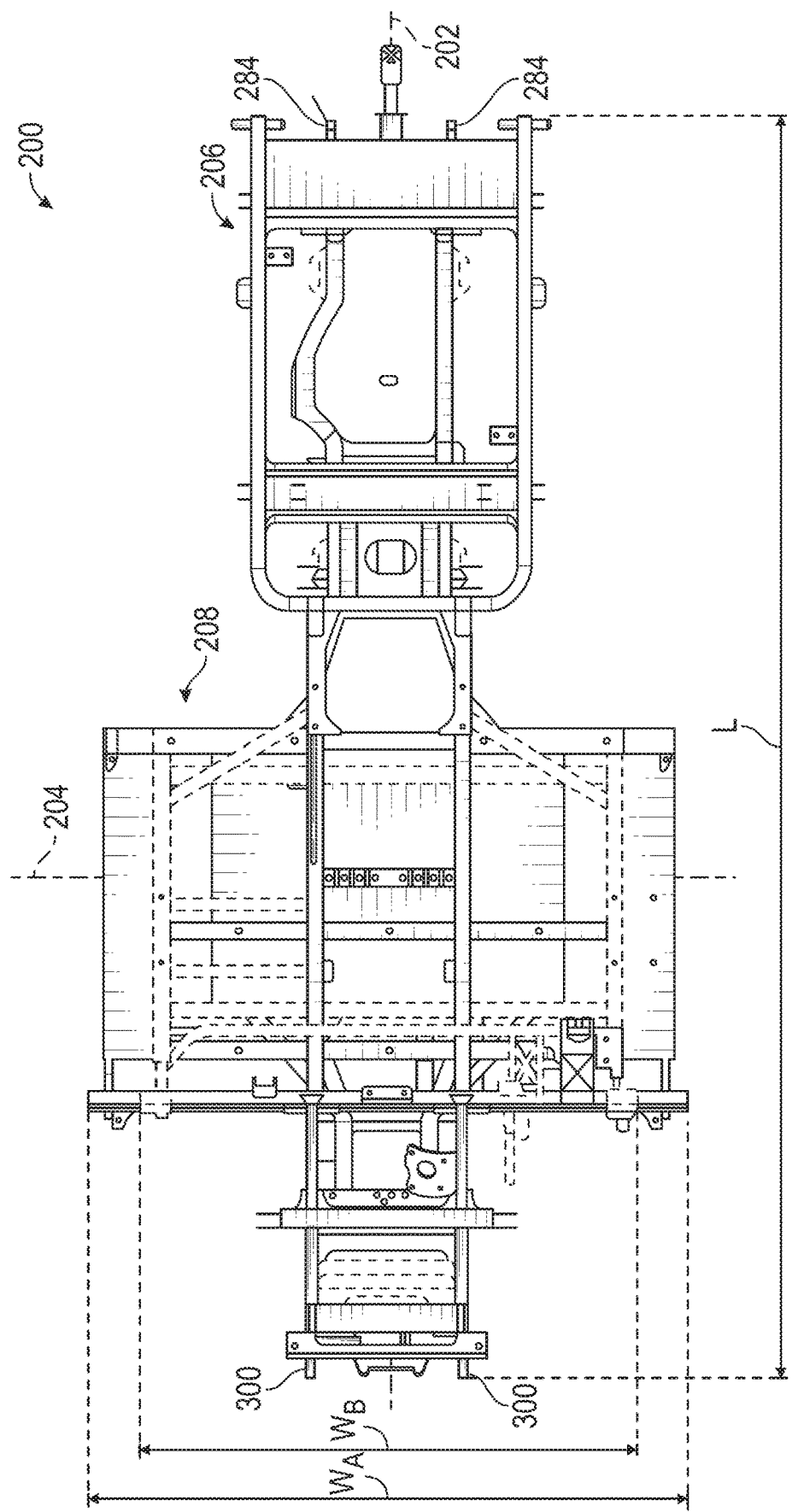
FIG. 23 is a top view of the frame of FIG. 20 overlaid on the frame of FIG. 9, according to an exemplary embodiment.

As shown in FIGS. 20-22, the frame 200 is in the second configuration. In the second configuration, the cab portion 208 of the frame 200 includes a pair of tubular members, shown as floor supports 360. The floor supports 360 extend longitudinally along the length of the cab 400 and are located proximate a lateral side of the cab 400. The floor supports 360 are located directly below the level of the floor in the cab 400. Accordingly, an upper surface of each floor support 360 may be substantially level with the upper surfaces of the front upper rails 214 and the rear upper rails 216. The floor supports 360 may be coupled to and support a floor surface of the cab 400. Each floor support 360 is coupled to the central portion 206 of the frame 200 by a pair of tubular members, shown as lateral supports 362. The lateral supports 362 extend from the corresponding lower rail 212 to an underside of the corresponding floor support 360. The lateral supports 362 are each coupled to a lateral side of the corresponding lower rail 212. The braces 324 extend forward of the front lateral supports 362 and couple the front lateral supports 362 to the corresponding lower rail 212. The braces 326 are offset rearward of the rear lateral supports 322 such that the braces 326 do not couple to the rear lateral supports 362.

As shown in FIG. 22, in the second configuration, the cab portion 208 further includes one or more tubular members, shown as accessory braces 368, and a tubular member, shown as cross member 370. The accessory braces 368 extend between and are coupled to the lower rail 212 and the floor support 360 on one side of the longitudinal axis 202. In other embodiments, the accessory braces 368 are located on either or both sides of the longitudinal axis 202. In some embodiments, the accessory braces 368 support the fuel tank and/or the battery. The cross member 370 extends between and couples to the lower rails 212. As shown in FIG. 22, the cross member 370 is in line with the front lateral supports 362. In some embodiments, the cross member 370 and the front lateral supports 362 are formed from a single continuous piece of material.

As shown in FIG. 20, in the second configuration, the cab portion 208 further includes a pair of tubular members, shown as rear cab supports 372. The rear cab supports 372 are located near a rear end of the floor supports 360. Each rear cab support 372 extends forward and laterally outward (e.g., substantially horizontally) from the corresponding rear upper rail 216. An upper surface of each rear cab support 372 may be substantially level with upper surfaces of the floor supports 360 and upper surfaces of the rear upper rails 216. Each rear cab support 372 is coupled to the corresponding rear upper rail 216 and to the corresponding floor support 360.

As shown in FIG. 20, in the second configuration, the cab portion 208 further includes tubular members, shown as front cab supports 374. The front cab supports 374 are each coupled to the corresponding floor support 360 near a front end portion of the corresponding floor support 360. Each front cab support 374 extends upward and forward from the corresponding floor support 360. A tubular member, shown as cross member 376, extends laterally along the width of the cab 400. The cross member 376 is coupled to a top end portion of each front cab support 374. In some embodiments, the cross member 376 is the widest portion of the frame 200 such that the cross member 376 defines the width $W_B$. Another tubular member, shown as cross member 378, extends laterally between the front cab supports 374. The cross member 378 is coupled to both of the front cab supports 374 near the vertical midpoint of each front cab support 374. The cross member 378 includes a first portion and a second portion that each extend upward, rearward, and laterally inward from one of the front cab supports 374. A third portion of the cross member 378 couples the first portion and the second portion. A bracket 379 extends between and couples the cross member 376 and the cross member 378. The cross member 376 and the cross member 378 may be configured to support various components of the cab 400 or other subsystems of the vehicle 100. By way of example, a windshield of the cab 400 may be coupled to the cross member 376. By way of another example, a dashboard of the cab 400 may partially surround and/or couple to the cross member 376 and/or the cross member 378. By way of another example, the cross member 376 may be coupled to a steering wheel of the steering assembly 1400 (e.g., with a bracket).

As shown in FIGS. 21 and 22, in the second configuration, the cab portion 208 further includes a first set of tubular members, shown as bracing members 380, and a second set of tubular members, shown as bracing members 382. Each bracing member 380 extends between and is coupled to the cross member 376 and the corresponding front upper rail 214. Each bracing member 382 extends between and is coupled to the corresponding front upper rail 214 and the corresponding bracing member 380. A bent sheet component, shown as cross brace 384, is coupled to each of the bracing members 380 and the bracing members 382. The cross brace 384 couples the bracing member 380 and the bracing member 382 on one lateral side of the frame 200 to the bracing member 380 and the bracing member 382 on the other lateral side of the frame 200. The cross brace 384 extends laterally beyond the bracing members 380 and the bracing members 382 to form a suspension mount 386 on each side of the frame 200. The suspension mounts each define apertures to facilitate rotatably coupling a component of the suspension system 1600 (e.g., a shock absorber) to the frame 200. The cab portion 208 further includes a bent sheet component, shown as cross brace 388. The cross brace 388 extends between and couples to the front upper rails 214.

As shown in FIGS. 20 and 21, in the second configuration, the frame 200 includes a set of bent sheet components, shown as vertical supports 390. The vertical supports 390 may be substantially similar to the vertical supports 274, except the vertical supports 390 do not extend laterally to the corresponding longitudinal portion 262. Accordingly, the vertical supports 390 are coupled to the cross member 270, but are not directly coupled to the support member 260. In some embodiments, the vertical supports 390 are included in both the first configuration and the second configuration, and an additional component is coupled to each vertical support in the first configuration. This additional component extends each vertical support 390 such that the vertical supports 390 function similarly to the vertical supports 274. In the second configuration, the vertical supports 288 are replaced with vertical supports 392. The vertical supports 392 may be substantially similar to the vertical supports 288 except that the vertical supports 392 do not extend along a side of each longitudinal portion that faces laterally outward.

As described herein, the various components of the frame 200 are coupled to one another. The components of the frame 200 may be coupled to one another using various traditional coupling methods (e.g., fastening, riveting, welding, adhering, etc.). The various components of the frame 200 may be removably coupled (e.g., using fasteners, etc.) or permanently fixedly coupled (e.g., by welding, etc.). In some embodiments, the cab portion 208 is removably coupled to the central portion 206. In other embodiments, the cab portion 208 is permanently fixedly coupled to the central portion 206.

Hood and Grille Arrangement

As shown in FIGS. 1-4, 6, and 61, the vehicle 100 includes a hood, shown as hood 170, and a grille, shown as front grille 172, coupled to and positioned at a front end of the hood 170. According to an exemplary embodiment, the hood 170 is coupled (e.g., pivotally coupled, removably coupled, etc.) to the frame 200. According to an exemplary embodiment, the front grille 172 is a brush guard that is coupled directly (e.g., fixed, non-removably, etc.) to the hood 170. The hood 170 is manufactured from sheet metal, and the front grille 172 is manufactured from tubular metal, according to an exemplary embodiment. In some embodiments, the hood 170 has an outer skin that is plastic. The front grille 172 may be welded directly to the hood 170. The hood 170 and/or the front grille 172 may be made from various materials (e.g., steel, aluminum, etc.) and coupled together using various techniques (e.g., welding, fastening, etc.). As shown in FIGS. 1-4 and 6, the vehicle 100 includes a spare tractive assembly, shown as spare wheel and tire assembly 142, disposed atop the hood 170. In other embodiments, the spare wheel and tire assembly 142 is otherwise positioned on the vehicle 100 (e.g., beneath the rear module 600, etc.).

Cab Arrangement

As shown in FIGS. 1-3 and 7, the cab 400 of the vehicle 100 includes a first section, shown as front section 410, and a second section, shown as rear section 420. According to an exemplary embodiment, the width of the front section 410 of the cab 400 facilitates fitting three bucket seats laterally across the vehicle 100. In other embodiments, the width of the front section 410 of the cab 400 facilitates fitting two bucket seats laterally across the vehicle 100. As shown in FIGS. 1-3 and 7, the front section 410 includes a first front seat, shown as driver seat 440, a second front seat, shown as first passenger seat 442, and a third front seat, shown as second passenger seat 444. The driver seat 440 is in alignment with the steering wheel of the steering assembly 1400, according to an exemplary embodiment. In one embodiment, the steering wheel of the steering assembly 1400 is positioned at a left side of the cab 400 (e.g., from the perspective of a driver onboard the vehicle and looking forward, etc.) such that the driver seat 440 is positioned at the left side of the vehicle 100 with the first passenger seat 442 and the second passenger seat 444 to the right of the driver seat 440. In another embodiment, the steering wheel of the steering assembly 1400 is positioned at a right side of the cab 400 such that the driver seat 440 is positioned at the right side of the vehicle 100 with the first passenger seat 442 and the second passenger seat 444 to the left of the driver seat 440. According to an exemplary embodiment, the driver seat 440 is positioned further towards the right or left side of the vehicle 100 relative to a vehicle having only two front seats. In still another embodiment, the steering wheel of the steering assembly 1400 is positioned in the center of the cab 400 such that the driver seat 440 is positioned at the center of the vehicle 100 with the first passenger seat 442 on one side of the driver seat 440 and the second passenger seat 444 on an opposing second side of the driver seat 440.

In another embodiment, the vehicle 100 does not include the driver seat 440, the first passenger seat 442, and the second passenger seat 444. In such an embodiment, the vehicle 100 may include a front bench seat positioned laterally across the front section 410 that accommodates a driver and at least one passenger (e.g., one passenger, two passengers, etc.). In one embodiment, the rear section 420 of the cab 400 accommodates at least two passengers (two rear bucket seats, a two person rear bench seat, three rear bucket seats, a three person rear bench seat, etc.). In other embodiments, the rear section 420 of the cab 400 accommodates a longer rear module 600 such that the rear section 420 does not accommodate any passengers. The cab 400 of the vehicle 100 may thereby be modular, providing (i) a two passenger variant (e.g., only two front bucket seats, only a two person front bench seat, etc.), (ii) a three passenger variant (e.g., only three front bucket seats, only a three person front bench seat, etc.), (iii) a four passenger variant (e.g., two front bucket seats and a two person rear bench seat, a two person front bench seat and a two person rear bench seat, etc.), (iv) a five passenger variant (e.g., two front bucket seats and a three person rear bench seat, a two person front bench seat and a three person rear bench seat, three front bucket seats and a two person rear bench seat, a three person front bench seat and a two person rear bench seat, etc.), and (v) a six passenger variant (e.g., three front bucket seats and a three person rear bench seat, a three person front bench seat and a three person rear bench seat, etc.).

As shown in FIGS. 1-7, the cab 400 of the vehicle 100 includes an overhead assembly, shown as roof assembly 430. The roof assembly 430 includes a first frame portion, shown as front frame portion 432, a second frame portion, shown as rear frame portion 434, a front panel, shown as windscreen panel 436, and a top panel, shown as roof panel 438. The front frame portion 432 is positioned to support the windscreen panel 436 and the roof panel 438. The rear frame portion 434 is positioned between the front section 410 and the rear section 420 of the cab 400 to support a mid-portion of the roof panel 438. A distal end of the roof panel 438 extends beyond the rear frame portion 434 such that the roof panel 438 overhangs the rear section 420 without any supporting structure positioned at the distal end thereof. According to the exemplary embodiment shown in FIGS. 1-3, the roof panel 438 overhangs the rear section 420 in its entirety and partially overhangs the rear module 600. In other embodiments, the roof panel 438 overhangs the rear section 420 and the rear module 600 in their entireties. In still other embodiments, the roof panel 438 does not overhang the rear section 420. In yet still other embodiments, the roof panel 438 overhangs the rear section 420 in its entirety, but does not overhang any portion of the rear module 600. According to an exemplary embodiment, the windscreen panel 436 and the roof panel 438 are manufactured from sheet metal. In other embodiments, the windscreen panel 436 and the roof panel 438 are manufactured from another suitable material (e.g., plastic, etc.).

As shown in FIGS. 2, 3, 6, and 7, the cab 400 includes a dash, shown as dash 450. According to the exemplary embodiment shown in FIGS. 2, 3, 6, and 7, the dash 450 has a simplistic design including only a few nobs, buttons, gauges, and cup holders. The dash 450 is manufactured from sheet metal, according to an exemplary embodiment. In other embodiments, the dash 450 is manufactured from another suitable material (e.g., plastic, etc.).

As shown in FIGS. 1, 3 and 4, the vehicle 100 includes a light system, shown as work light system 460. A panel above the windscreen panel 436 and below the roof panel 438 defines a pair of recesses, shown as light recesses 462. Each of the light recesses 462 receives an illuminating device, shown as work lights 464. In another embodiment, the work lights 464 may be positioned elsewhere. By way of example, the work lights 464 may extend downward from the front frame portion 432 and/or the roof panel 438 into, through, and/or in front of the front section 410 of the cab 400. Such positioning of the work lights 464 reduces the risk of damage to the work light system 460 of the vehicle 100 during use. The work lights 464 thereby may not be damaged in situations that would lead to damage of vehicle headlights (e.g., lights positioned at the front of a hood, etc.).

Rear Module

According to the exemplary embodiment shown in FIGS. 24-42, the rear module 600 of the vehicle 100 is configured as a reconfigurable cargo bed module. In another embodiment, the rear module 600 of the vehicle 100 is configured as a passenger seating and litter carrying module (e.g., for military applications, etc.). In still another embodiment, the rear module 600 of the vehicle 100 is configured as a water tank module (e.g., for firefighting applications, etc.), an extended cargo bed module, or still another suitable module.

As shown in FIGS. 24-27, the rear module 600 includes a first portion, show as cargo bed 610, and a second portion (e.g., a reconfigurable module, etc.), shown as rear seating assembly 640. The rear seating assembly 640 is positioned forward of the cargo bed 610, proximate the rear section 420 of the cab 400. According to an exemplary embodiment, the rear seating assembly 640 is configured as a bench seat. The bench seat may fit one to three passengers. A front section 410 of the cab 400 may include two or three bucket seats or a bench seat. The vehicle 100 having the rear module 600 may thereby be capable of transporting up to six passengers (e.g., one, two, three, four, five, six passengers).

Figure 26:
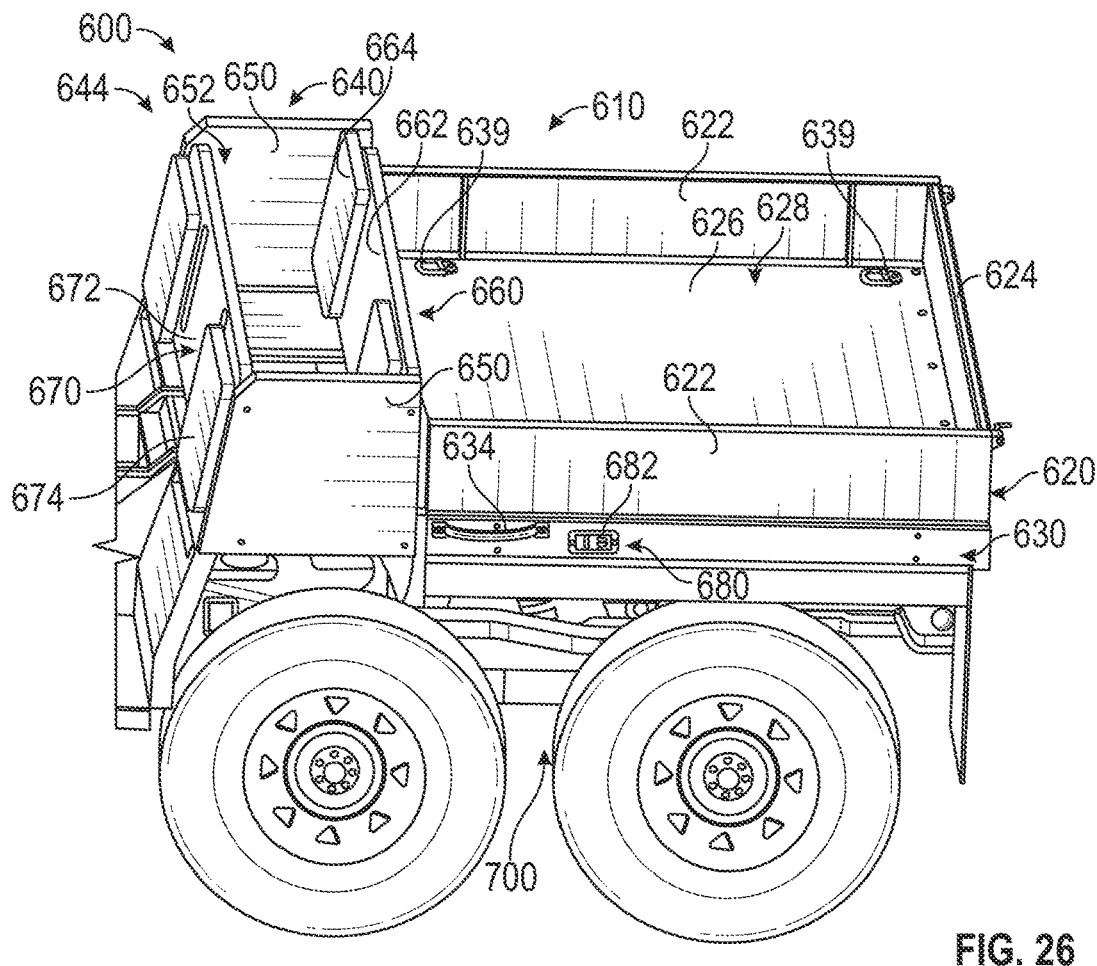
FIG. 26 is a perspective view of the first rear module of FIG. 24 in a second configuration, according to an exemplary embodiment.
Figure 27:
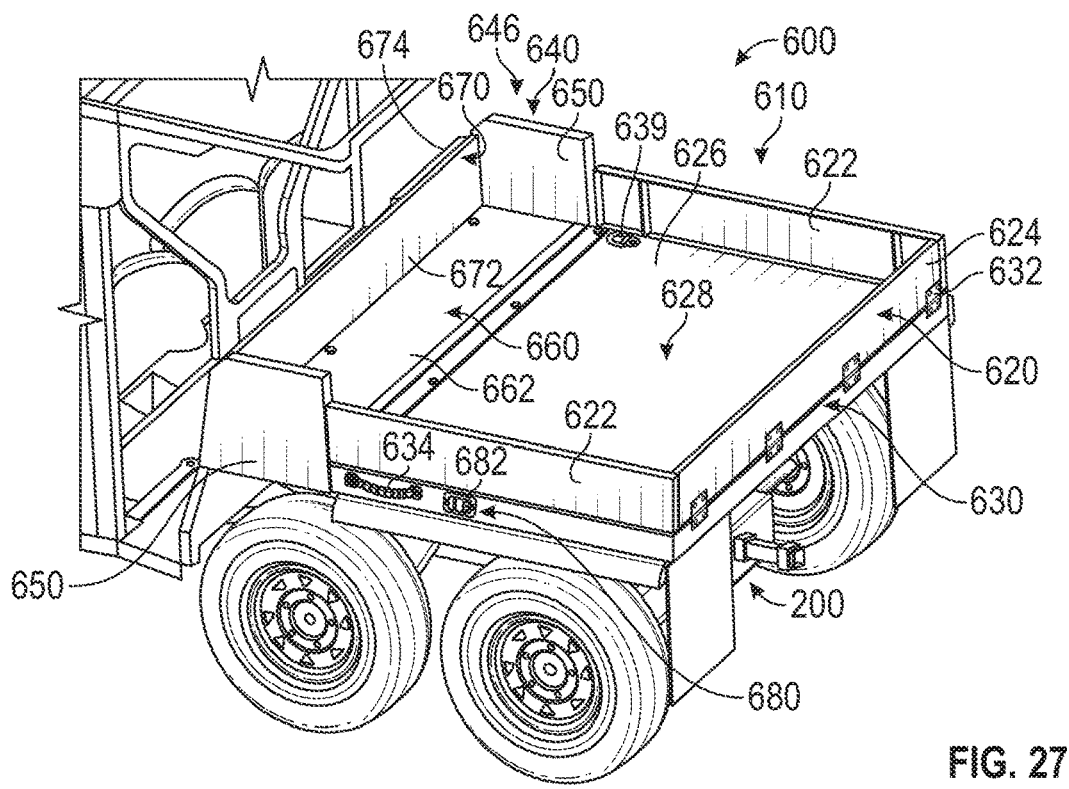
FIG. 27 is a perspective view of the first rear module of FIG. 24 in a third configuration, according to an exemplary embodiment.
Figure 30:
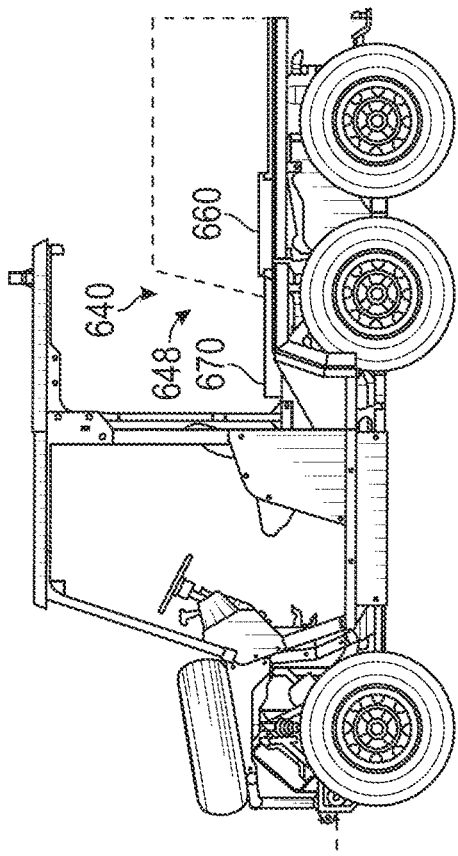
FIGS. 28-31 display a process of reconfiguring the first rear module of FIG. 24 from the first configuration to a fourth configuration, according to an exemplary embodiment.
Figure 31:
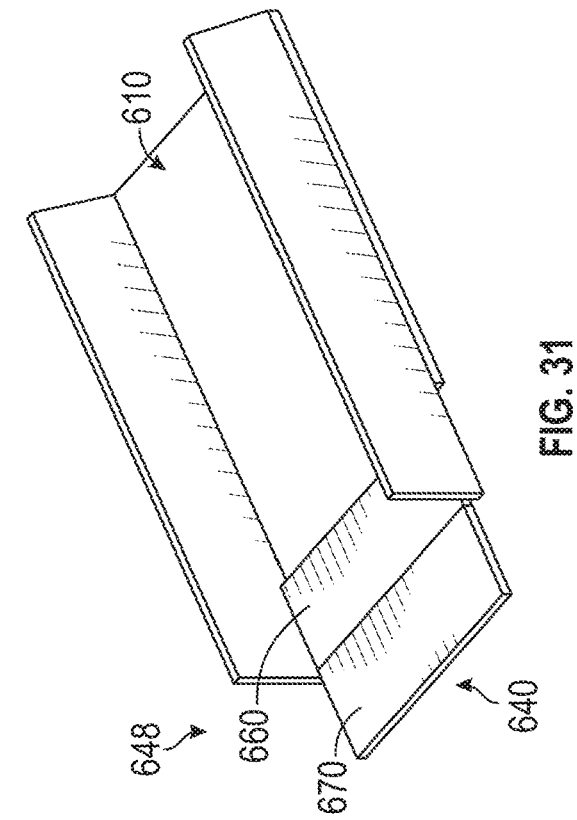
Figure 28:
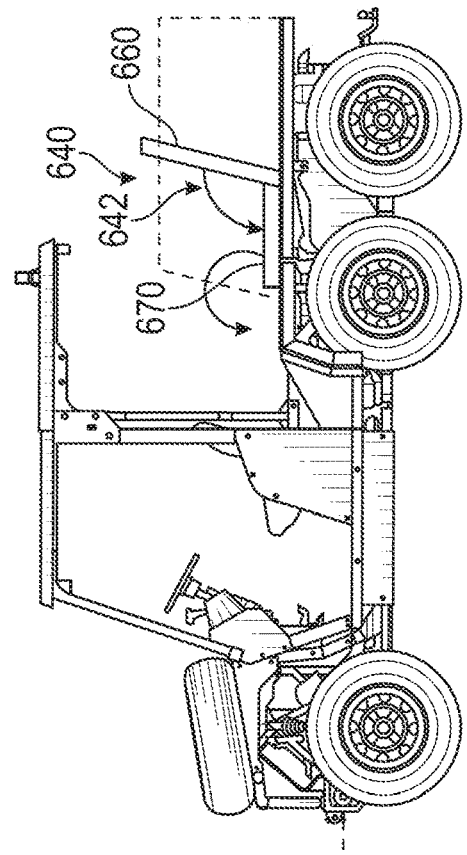
Figure 29:
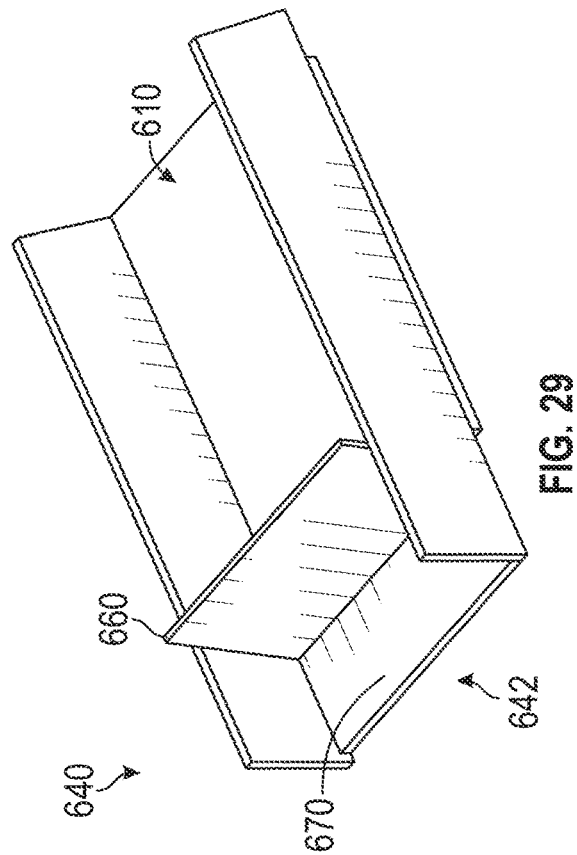

As shown in FIGS. 24-27, the cargo bed 610 includes a first portion, shown as bed 620, and a second portion, shown as base 630. The bed 620 includes a plurality of side panels, shown as side panels 622, a rear gate, shown as tailgate 624, and a floor, shown as bed floor 626. The side panels 622, the tailgate 624, and the bed floor 626 cooperatively define a cavity, shown as bed cavity 628. The bed cavity 628 may be configured to receive and hold various tools, equipment, dirt, mulch, wood, etc. that an operator of the vehicle 100 has a need to transport using the vehicle 100. As shown in FIGS. 25 and 27, the cargo bed 610 includes pivotal members, shown as hinges 632, that pivotally couple the tailgate 624 to the base 630 at the rear of the vehicle 100. The hinges 632 facilitate selectively opening and closing the tailgate 624 to access the bed cavity 628. As shown in FIGS. 25-27, the bed 620 includes attachment or anchor points, shown as tie-downs 639, directly coupled to the bed floor 626 within the bed cavity 628. In one embodiment the tie-downs 639 are flush mounted to the bed floor 626. In some embodiments, the tie-downs 639 are swiveling tie-downs. The tie-downs 639 may be configured to meet one or more standards (e.g., MIL-209, etc.).

As shown in FIGS. 24-27, the rear seating assembly 640 includes sidewalls, shown as side panels 650, positioned at opposing lateral ends of the rear seating assembly 640; a back portion, shown as seat back 660; and a bottom portion, shown as seat bottom 670. According to an exemplary embodiment, the side panels 650 are fixed to the vehicle 100 (e.g., the side panels 650 do not pivot, slide, or otherwise move, etc.). The seat back 660 includes a first plate, shown as back plate 662, and a first cushion, shown as back cushion 664, coupled to a front face of the back plate 662. In some embodiments, the back cushion 664 is a single, continuous cushion that extends the length of the back plate 662. In other embodiments, the back cushion 664 includes a plurality of cushions (e.g., two, three, etc.) spaced along the back plate 662. The seat bottom 670 includes a second plate, shown as seat plate 672, and a second cushion, shown as seat cushion 674, coupled to a top face of the seat plate 672. In some embodiments, the seat cushion 674 is a single, continuous cushion that extends the length of the seat plate 672. In other embodiments, the seat cushion 674 includes a plurality of cushions (e.g., two, three, etc.) spaced along the seat plate 672. The back cushion 664 and the seat cushion 674 may be selectively detachable from the back plate 662 and the seat plate 672, respectively. According to an exemplary embodiment, the back cushion 664 and the seat cushion 674 are manufactured from closed cell foam with a backer that does not hold water. In other embodiments, the back cushion 664 and the seat cushion 674 are manufactured from another type of foam and covered with a waterproof cover.

According to an exemplary embodiment, the back plate 662 of the seat back 660 and the seat plate 672 of the seat bottom 670 are pivotally coupled to and selectively rotationally fixed to the side panels 650 of the rear seating assembly 640. As shown in FIGS. 24 and 25, the rear seating assembly 640 is arranged in a first configuration, shown as seating configuration 642. In the seating configuration 642, (i) the back plate 662 of the seat back 660 is pivotally locked in an upright position such that the seat back 660 is the headrest of the cargo bed 610, separating the bed cavity 628 from the rear section 420 of the cab 400, and (ii) the seat plate 672 of the seat bottom 670 is either pivotally locked (i.e., restricted from pivoting) or loose (i.e., free to pivot) in a down position. The rear seating assembly 640 is configured to accommodate passengers (e.g., one, two, or three passengers, etc.) while the rear seating assembly 640 is arranged in the seating configuration 642.

As shown in FIG. 26, the rear seating assembly 640 is arranged in a second, intermediate configuration, shown as mid-ship storage configuration 644. In the mid-ship storage configuration 644, (i) the back plate 662 of the seat back 660 is pivotally locked in an upright position and (ii) the seat plate 672 of the seat bottom 670 is pivotally locked in an upright position. The side panels 650, the back plate 662, and the seat plate 672 of the rear seating assembly 640 are configured to provide a storage compartment, shown as mid-ship storage compartment 652, that may hold tools, equipment, etc. while the rear seating assembly 640 is arranged in the mid-ship storage configuration 644. The mid-ship storage configuration 644 may be achieved by pivoting the seat plate 672 forward from the down position to the upright position when the rear seating assembly 640 is arranged in the seating configuration 642.

As shown in FIG. 27, the rear seating assembly 640 is arranged in a third configuration, shown as extended bed configuration 646. In the extended bed configuration 646, (i) the back plate 662 of the seat back 660 is either pivotally locked or loose in a down position such that the back plate 662 becomes part of the bed floor 626 and (ii) the seat plate 672 of the seat bottom 670 is pivotally locked in an upright position such that the seat plate 672 becomes the extended headrest of the cargo bed 610. The side panels 650, the back plate 662, and the seat plate 672 of the rear seating assembly 640 are configured to extend the bed cavity 628 of the bed 620, and the seat plate 672 is positioned to separate the extended bed cavity 628 from the rear section 420 of the cab 400 while the rear seating assembly 640 is arranged in the extended bed configuration 646. The extended bed configuration 646 may be achieved by pivoting the back plate 662 forward from the upright position to the down position when the rear seating assembly 640 is arranged in the mid-ship storage configuration 644.

As shown in FIGS. 28-31, in some embodiments, the rear seating assembly 640 is reconfigurable from the seating configuration 642 to a fourth configuration, shown as second extended bed configuration 648. In the second extended bed configuration 648, (i) the back plate 662 of the seat back 660 is either pivotally locked or loose in a down position such that the back plate 662 becomes part of the bed floor 626 and (ii) the seat plate 672 of the seat bottom 670 is either pivotally locked or loose in a down position such that the seat plate 672 becomes part of the bed floor 626, extending the bed cavity 628 further than when the rear seating assembly 640 is arranged in the extended bed configuration 646. The second extended bed configuration 648 may be achieved by pivoting the seat plate 672 forward from the upright position to the down position when the rear seating assembly 640 is arranged in the extended bed configuration 646.

As shown in FIGS. 32-35, in an alternative embodiment, the rear seating assembly 640 is reconfigurable from the seating configuration 642 to a fifth configuration, shown as third extended bed configuration 654. In the third extended bed configuration 654, (i) the back plate 662 of the seat back 660 is slidably locked in an upright position such that the back plate 662 becomes the extended headrest of the cargo bed 610 and (ii) the seat plate 672 of the seat bottom 670 is fixed in a down position such that the seat plate 672 becomes part of the bed floor 626. The third extended bed configuration 654 may be achieved by sliding the back plate 662 forward over the seat bottom 670 when the rear seating assembly 640 is arranged in the seating configuration 642.

As shown in FIGS. 36-39, in another alternative embodiment, the rear seating assembly 640 is reconfigurable from the seating configuration 642 to a sixth configuration, shown as fourth extended bed configuration 656. In the fourth extended bed configuration 656, (i) the seat plate 672 of the seat bottom 670 is pivotally locked in an upright position and (ii) the back plate 662 of the seat back 660 and the seat plate 672 of the seat bottom 670 are slidably locked in an upright position such that the back plate 662 becomes the extended headrest of the cargo bed 610. The fourth extended bed configuration 656 may be achieved by pivoting the seat plate 672 backward from the down position to the upright position and sliding both the back plate 662 and the seat plate 672 forward when the rear seating assembly 640 is arranged in the seating configuration 642. In another embodiment, the seat plate 672 is configured to be pivoted forward from the down position to the upright position and then the back plate 662 is slid forward to abut the seat plate 672.

Figure 40:
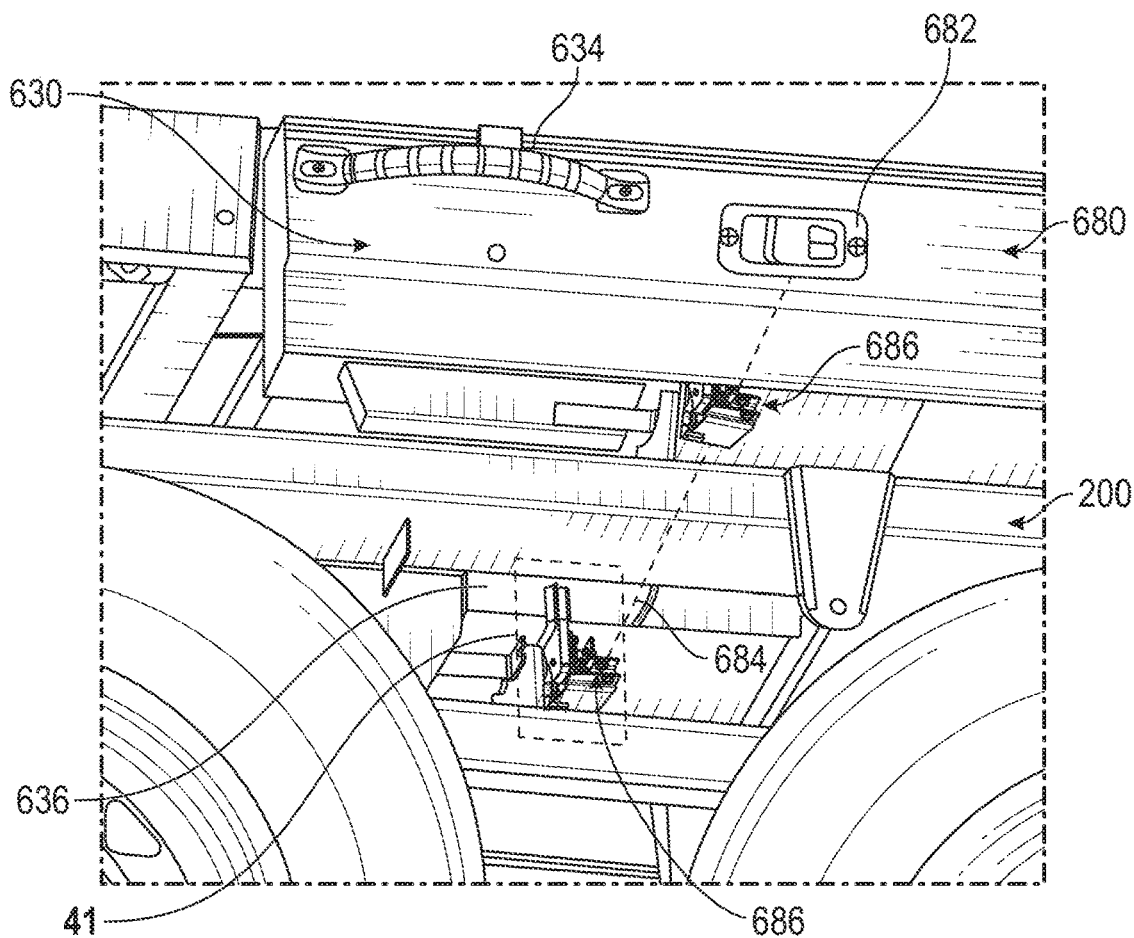
FIGS. 40 and 41 are detailed views of a latch system of the first rear module of FIG. 24, according to an exemplary embodiment.
Figure 42:
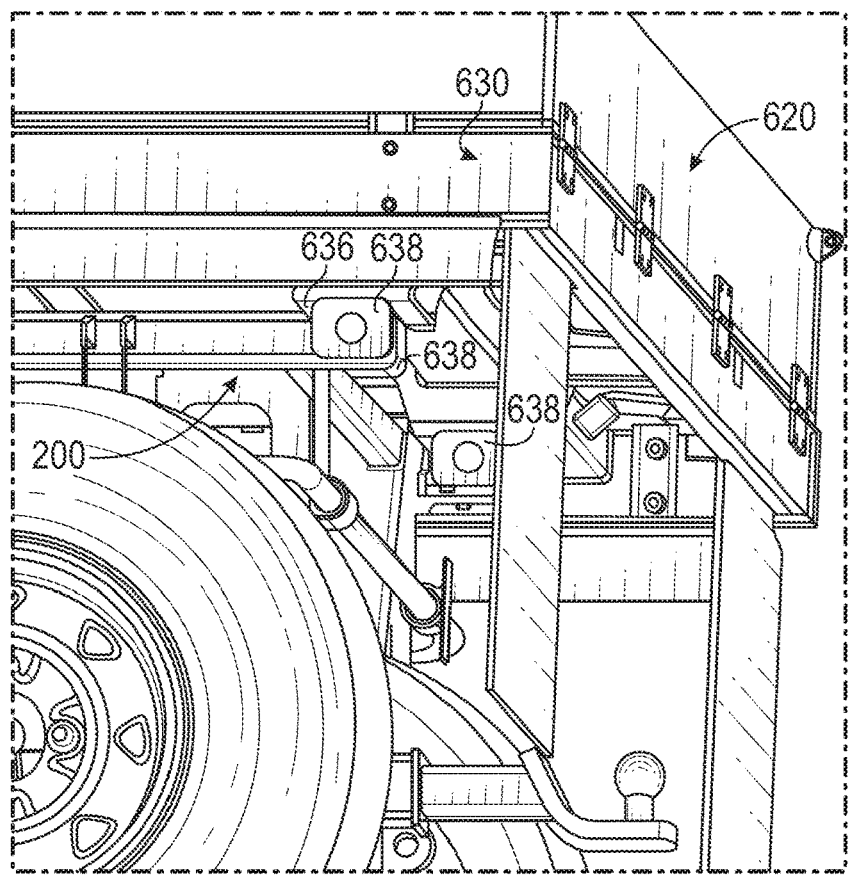
FIG. 42 is a detailed view of a pivot system of the first rear module of FIG. 24, according to an exemplary embodiment.

As shown in FIGS. 40 and 42, the base 630 of the cargo bed 610 includes a frame, shown as underframe 636. As shown in FIG. 42, the underframe 636 of the base 630 includes pivotal couplers, shown as pivot blocks 638, coupled thereto. The pivot blocks 638 are positioned to pivotally couple the underframe 636 of the base 630 to the frame 200. According to the exemplary embodiment shown in FIG. 42, the base 630 includes four pivot blocks 638, two coupled to each frame rail of the frame 200. Having two pivot blocks 638 coupled to each frame rail facilitates carrying greater load with and dumping such loads from the cargo bed 610. In other embodiments, the base 630 includes a different number of pivot blocks 638 (e.g., one, two, three, six, etc.). As shown in FIGS. 24-27 and 40, the base 630 includes a pair of handles, shown as handles 634, configured to assist an operator in pivoting the cargo bed 610 about the pivot blocks 638. In some embodiments, the vehicle 100 does not include the handles 634. In some embodiments, the cargo bed 610 includes an actuator (e.g., a hydraulic actuator, a pneumatic actuator, an electric actuator, etc.) configured to lift, lower, and/or prop the cargo bed 610.

Figure 41:
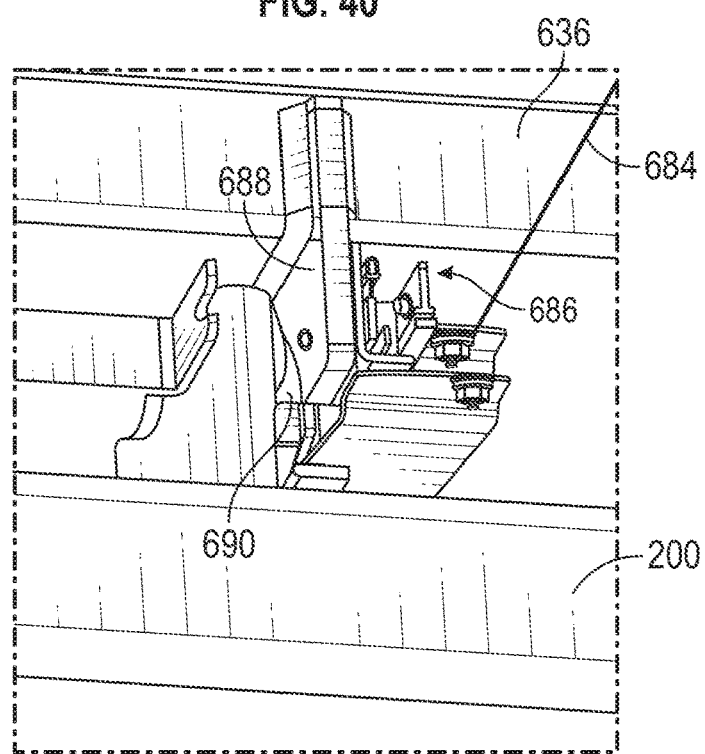

As shown in FIGS. 26, 27, 40, and 41, the cargo bed 610 includes a securing mechanism, shown as locking mechanism 680, configured to lock the base 630 to the frame 200 such that the cargo bed 610 does not inadvertently pivot about the pivot blocks 638. As shown in FIGS. 26, 27, and 40, the locking mechanism 680 includes an actuator, shown as lever 682. In other embodiments, the actuator is a push button. As shown in FIG. 40, the lever 682 is coupled to a cable, shown as actuation cable 684. As shown in FIGS. 40 and 41, the actuation cable 684 extends from the lever 682 to a pair of latch mechanisms, shown as latches 686, positioned on opposing sides of the base 630 to secure the underframe 636 of the base 630 to the frame 200. In other embodiments, the locking mechanism 680 only includes one latch 686. According to an exemplary embodiment, the latches 686 are rotary latches.

As shown in FIG. 41, the underframe 636 includes an protrusion, shown as locking plate 688, extending from the underframe 636 and positioned to align with a respective latch 686. The frame 200 includes a support that receives a pin, shown as locking pin 690, that is positioned to engage with the locking plate 688. According to an exemplary embodiment, engaging the lever 682 pulls on the actuation cable 684 which actuates both of the latches 686. Such actuation releases the locking plate 688 from the locking pin 690, allowing the cargo bed 610 to freely pivot about the pivot blocks 638.

According to the exemplary embodiment shown in FIGS. 43-54, the rear module 600 is replaced with a second rear module, shown as rear module 700. Rear module 700 is configured as a passenger seating and litter carrying module. As shown in FIGS. 43 and 47-54, the rear module 700 includes a plurality of seats, shown as multi-purpose seats 710. The multi-purpose seats 710 are arranged in two rows, shown as front row 702 and back row 704. According to the exemplary embodiment shown in FIGS. 43 and 47-54, the multi-purpose seats 710 of the first row 702 face a first direction (e.g., a forward direction, etc.) and the multi-purpose seats 710 of the back row 704 face an opposing second direction (e.g., a rearward direction, etc.). In other embodiments, the multi-purpose seats 710 of the front row 702 and the rear row 704 face the same direction. According to the exemplary embodiment shown in FIGS. 43 and 47-54, the front row 702 includes three multi-purpose seats 710 and the back row 704 includes three multi-purpose seats 710 for a total of six multi-purpose seats 710. The vehicle 100 may thereby be capable of carrying up to nine passengers. In other embodiments, the front row 702 and the back row 704 include two multi-purpose seats 710 each.

Figure 44:
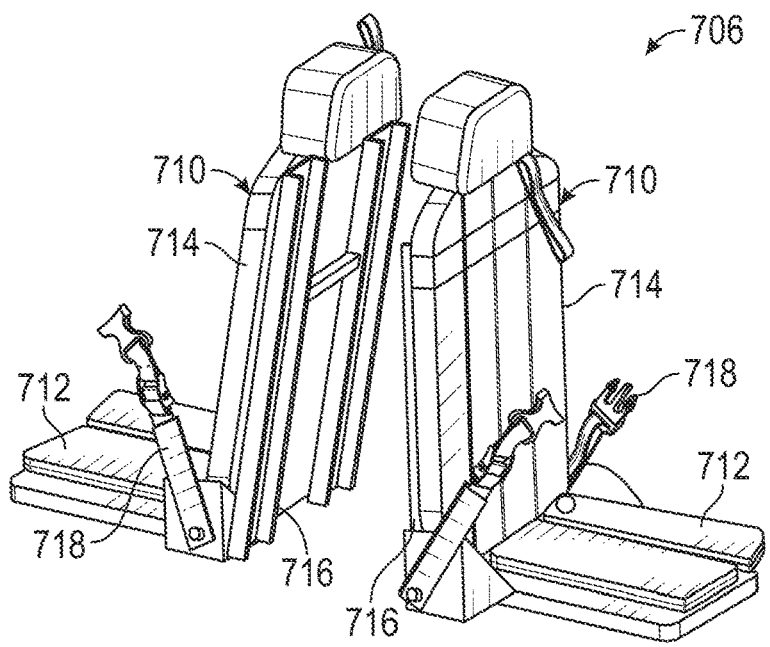
FIG. 44 is a perspective view of seats of the second rear module of FIG. 43 in a first configuration, according to an exemplary embodiment.
Figure 45:
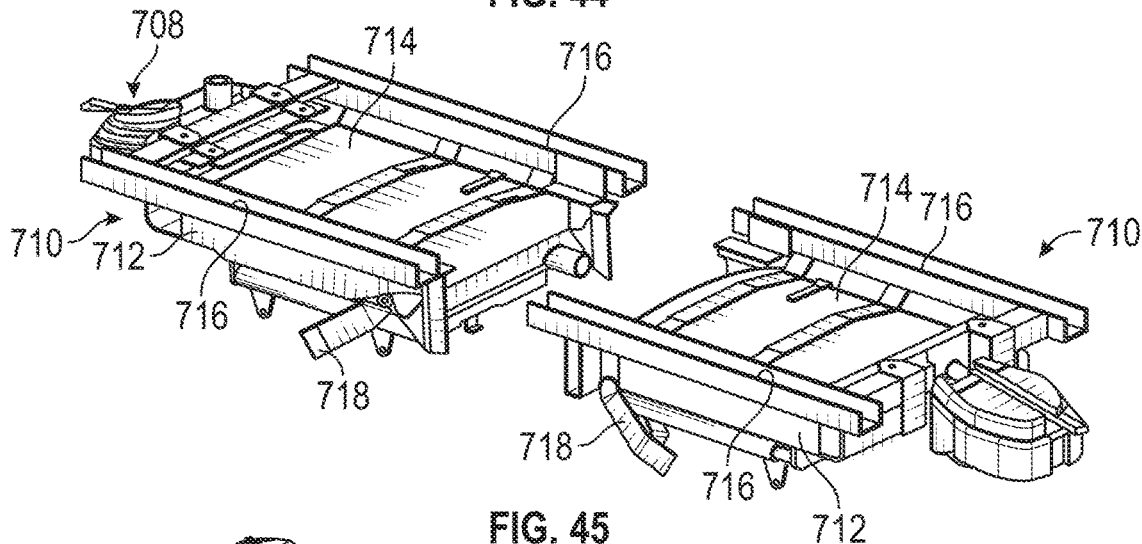
FIG. 45 is a perspective view of the seats of FIG. 44 in a second configuration, according to an exemplary embodiment.
Figure 46:
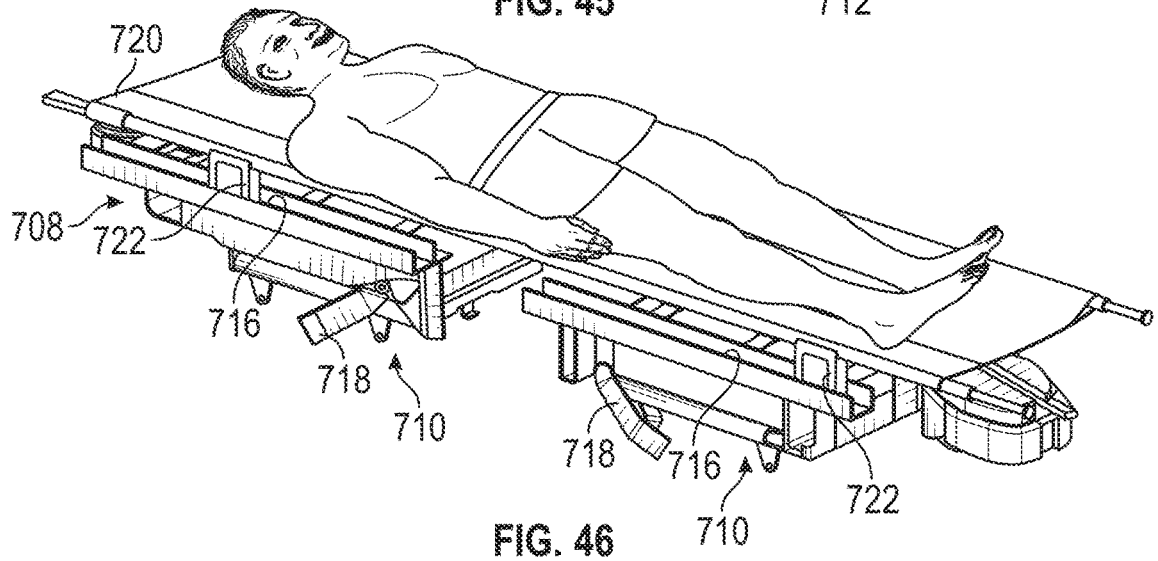
FIG. 46 is a perspective view of the seats of FIG. 45 in the second configuration receiving a litter, according to an exemplary embodiment.

As shown in FIGS. 44-46, each of the multi-purpose seats 710 includes a first portion, shown as seat bottom 712, a second portion, shown as seat back 714, a pair of rails, shown as guides 716, coupled to the back of the seat back 714, and a securing element, shown as seat belt 718. According to an exemplary embodiment, the seat back 714 is pivotally coupled to the seat bottom 712. As shown in FIG. 44, the seat backs 714 of the multi-purpose seats 710 are positioned upright such that the multi-purpose seats 710 are arranged in a first configuration, shown as sitting configuration 706. As shown in FIG. 45, the seat backs 714 of the multi-purpose seats 710 are pivoted down such that the multi-purpose seats 710 are arranged in a second configuration, shown as litter configuration 708. As shown in FIG. 46, a pair of aligned multi-purpose seats 710 (i.e., a first multi-purpose seat 710 from the front row 702 aligned with a second multi-purpose seat 710 from the back row 704) are configured to receive and secure a stretcher, shown as litter 720, to the rear module 700. The litter 720 includes protrusions, shown as guide elements 722, that fit within and slide along the guides 716. Once the litter 720 is appropriately positioned, the seat belts 718 may be fastened around the litter 720 to secure the litter 720 thereto.

Figure 43:
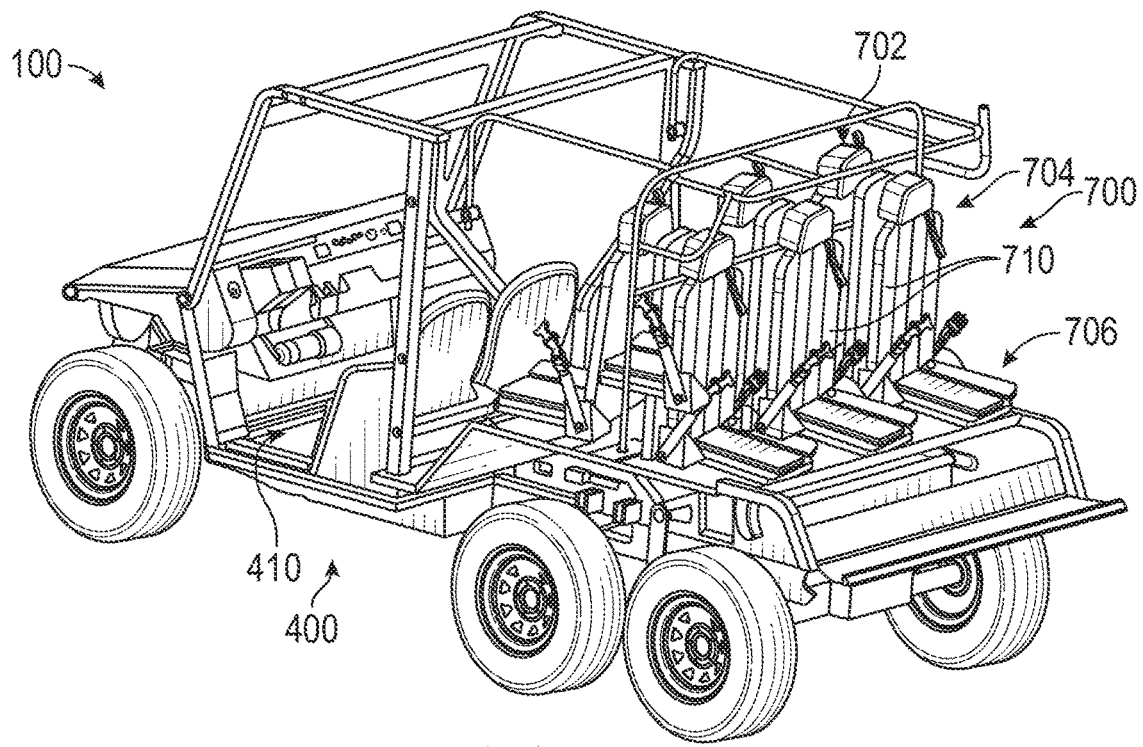
FIG. 43 is a perspective view of a second rear module of the vehicle of FIG. 1 in a first configuration, according to an exemplary embodiment.
Figure 47:
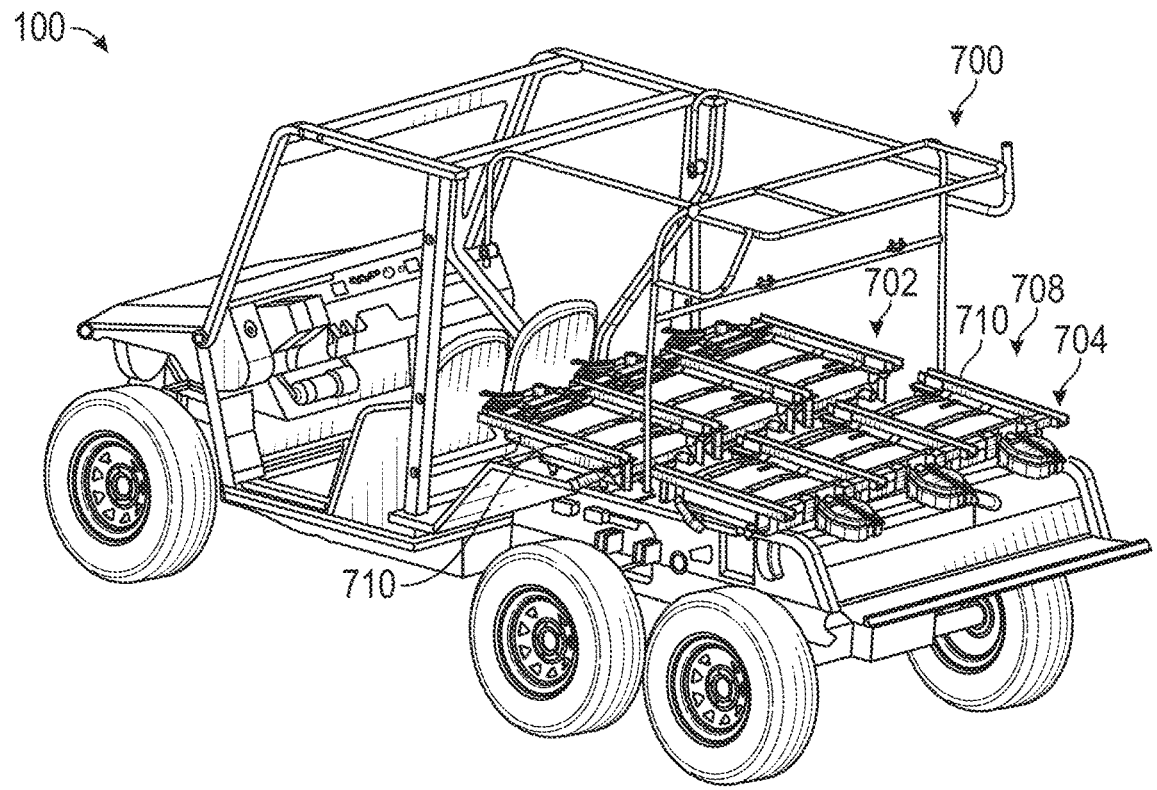
FIGS. 47 and 48 are perspective views of the second rear module of FIG. 43 in a second configuration, according to an exemplary embodiment.
Figure 48:
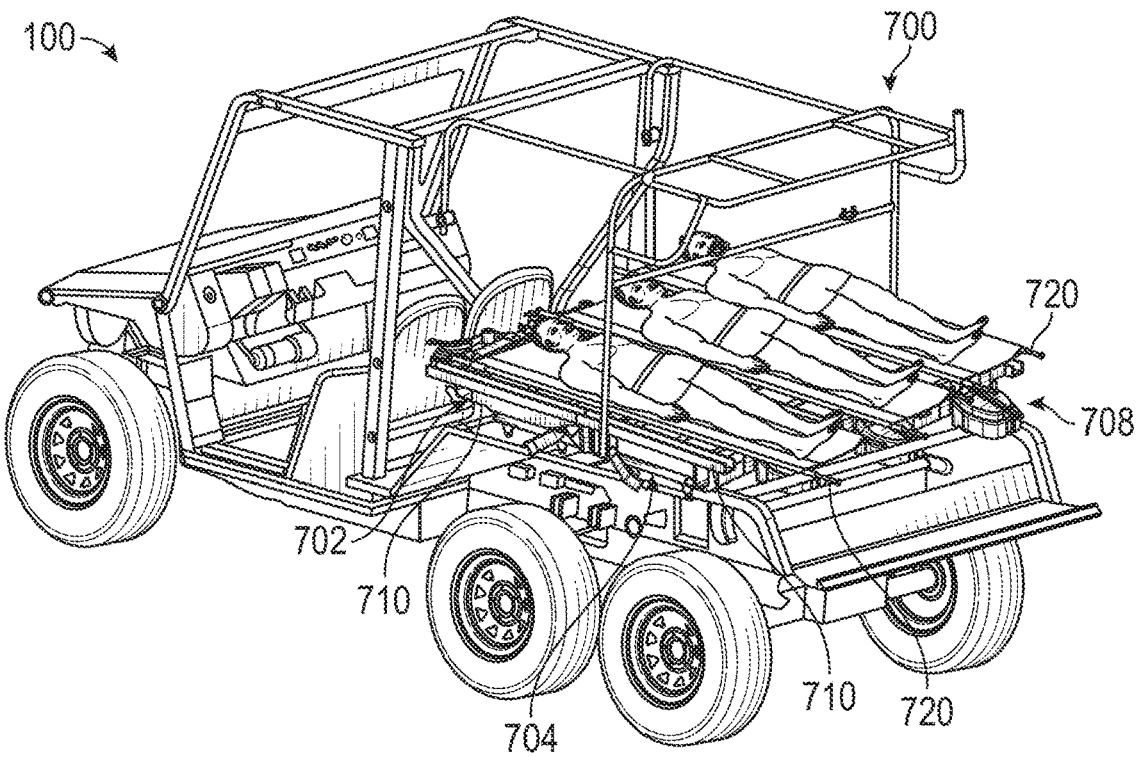
Figure 49:
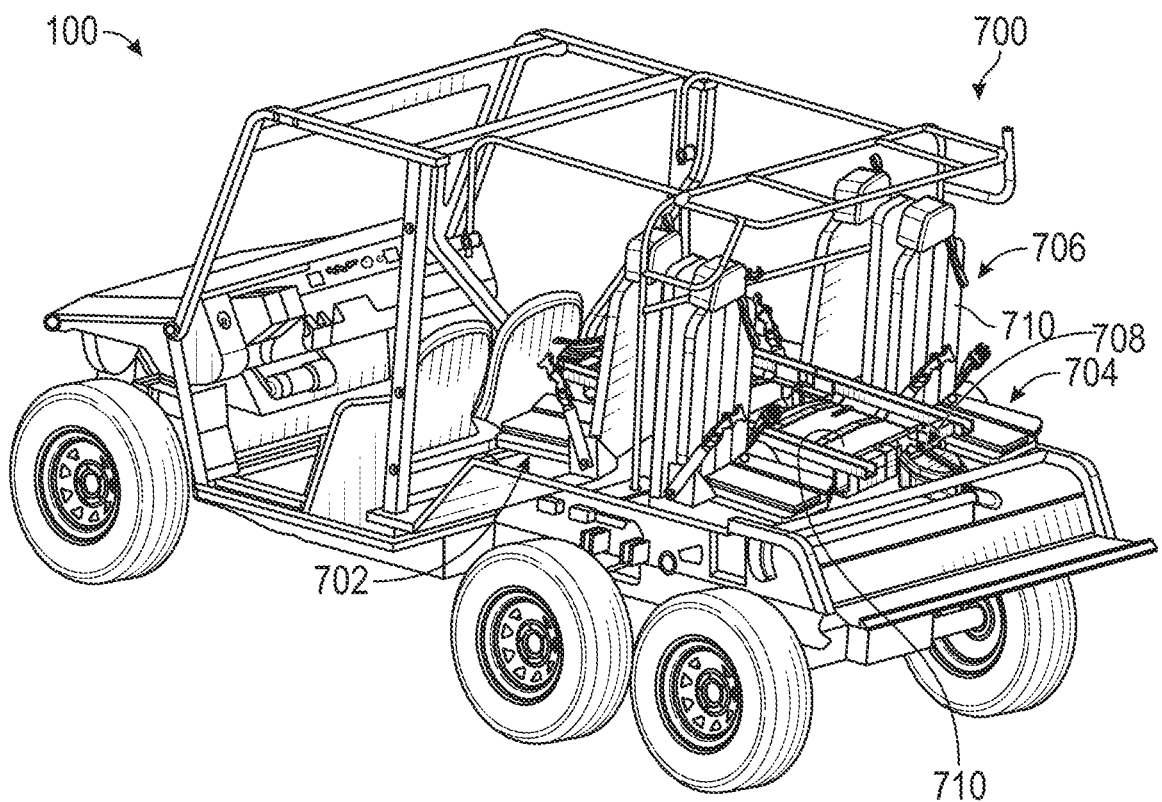
FIGS. 49 and 50 are perspective views of the second rear module of FIG. 43 in a third configuration, according to an exemplary embodiment.
Figure 50:
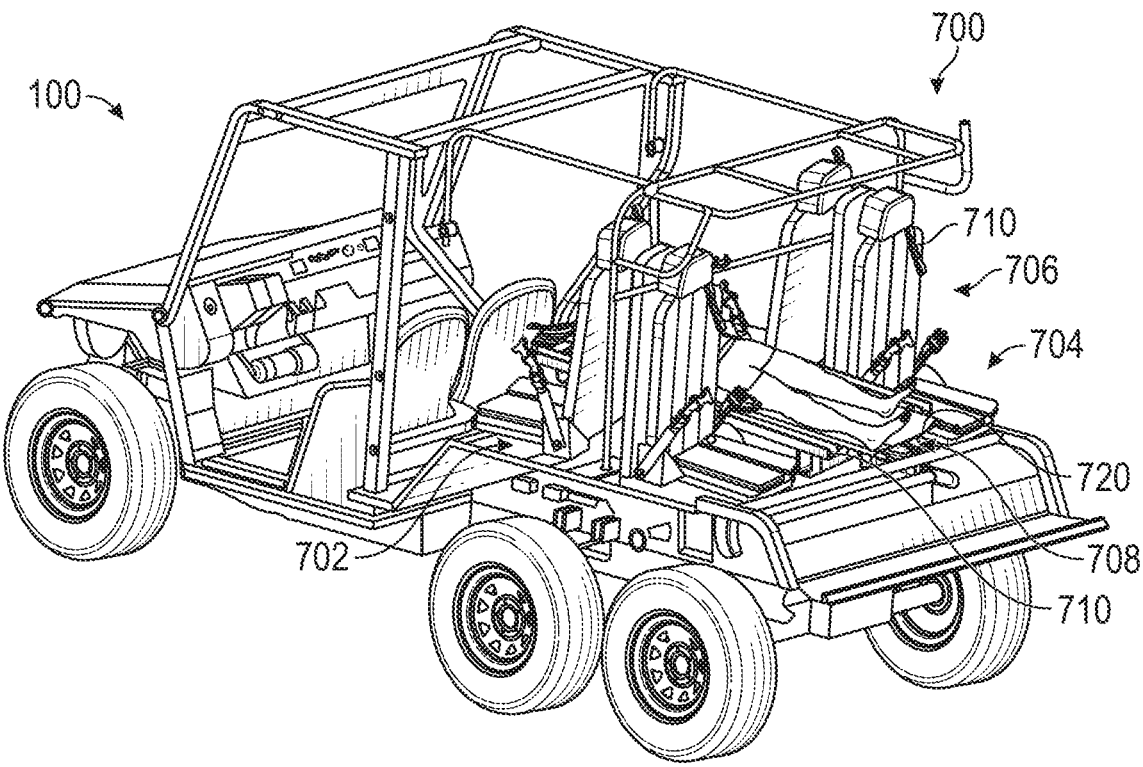
Figure 51:
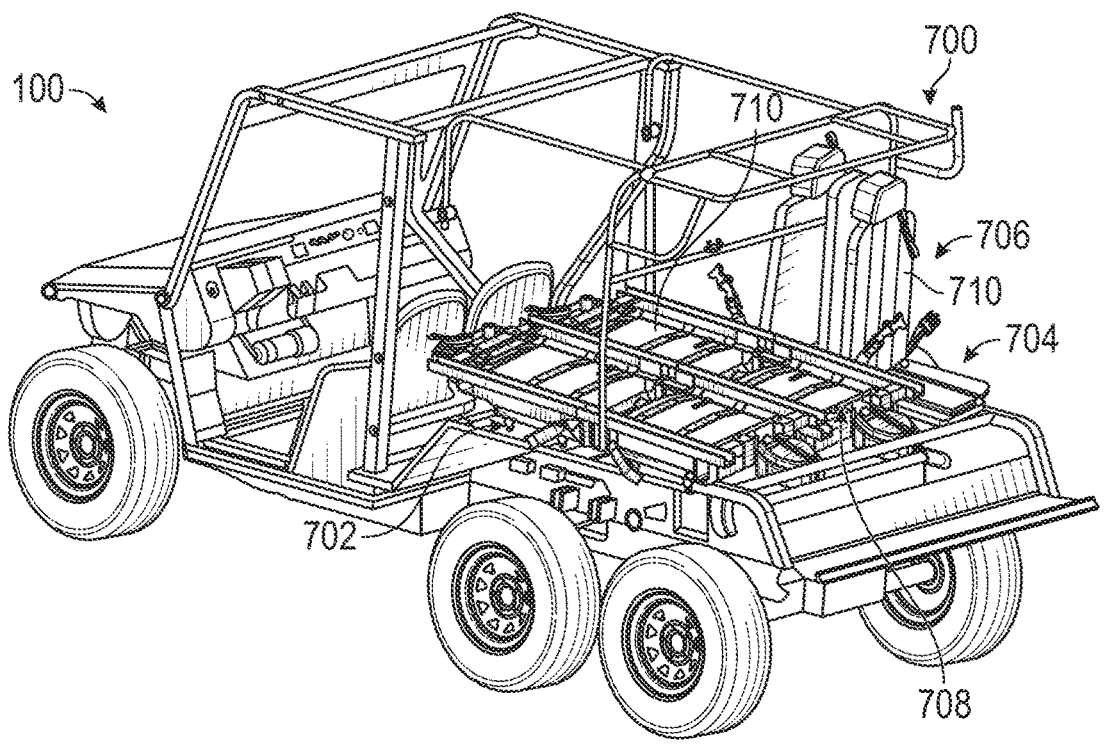
FIGS. 51 and 52 are perspective views of the second rear module of FIG. 43 in a fourth configuration, according to an exemplary embodiment.
Figure 52:
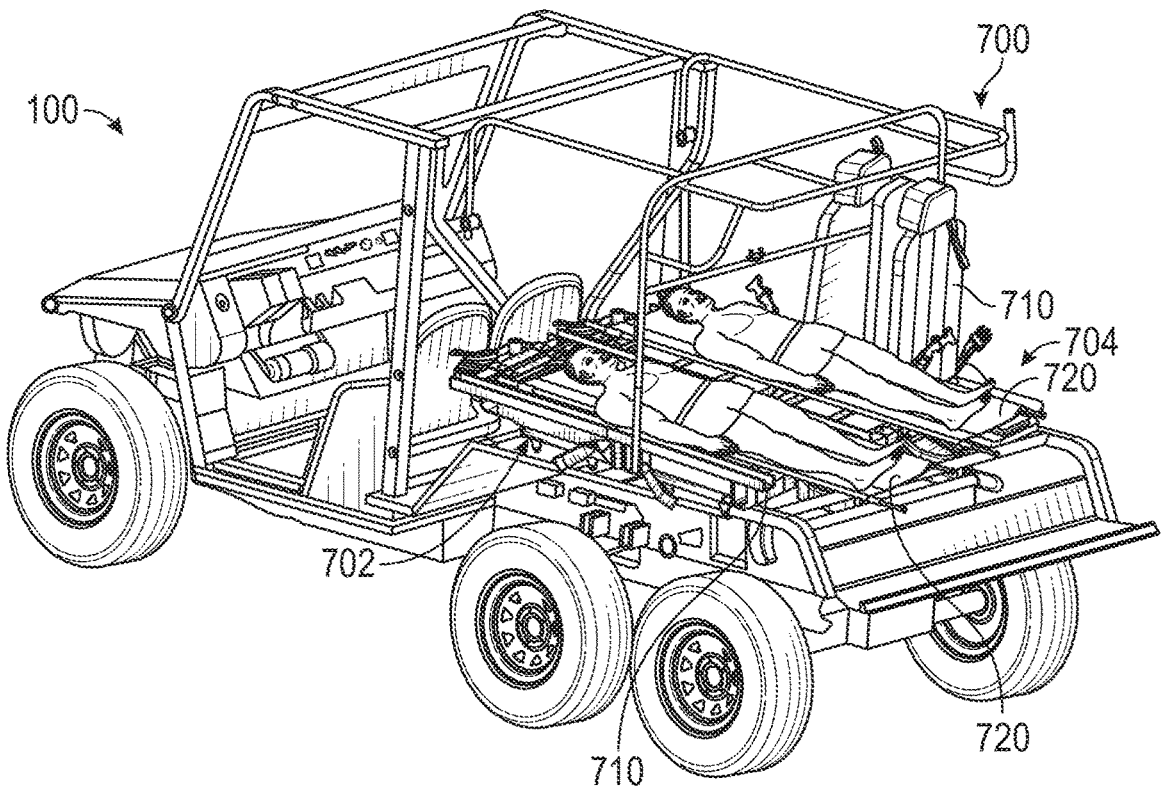
Figure 53:
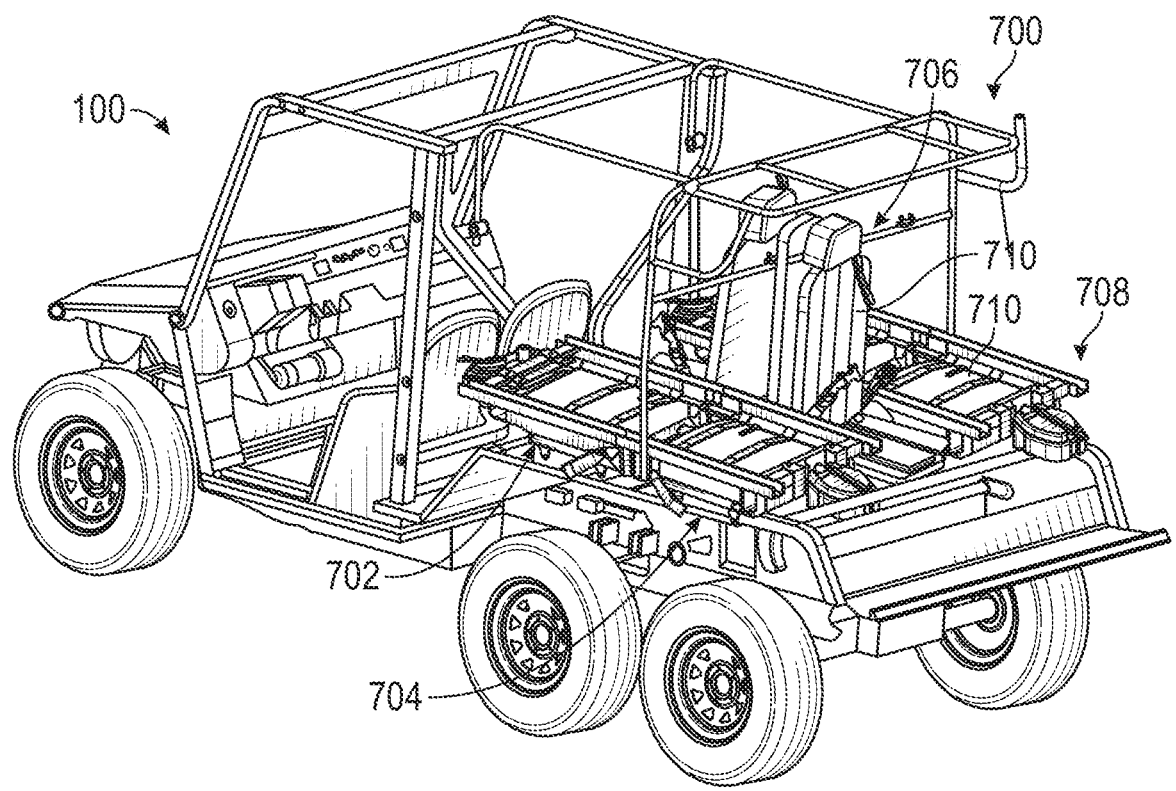
FIGS. 53 and 54 are perspective views of the second rear module of FIG. 43 in a fifth configuration, according to an exemplary embodiment.
Figure 54:
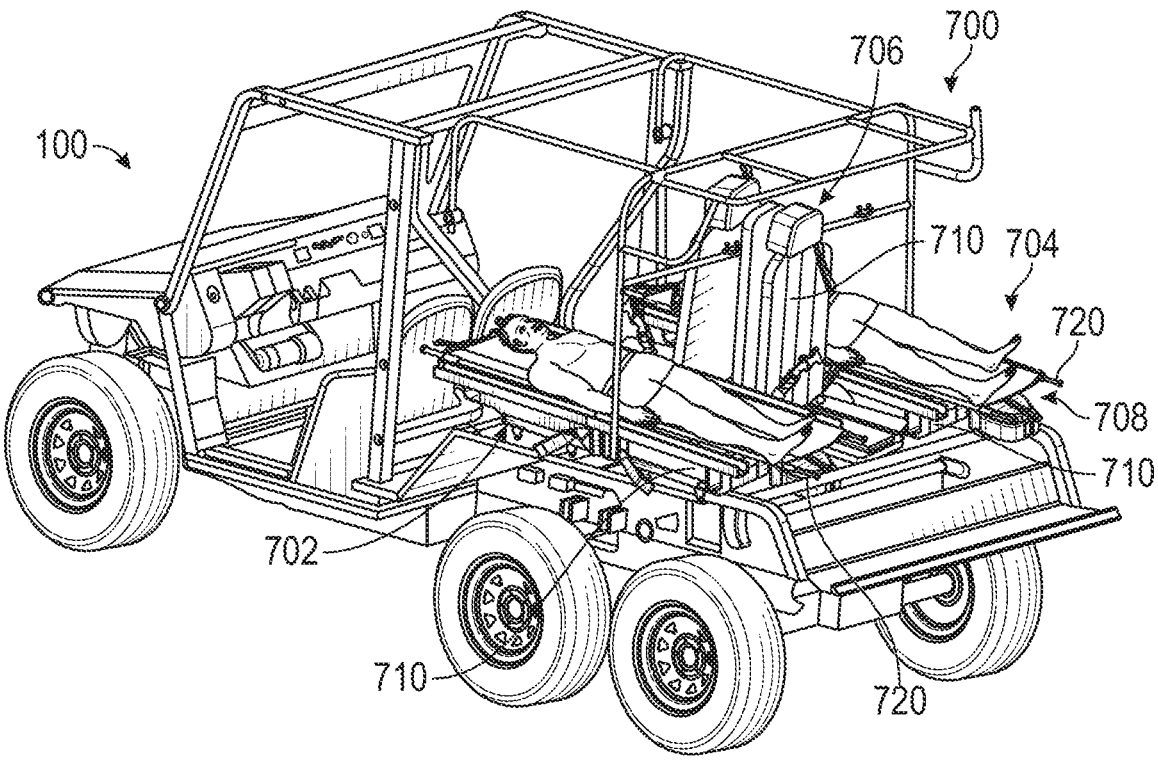

As shown in FIGS. 43 and 47-54, the rear module 700 can be reconfigured in to numerous different arrangements. As shown in FIG. 43, all of the multi-purpose seats 710 are arranged in the sitting configuration 706 such that the rear module 700 may carry up to six sitting passengers. As shown in FIGS. 47 and 48, all of the multi-purpose seats 710 are arranged in the litter configuration 708 such that the rear module 700 may carry up to three litters 720. As shown in FIGS. 49 and 50, the center multi-purpose seats 710 are arranged in the litter configuration 708 and the remaining multi-purpose seats 710 are arranged in the sitting configuration 706 such that the rear module 700 may carry up to four sitting passengers and one litter 720. As shown in FIGS. 51-54, two of the multi-purpose seats 710 are arranged in the sitting configuration 706 and the remaining multi-purpose seats 710 are arranged in the litter configuration 708 such that the rear module 700 may carry up to two sitting passengers and two litters 720.

Figure 55:
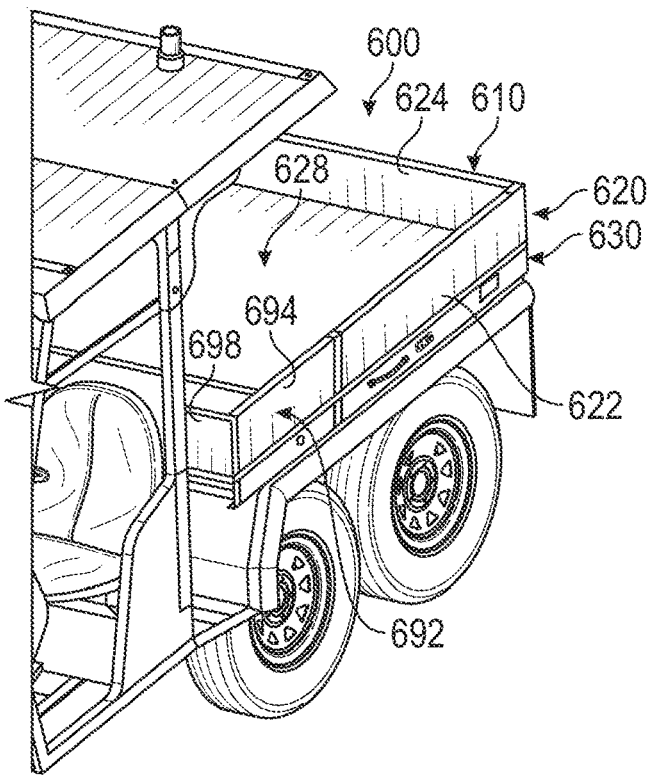
FIGS. 55 and 56 are perspective views of a third rear module of the vehicle of FIG. 1, according to an exemplary embodiment.
Figure 56:
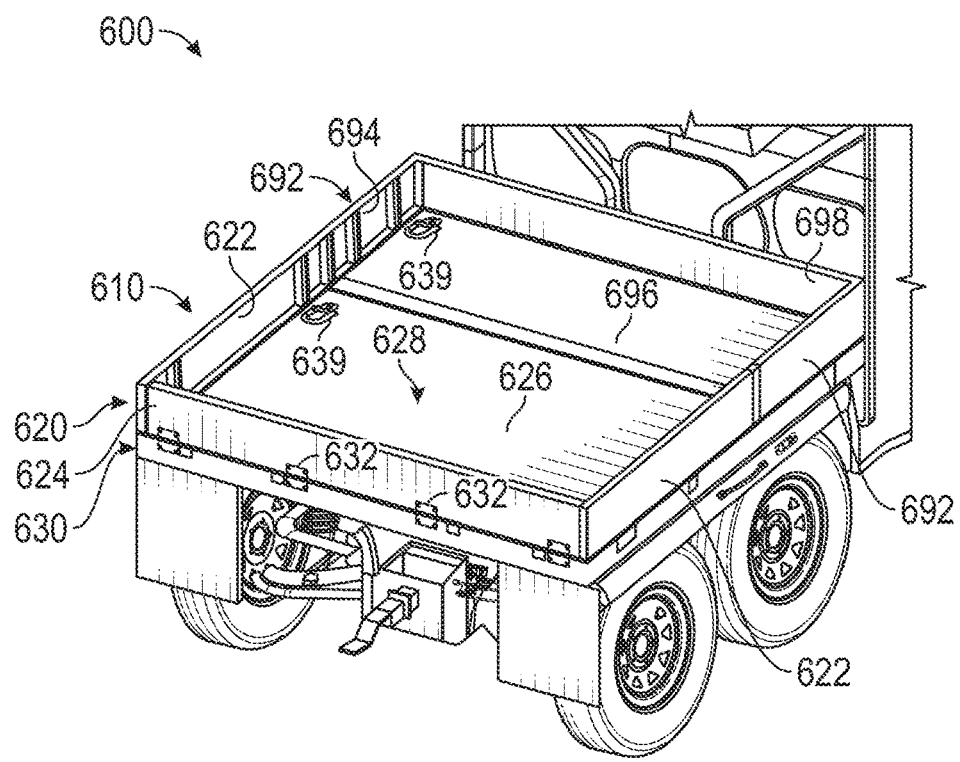

According to the exemplary embodiment shown in FIGS. 55 and 56, the rear module 600 does not include the rear seating assembly 640, rather the rear module 600 includes a static module, shown as cargo bed extension module 692. The cargo bed extension module 692 includes a plurality of side panels, shown as side panels 694; a front panel, shown as head panel 698, and a floor, shown as extended bed floor 696. The side panels 694, the head panel 698, and the extended bed floor 696 cooperatively extend the bed cavity 628. The cargo bed extension module 692 may be selectively swappable with the rear seating assembly 640 (e.g., when extra seating is not desired, etc.). In another embodiment, the static module is configured as a water tank module. In still another embodiment, the static module is configured as a generator module (e.g., a genset, a generator package, etc.). In yet another embodiment, the static module is configured as a tool box storage module. In other embodiments, the static module is still another type of static module that may be used with the vehicle 100.

Powertrain

Figure 57:
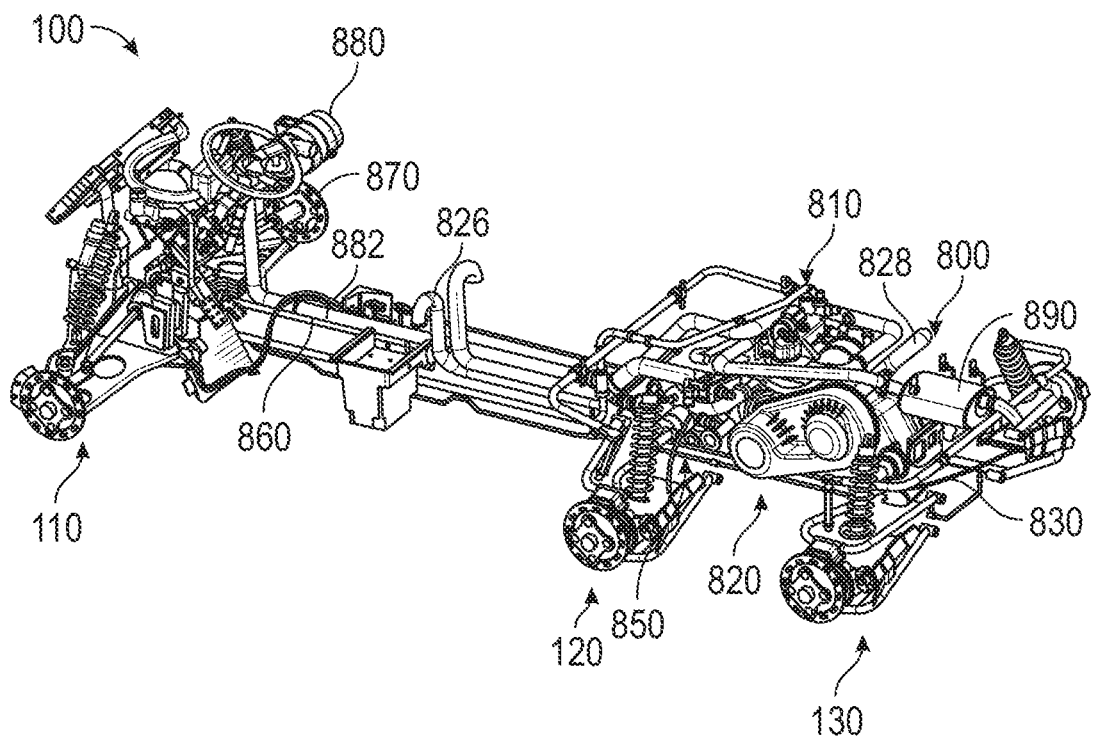
FIG. 57 is a perspective view of a powertrain of the vehicle of FIG. 1, according to an exemplary embodiment.
Figure 58:
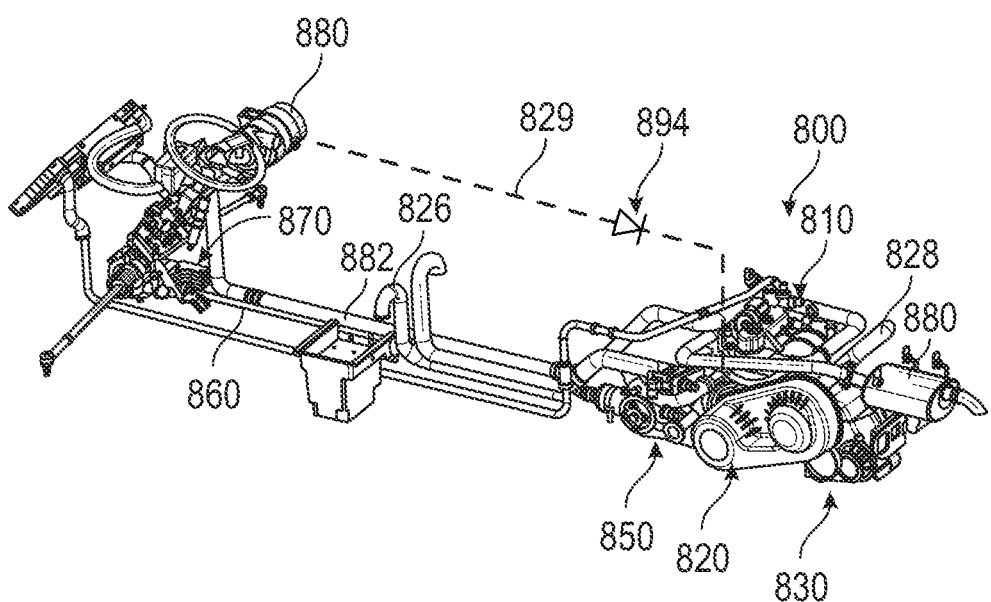
FIG. 58 is another perspective view of the powertrain of FIG. 57, according to an exemplary embodiment.
Figure 59:
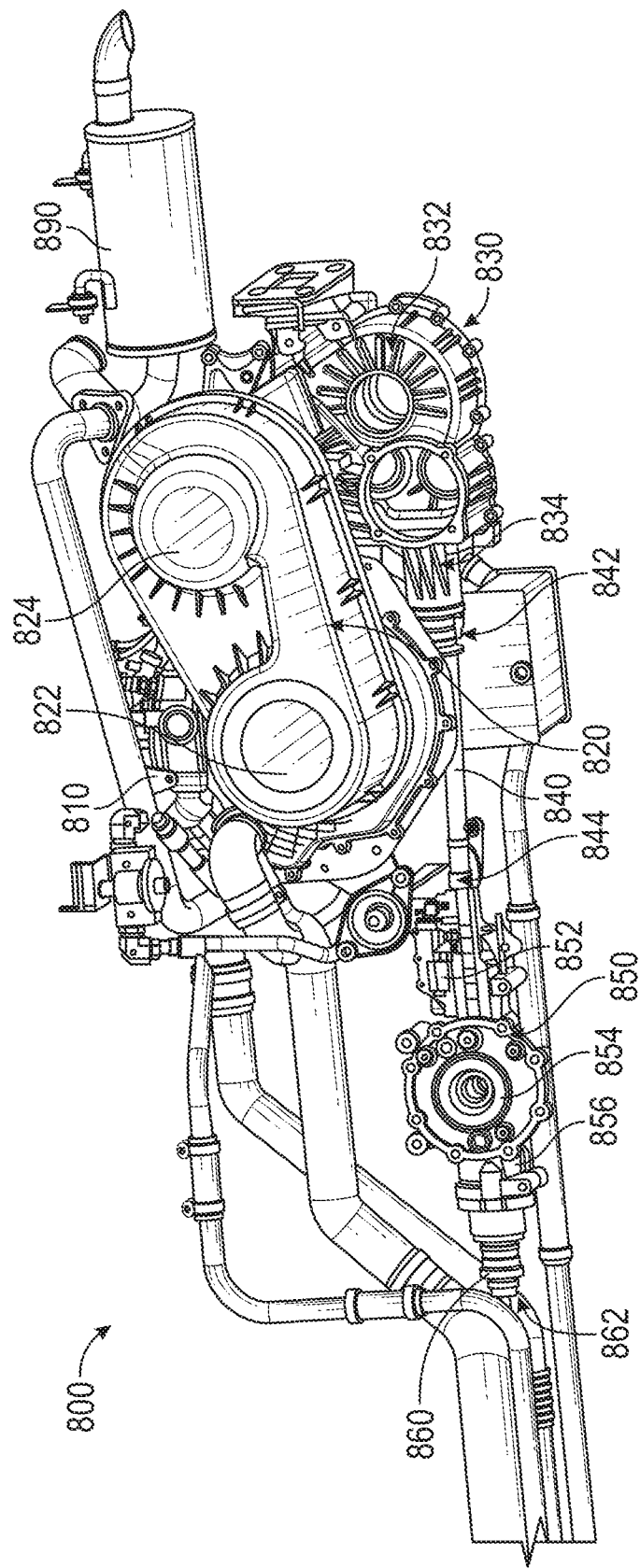
FIG. 59 is a detailed perspective view of a rear portion of the powertrain of FIG. 57, according to an exemplary embodiment.

As shown in FIGS. 57-60, the powertrain 800 includes a primary driver, shown as engine 810, a transmission, shown as transmission 820, a transaxle, shown as transaxle 830, a first differential, shown as rear differential 850, and a second differential, shown as front differential 870. According to an exemplary embodiment, the engine 810 is an internal combustion engine (e.g., a compression-ignition engine, a spark-ignition engine, etc.) that receives fuel (e.g., gasoline, diesel, propane, natural gas, etc.) from the fuel tank and combusts the fuel to generate a mechanical energy output. In alternative embodiments, the primary driver is another type of device (e.g., a fuel cell, an electric motor, etc.) that is otherwise powered (e.g., with hydrogen, electricity, etc.). As shown in FIGS. 57-59, the engine 810 is positioned at and/or toward the rear of the powertrain 800. The engine 810 is disposed underneath the rear module 600 such that the vehicle 100 is a rear engine vehicle, according to an exemplary embodiment. In other embodiments, the engine 810 is otherwise positioned (e.g., forward of the cab 400 under the hood, underneath the cab 400, etc.).

According to an exemplary embodiment, the transmission 820 is a continuously variable transmission ("CVT"). In other embodiments, the powertrain 800 includes another type of transmission (e.g., a manual transmission, an automatic transmission, a dual-clutch transmission, etc.). As shown in FIG. 59, the transmission 820 includes a first assembly, shown as input pulley assembly 822, and a second assembly, shown as output pulley assembly 824, disposed within a housing thereof. According to an exemplary embodiment, the input pulley assembly 822 is coupled to an output of the engine 810, and the output pulley assembly 824 is coupled to an input of the transaxle 830. The input pulley assembly 822 of the transmission 820 may thereby be configured to receive the mechanical energy output generated by the engine 810 and convey such mechanical energy to the output pulley assembly 824. The output pulley assembly 824 may thereafter provide an output to the input of the transaxle 830 based on the mechanical energy input received by the input pulley assembly 822. The applied torque may vary based on a current diameter ratio between the input pulley assembly 822 and the output pulley assembly 824.

As shown in FIGS. 57 and 58, the transmission 820 includes a first conduit, shown as transmission air intake 826, coupled thereto and a second conduit, shown as transmission exhaust 828, extending therefrom. In one embodiment, the inlet of the transmission air intake 826 is positioned under the front seats of the cab 400. In other embodiments, the inlet of the transmission air intake 826 is otherwise positioned (e.g., under the rear seats, under the rear module 600, under the hood, under the dash, etc.). According to an exemplary embodiment, the transmission air intake 826 is configured to draw fresh air from the ambient environment and provide such fresh air to the transmission 820. In one embodiment, the transmission 820 includes a fan element positioned internally within the housing of the transmission 820. The fan element may be configured to cycle the fresh air received from the transmission air intake 826 through the housing of the transmission 820 and out the transmission exhaust 828 to thermally regulate (e.g., cool, etc.) the transmission 820.

As shown in FIG. 57, the transaxle 830 is positioned forward of the second rear axle 130 and rearward of the first rear axle 120 (e.g., when viewed from a side of the vehicle 100, etc.). In other embodiments, the transaxle 830 is positioned rearward of the second rear axle 130 or in alignment with the second rear axle 130. According to an exemplary embodiment, the transaxle 830 includes an input positioned to receive the mechanical energy output generated by the engine 810 as provided by the output pulley assembly 824 of the transmission 820. As shown in FIG. 59, the transaxle 830 includes a first output, shown as first transaxle output 832, and a second output, shown as second transaxle output 834. According to an exemplary embodiment, the first transaxle output 832 is configured to couple to a final drive (e.g., half shafts coupled to the wheel and tire assemblies 40, etc.) of the second rear axle 130. The transaxle 830 may be configured to provide at least a portion (e.g., a first portion, etc.) of the mechanical energy received from the transmission 820 to the second rear axle 130 to facilitate driving the second rear axle 130 directly with the transaxle 830. In some embodiments, the transaxle 830 is an unlocking transaxle that facilitates relative movement between the wheel and tire assemblies 40 of the second rear axle 130. In other embodiments, the transaxle 830 is a locking transaxle.

As shown in FIG. 59, the rear differential 850 includes an input, shown as rear differential input 852, a first output, shown as first rear differential output 854, and a second output, shown as second rear differential output 856. As shown in FIG. 59, the powertrain 800 includes a first drive shaft, shown as rear drive shaft 840, having a first end, shown as rear end 842, and an opposing second end, shown as front end 844. The rear drive shaft 840 extends between the transaxle 830 and the rear differential 850 such that the rear end 842 of the rear drive shaft 840 is coupled to the second transaxle output 834 and the front end 844 of the rear drive shaft 840 is coupled to the rear differential input 852. The transaxle 830 may be configured to provide at least a portion (e.g., a second portion, etc.) of the mechanical energy received from the transmission 820 to the rear drive shaft 840 to facilitate driving the rear differential 850 directly with the transaxle 830.

According to an exemplary embodiment, the first rear differential output 854 is configured to couple to a final drive (e.g., half shafts coupled to the wheel and tire assemblies 40, etc.) of the first rear axle 120. The rear differential 850 may be configured to provide at least a portion (e.g., a first portion, etc.) of the mechanical energy received from the rear drive shaft 840 to the first rear axle 120 to facilitate driving the first rear axle 120 directly with the rear differential 850. In some embodiments, the rear differential 850 is an unlocking differential that facilitates relative movement between the wheel and tire assemblies 40 of the first rear axle 120. In other embodiments, the rear differential 850 is a locking differential.

Figure 60:
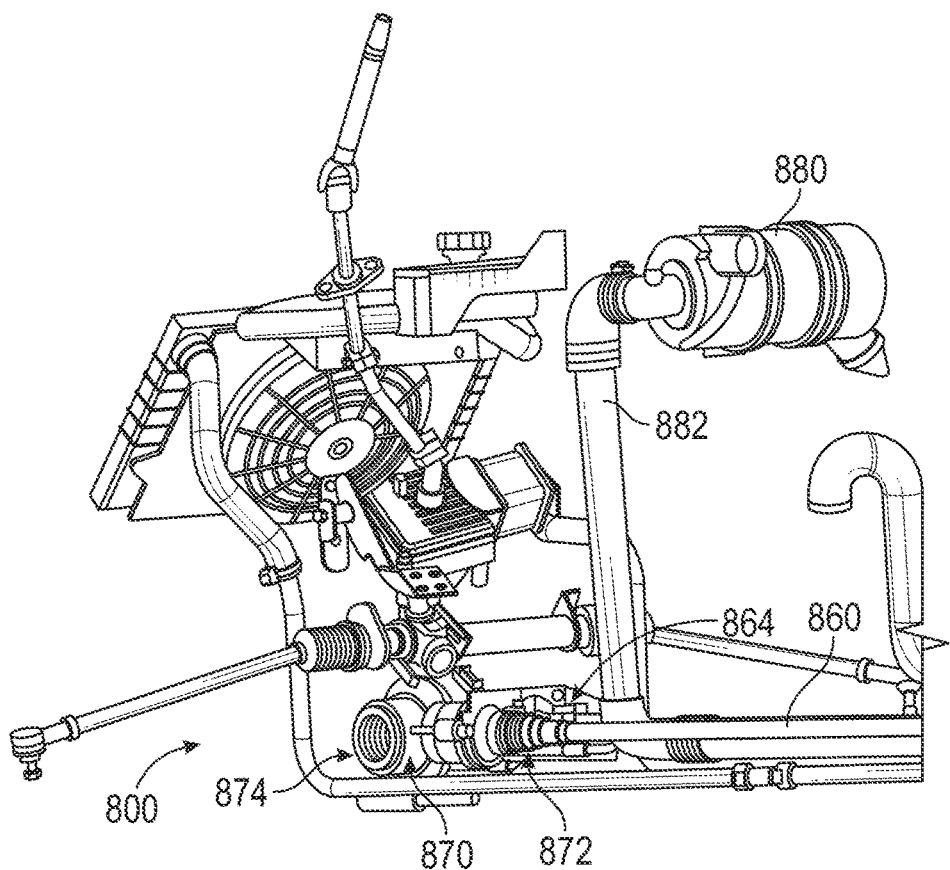
FIG. 60 is a detailed perspective view of a front portion of the powertrain of FIG. 57, according to an exemplary embodiment.

As shown in FIG. 60, the front differential 870 includes an input, shown as front differential input 872, and an output, shown as front differential output 874. As shown in FIGS. 57-60, the powertrain 800 includes a second drive shaft, shown as front drive shaft 860, having a first end, shown as rear end 862, and an opposing second end, shown as front end 864. The front drive shaft 860 extends between the rear differential 850 and the front differential 870 such that the rear end 862 of the front drive shaft 860 is coupled to the second rear differential output 856 and the front end 864 of the front drive shaft 860 is coupled to the front differential input 872. The rear differential 850 may be configured to provide at least a portion (e.g., a second portion, etc.) of the mechanical energy received from the rear drive shaft 840 to the front drive shaft 860 to facilitate driving the front differential 870 directly with the rear differential 850. The rear differential 850 may thereby be configured as a drive-through differential.

According to an exemplary embodiment, the front differential output 874 is configured to couple to a final drive (e.g., half shafts coupled to the wheel and tire assemblies 40, etc.) of the front axle 110. The front differential 870 may be configured to provide to the mechanical energy received from the front drive shaft 860 to the front axle 110 to facilitate driving the front axle 110 directly with the front differential 870. In some embodiments, the front differential 870 is an unlocking differential that facilitates relative movement between the wheel and tire assemblies 40 of the front axle 110. In other embodiments, the front differential 870 is a locking differential.

According to the exemplary embodiment shown in FIGS. 57-60, the transaxle 830, the rear drive shaft 840, the rear differential 850, the front drive shaft 860, and the front differential 870 facilitate actively driving the front axle 110, the first rear axle 120, and the second rear axle 130 such that the vehicle 100 is a 6×6 vehicle. In some embodiments, the powertrain 800 includes (i) a first clutch positioned between the transaxle 830 and the rear differential 850 and/or (ii) a second clutch positioned between the rear differential 850 and the front differential 870 such that the powertrain 800 of the vehicle 100 may be selectively and/or automatically reconfigurable between a 6×6 mode, a 4×6 mode, and/or a 2×6 mode of operation based on engagement and disengagement of the first clutch and/or the second clutch (e.g., disengagement of the first clutch may decouple the rear differential 850 and the front differential 870 from the transaxle 830, disengagement of the second clutch may decouple the front differential 870 from the rear differential 850, etc.).

In some embodiments, the powertrain 800 does not include at least one of the rear drive shaft 840, the rear differential 850, the front drive shaft 860, and the front differential 870. By way of example, the powertrain 800 may not include the rear differential 850 and the rear drive shaft 840. In such embodiments, the rear end 862 of the front drive shaft 860 may be coupled to the second transaxle output 834. The transaxle 830 may thereby be configured to provide at least a portion of the mechanical energy received from the transmission 820 to the front drive shaft 860 to facilitate driving the front differential 870 directly with the transaxle 830. The first rear axle 120 may thereby be a passive, non-driven axle such that the vehicle 100 is a 4×6 vehicle. By way of another example, the powertrain 800 may not include the front differential 870 and the front drive shaft 860. The front axle 110 may thereby be a passive, non-driven axle such that the vehicle 100 is a 4×6 vehicle and the rear differential 850 may be a non-drive-through differential. By way of yet another example, the powertrain 800 may not include the rear drive shaft 840, the rear differential 850, the front drive shaft 860, and the front differential 870 such that the front axle 110 and the first rear axle 120 are both passive, non-driven axles such that the vehicle 100 is a 2×6 vehicle.

Air Cleaner System

As shown in FIGS. 57, 58, and 60, the vehicle 100 includes an air cleaner system including an intake, shown as engine air intake 880, and a conduit, shown as air conduit 882, extending from the engine air intake 880 to the engine 810. According to an exemplary embodiment, the engine air intake 880 includes an air filter positioned to filter debris and particulates out of ambient air being drawn in by the engine air intake 880. The filtered air may be provided from the engine air intake 880 to the engine 810 by the air conduit 882 for combustion with the fuel within combustion cylinders of the engine 810. According to an exemplary embodiment, the engine air intake 880 is positioned under the dash of the cab 400. The engine air intake 880 may thereby be positioned such that the engine air intake 880 is sufficiently removed from dirty and/or dusty air the vehicle 100 may generate near the bottom and rear of the vehicle 100 while moving. Such positioning of the engine air intake 880 may thereby facilitate a fresher air intake, increasing the useful life of the air filter within the engine air intake 880, as well as providing cleaner air to the engine 810. In other embodiments, the engine air intake 880 is otherwise positioned (e.g., at the front of the vehicle 100 under the hood, etc.).

As shown in FIGS. 57-59, the engine 810 includes an exhaust, shown as exhaust system 890. The exhaust system 890 is configured to facilitate expelling combustion exhaust gases from the engine 810 into the ambient environment. The exhaust system 890 may include an exhaust manifold directly coupled to the engine 810, piping extending from the exhaust manifold, and/or a muffler positioned at the end of the piping. As shown in FIG. 58, the exhaust system 890 includes a conduit, shown as suction conduit 892, that branches off from the exhaust system 890 and connects to the engine air intake 880. The suction conduit 892 may branch off from the exhaust manifold, the muffler, and/or any suitable position along the exhaust system 890. As shown in FIG. 58, the suction conduit 892 includes a valve, shown as one-way valve 894, that restricts the flow of exhaust into the suction conduit 892. In other embodiments, the exhaust system 890 does not include the one-way valve 894. According to an exemplary embodiment, the flow of exhaust gases through the exhaust system 890 creates a vacuum across (i) an opening at which the suction conduit 892 meets the other portion of the exhaust system 890 and/or (ii) the one-way valve 894 (e.g., an exhaust Venturi, etc.). The vacuum provides suction within the engine air intake 880 and the suction conduit 892, pulling debris, dirt, particulates, etc. from the air filter of the engine air intake 880, effectively cleaning the air filter while the engine 810 of the vehicle 100 is running. The debris, dirt, particulates, etc. removed from the air filter may then flow through the suction conduit 892 and/or the one-way valve 894 into the exhaust gases of the exhaust system 890, and expelled into the ambient environment through the muffler of the exhaust system 890.

Cooling System

Figure 61:
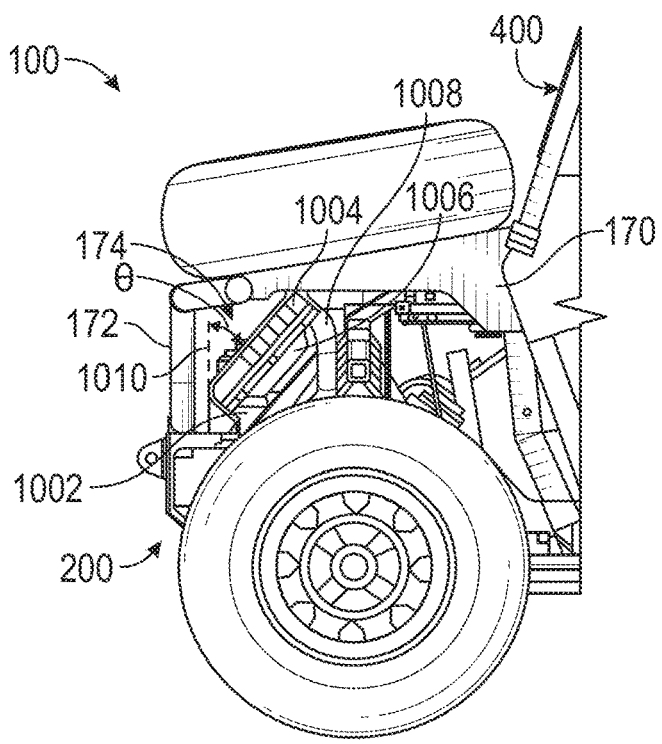
FIG. 61 is a detailed side view of a cooling system of the vehicle of FIG. 1, according to an exemplary embodiment.

As shown in FIG. 61, the hood 170 and the front grille 172 cooperatively define an interior cavity, shown as front cavity 174, that receives the cooling system 1000. According to an exemplary embodiment, the cooling system 1000 is configured to thermally regulate (e.g., cool, etc.) the engine 810 of the powertrain 800. As shown in FIG. 61, the cooling system 1000 includes a mount, shown as radiator bracket 1002, that is coupled to the frame 200. In one embodiment, the radiator bracket 1002 is coupled to the frame 200 proximate the front grille 172. The cooling system 1000 includes a heat exchanger, shown as radiator 1004, that is coupled to the radiator bracket 1002; a driver, shown as fan 1006, positioned at (e.g., coupled to, etc.) a rearward side of the radiator 1004; and conduits, shown as fluid conduits 1008, extending from the radiator 1004 to the engine 810 of the powertrain 800. According to an exemplary embodiment, the radiator 1004 is configured to receive incoming air through the front grille 172 to reduce the temperature of a fluid (e.g., coolant, etc.) within the cooling system 1000 and thereby cool the engine 810 of the powertrain 800. The fan 1006 is configured to draw the incoming air through the radiator 1004. In other embodiments, the fan 1006 is positioned in front of the radiator 1004 such that the fan 1006 pushes air through the radiator 1004. In an alternative embodiment, the cooling system 1000 does not include the fan 1006. In such embodiments, the radiator 1004 may be liquid-cooled, rather than air-cooled. According to an exemplary embodiment, the fluid cooled by the radiator 1004 and/or the fan 1006 is delivered to the engine 810 of the powertrain 800 by the fluid conduits 1008 to thermally regulate the engine 810.

According to the exemplary embodiment shown in FIG. 61, the radiator 1004 is disposed (e.g., held by the radiator bracket 1002, etc.) at an angle θ relative to an axis, shown as vertical axis 1010 (i.e., the radiator 1004 is arranged in an angled and/or angularly offset orientation). According to an exemplary embodiment, the vertical axis 1010 is parallel to or substantially parallel to a central vertical axis of the front grille 172 (e.g., the front grille 172 is oriented substantially vertically, etc.). By way of example, the angle θ of the radiator 1004 may range from 0 degrees (e.g., vertical, etc.) to 75 degrees relative to the vertical axis 1010. In some embodiments, the angle θ of the radiator 1004 is between 30 degrees and 45 degrees relative to the vertical axis 1010

(e.g., 30, 35, 40, 45, etc. degrees or any angle therebetween). In other embodiments, the angle θ is between 15 degrees and 30 degrees relative to the vertical axis 1010 (e.g., 15, 20, 25, 30, etc. degrees or any angle therebetween). In still other embodiments, the angle θ of the radiator 1004 is between 45 degrees and 60 degrees relative to the vertical axis 1010 (e.g., 45, 50, 55, 60, etc. degrees or any angle therebetween). In yet other embodiments, the angle θ of the radiator 1004 is between 0 degrees and 15 degrees (e.g., 0, 5, 10, 15, etc. degrees or any angle therebetween). In yet still other embodiments, the angle θ is between 60 degrees and 75 degrees (e.g., 60, 65, 70, 75, etc. degrees or any angle therebetween).

Traditionally, radiators in UTVs or other off-road vehicles are arranged in a vertical orientation. Such a vertical orientation may require at least a portion of the hood of the UTV to be raised at the location of the radiator such the radiator can properly fit underneath the hood. Such a raised hood may disadvantageously raise the hood line of the hood and obstruct the vision and sight line of an operator of the UTV and reduce the drivability thereof. In some UTVs, the radiator may be moved further rearward (i.e., away from the front grille, away from the front end of the hood) to improve/lower the hood line. A radiator that is spaced from the front grille, however, has reduced performance and efficiency. According to an exemplary embodiment, angling the radiator 1004 of the vehicle 100 facilitates lowering the hood line of the hood 170. Lowering the hood line of the hood 170 advantageously increases the vision and sight line of an operator of the vehicle 100 to improve the drivability and maneuverability of the vehicle 100. While angling the radiator 1004 may reduce the performance of a radiator, angling the radiator 1004 facilitates increasing the cooling capacity thereof (e.g., by making the radiator 1004 larger, etc.) and positioning the radiator 1004 at the front end of the hood 170 (e.g., proximate the front grille 172, etc.) such that the performance thereof is similar to or improved relative to a vertically orientated radiator. As such, the radiator 1004 being positioned at the angle θ facilitates lowering the hood line of the hood 170 relative to traditional UTVs, while maintaining or improving the performance of the cooling system 1000.

Braking System

Figure 62:
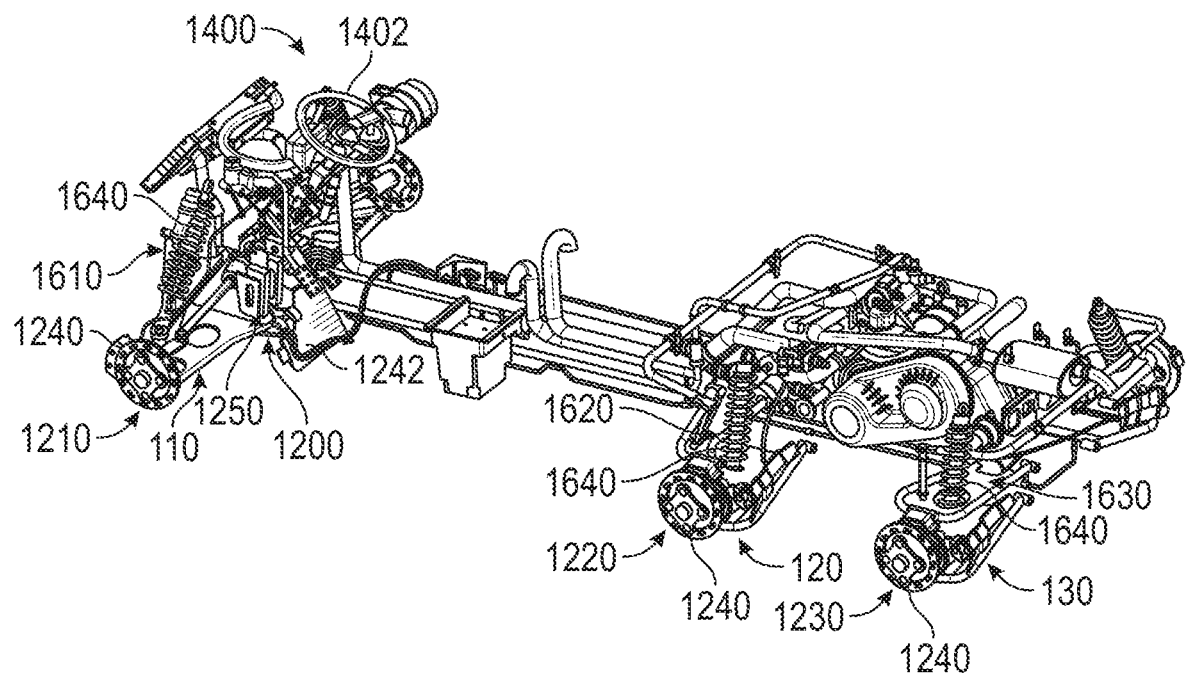
FIG. 62 is a perspective view of a braking system, a steering system, and a suspension system of the vehicle of FIG. 1, according to an exemplary embodiment.
Figure 63:
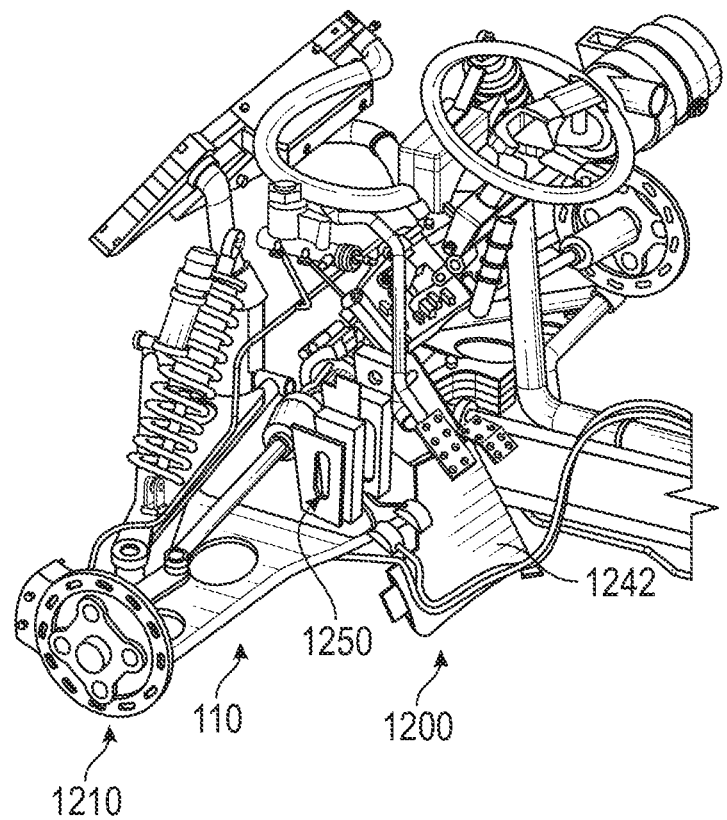
FIG. 63 is a detailed view of the braking system, the steering system, and the suspension system of FIG. 62, according to an exemplary embodiment.
Figure 64:
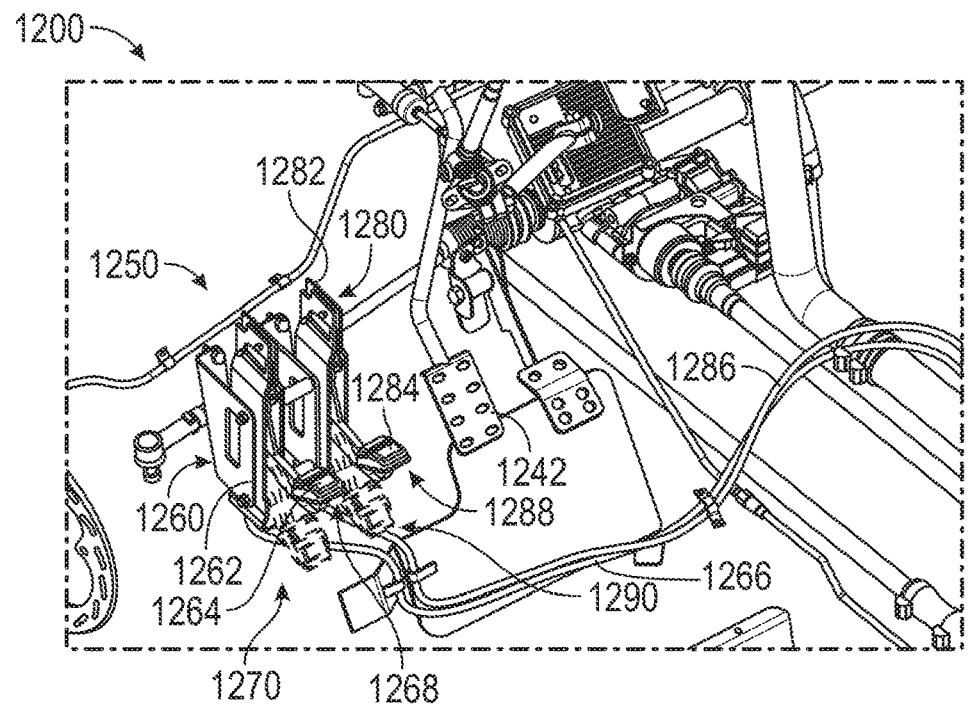
FIG. 64 is a detailed view of the braking system of FIG. 62, according to an exemplary embodiment.

As shown in FIGS. 62-64, the braking system 1200 includes a first braking assembly, shown as front braking assembly 1210, coupled to the front axle 110; a second braking assembly, shown as first rear braking assembly 1220, coupled to the first rear axle 120; a third braking assembly, shown as second rear braking assembly 1230, coupled to the second rear axle 130; a brake lever, shown as brake pedal 1242; and a parking brake assembly, shown as parking brake assembly 1250. In some embodiments, the braking system 1200 does not include one or more of the front braking assembly 1210, the first rear braking assembly 1220, and the second rear braking assembly 1230. According to the exemplary embodiment shown in FIG. 62, each of the front braking assembly 1210, the first rear braking assembly 1220, and the second rear braking assembly 1230 include a set of brakes, shown as disc brakes 1240, having brake calipers, one positioned at each end of the front axle 110, the first rear axle 120, and the second rear axle 130, respectively. Each of the brake calipers of the disc brakes 1240 is configured to selectively engage a corresponding rotor to slow or stop a respective wheel and tire assembly 140 coupled thereto. In other embodiments, each of the front braking assembly 1210, the first rear braking assembly 1220, and the second rear braking assembly 1230 include drum brakes and/or still other types of brakes.

According to an exemplary embodiment, engagement of the brake pedal 1242 actuates one or more of the front braking assembly 1210, the first rear braking assembly 1220, and the second rear braking assembly 1230 (e.g., the brake calipers of the disc brakes 1240 thereof, etc.) to decelerate and/or stop the vehicle 100. By way of example, engagement of the brake pedal 1242 may actuate (i) all three of the front braking assembly 1210, the first rear braking assembly 1220, and the second rear braking assembly 1230, (ii) only the first rear braking assembly 1220 and the second rear braking assembly 1230, (iii) only the front braking assembly 1210 and the first rear braking assembly 1220, (iv) only the front braking assembly 1210 and the second rear braking assembly 1230, (v) only the front braking assembly 1210, (vi) only the first rear braking assembly 1220, or (vii) only the second rear braking assembly 1230.

As shown in FIGS. 62-64, the parking brake assembly 1250 is positioned next to the brake pedal 1242 such that the parking brake assembly 1250 may be foot operated or actuated. In other embodiments, the parking brake assembly 1250 is positioned such that the parking brake assembly 1250 may be hand operated or actuated. As shown in FIG. 64, the parking brake assembly 1250 includes a first parking brake, shown as first rear parking brake 1260, and a second parking brake, shown as second rear parking brake 1280.

As shown in FIG. 64, the first rear parking brake 1260 includes a first housing, shown as first parking brake housing 1262; a first lever, shown as first parking brake lever 1264, pivotally coupled to the first parking brake housing 1262; and a first cable, shown as first brake cable 1266, extending from the first parking brake lever 1264 to the first rear braking assembly 1220. According to an exemplary embodiment, the first parking brake housing 1262 is configured to couple the first parking brake lever 1264 to the driver's side of the cab 400, proximate the brake pedal 1242. As shown in FIG. 64, the first parking brake lever 1264 is selectively repositionable between a first position, shown as disengaged position 1268, and a second position, shown as engaged position 1270. According to an exemplary embodiment, engaging the first parking brake lever 1264 to reposition the first parking brake lever 1264 from the disengaged position 1268 to the engaged position 1270 pulls on the first brake cable 1266, actuating the first rear braking assembly 1220 (e.g., the brake calipers of the disc brakes 1240 thereof, etc.), thereby preventing rotation of the wheel and tire assemblies 140 of the first rear axle 120.

As shown in FIG. 64, the second rear parking brake 1280 includes a second housing, shown as second parking brake housing 1282; a second lever, shown as second parking brake lever 1284, pivotally coupled to the second parking brake housing 1282; and a second cable, shown as second brake cable 1286, extending from the second parking brake lever 1284 to the second rear braking assembly 1230. According to an exemplary embodiment, the second parking brake housing 1282 is configured to couple the second parking brake lever 1284 to the driver's side of the cab 400, proximate the brake pedal 1242 and the first parking brake lever 1264. As shown in FIG. 64, the second parking brake lever 1284 is selectively repositionable between a first position, shown as disengaged position 1288, and a second position, shown as engaged position 1290. According to an exemplary embodiment, engaging the second parking brake lever 1284 to reposition the second parking brake lever 1284 from the disengaged position 1288 to the engaged position 1290 pulls on the second brake cable 1286, actuating the second rear braking assembly 1230 (e.g., the brake calipers of the disc brakes 1240 thereof, etc.), thereby preventing rotation of the wheel and tire assemblies 140 of the second rear axle 130.

According to an exemplary embodiment, having the first rear parking brake 1260 and the second rear parking brake 1280 separately activate the parking brakes of the first rear braking assembly 1220 and the second rear braking assembly 1230, respectively, advantageously (i) reduces the size requirements (e.g., lever length, etc.) for the first parking brake lever 1264 and the second parking brake lever 1284, and (ii) reduces the amount of force an operator must provide to actuate the first parking brake lever 1264 and the second parking brake lever 1284. In some embodiments, the first parking brake housing 1262 and the second parking brake housing 1282 form a single, continuous (e.g., unitary, etc.) housing. In some embodiments, the parking brake assembly 1250 only includes one of the first rear parking brake 1260 and the second rear parking brake 1280. In some embodiments, the parking brake assembly 1250 only includes a single parking brake that is configured to actuate both the first rear braking assembly 1220 and the second rear braking assembly 1230. In one embodiment, the single parking brake includes a mechanical ratchet mechanism that provides mechanical assistance in actuating both the first rear braking assembly 1220 and the second rear braking assembly 1230 with a single parking brake lever (e.g., reducing the arm length and force required to actuate both the first rear braking assembly 1220 and the second rear braking assembly 1230 simultaneously with a single lever, etc.). In another embodiment, the single parking brake is coupled to an actuator (e.g., a hydraulic actuator, a pneumatic actuator, a motor, etc.) that is configured to actuate and/or assist in actuating both the first rear braking assembly 1220 and the second rear braking assembly 1230 in response to the single parking brake being engaged.

Steering System

Figure 65:
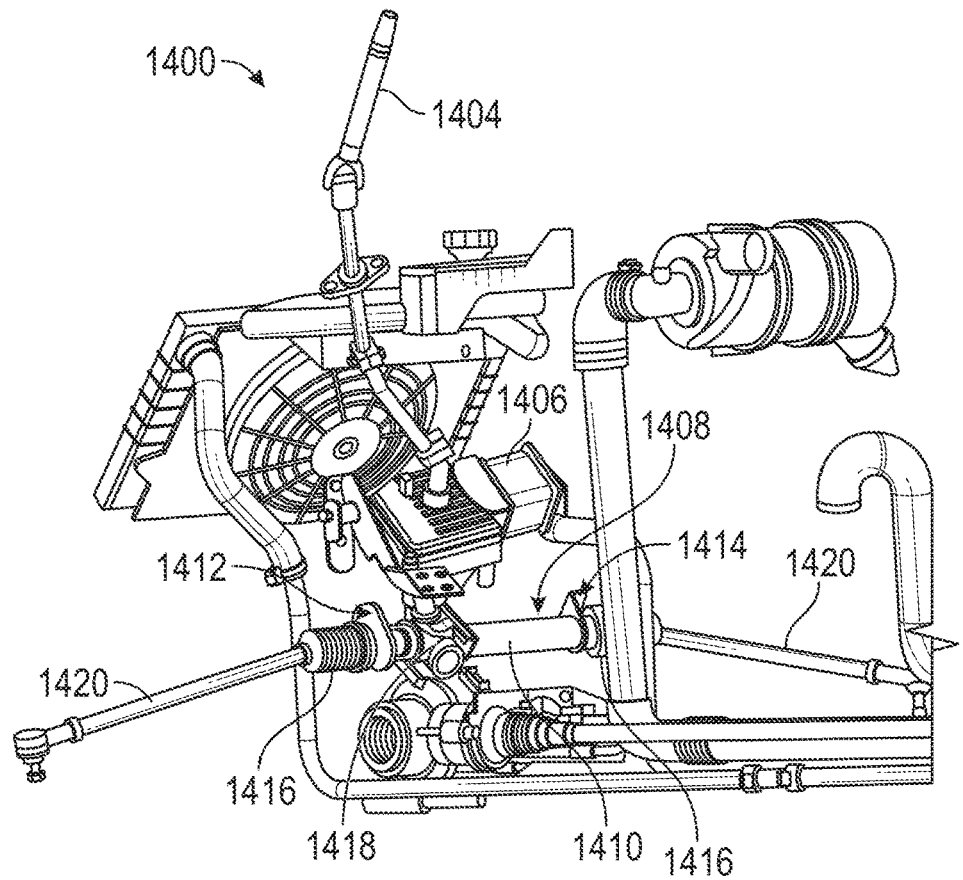
FIG. 65 is a detailed view of the steering system of FIG. 62, according to an exemplary embodiment.

As shown in FIGS. 62 and 65, the steering assembly 1400 includes a user input, shown as steering wheel 1402, that is coupled to a shaft, shown as steering shaft 1404. As shown in FIG. 65, the steering shaft 1404 extends from the steering wheel 1402 to an actuator, shown as power steering pump 1406. The power steering pump 1406 is coupled to a steering rack, shown as power steering rack 1408. The power steering rack 1408 includes a housing, shown as rack tube 1410, that has a first end, shown as left end 1412, and an opposing second end, shown as right end 1414. The rack tube 1410 is configured to receive and contain various components of the power steering rack 1408 such as a center rack, etc. As shown in FIG. 65, the steering assembly 1400 includes a pair of protective boots, shown as rack boots 1416, one coupled to each of the left end 1412 and the right end 1414 of the rack tube 1410. Extending from each of the rack boots 1416 is a rod, shown as tie rod 1420. The tie rods 1420 may be coupled to the center rack. According to an exemplary embodiment, the tie rods 1420 are configured to engage the wheel and tire assemblies 140 of the front axle 110 and facilitate the rotation thereof (e.g., to turn the vehicle 100, etc.).

As shown in FIG. 65, the power steering rack 1408 includes an input, shown as steering rack input 1418, that is coupled to the power steering pump 1406. The steering rack input 1418 may include an input (e.g., a pinion shaft, etc.) that is coupled to the center rack and actuated by the power steering pump 1406. Actuation of the steering rack input 1418 may cause the center rack to translate left or right, pulling and pushing, respectively, on the tie rods 1420 to turn the wheel and tire assemblies 140. Traditionally, an input of a steering rack is positioned at the extreme left (e.g., the left end 1412, in a left-hand drive vehicle, etc.) or extreme right (e.g., the right end 1414, in a right-hand drive vehicle, etc.) of the housing of a steering rack. According to the exemplary embodiment shown in FIG. 65, the steering rack input 1418 is spaced from the left end 1412 of the rack tube 1410 (e.g., not at the extreme left, not at the left end 1412, etc.) such that the steering rack input 1418 is positioned closer toward the central longitudinal axis 202 of the vehicle 100 relative to traditional vehicles.

Suspension System

As shown in FIG. 62, the suspension system 1600 includes a first suspension assembly, shown as front suspension assembly 1610, coupled to the front axle 110; a second suspension assembly, shown as first rear suspension assembly 1620, coupled to the first rear axle 120; and a third suspension assembly, shown as second rear suspension assembly 1630, coupled to the second rear axle 130. According to the exemplary embodiment shown in FIG. 62, each of the front suspension assembly 1610, the first rear suspension assembly 1620, and the second rear suspension assembly 1630 include a set of coilover spring-shocks, shown as coilovers 1640, one positioned at each end of the front axle 110, the first rear axle 120, and the second rear axle 130, respectively. According to an exemplary embodiment, each of the coilovers 1640 of the front suspension assembly 1610 extend from the frame 200 to an upper control arm coupled to a respective wheel and tire assemblies 140 of the front axle 110. According to an exemplary embodiment, each of the coilovers 1640 of the first rear suspension assembly 1620 and the second rear suspension assembly 1630 extend from the frame 200 to a lower control arm coupled to a respective wheel and tire assemblies 140 of the first rear axle 120 and the second rear axle 130.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle comprising:
a chassis;
a suspension system coupled to the chassis;
a front axle, a first rear axle, and a second rear axle coupled to the chassis by the suspension system;
a powertrain coupled to the chassis and at least one of the front axle, the first rear axle, and the second rear axle, the powertrain configured to drive the at least one of the front axle, the first rear axle, and the second rear axle;
an engine air intake;
an exhaust system;
a suction conduit that branches off of the exhaust system and connects to the engine air intake; and
a valve positioned to restrict a flow of exhaust gases into the suction conduit;
wherein the flow of exhaust gases through the exhaust system generates a vacuum across the valve, the vacuum providing suction within the engine air intake to facilitate pulling debris from the engine air intake into the suction conduit, through the valve, and into the flow of exhaust gases;
wherein the chassis, the suspension system, the front axle, the first rear axle, and the second rear axle provide a payload capacity rating of at least 1,750 pounds; and
wherein the vehicle has an overall width between 60 inches and 80 inches.

2. The vehicle of claim 1, wherein the overall width is greater than 65 inches.

3. The vehicle of claim 1, wherein the payload capacity is less than 4,000 pounds.

4. The vehicle of claim 1, further comprising a cab coupled to the chassis, the cab including a front section and a rear section.

5. The vehicle of claim 4, further comprising a roof assembly including a roof panel and a frame extending between the front section and the rear section, the frame supporting the roof panel, wherein a distal end of the roof panel extends over the rear section such that the roof panel at least partially overhangs the rear section without a support structure supporting the distal end thereof.

6. The vehicle of claim 4, further comprising (i) three bucket seats that extend across the front section of the cab or (ii) a bench seat that extends across the front section of the cab that accommodates up to three passengers.

7. The vehicle of claim 1, wherein the powertrain is configured to drive the front axle, the first rear axle, and the second rear axle, the powertrain including:
an engine;
a transmission having a transmission input coupled to the engine and a transmission output;
a transaxle having a transaxle input coupled to the transmission output, a first transaxle output coupled to the second rear axle, and a second transaxle output;
a rear differential having a rear differential input coupled to the second transaxle output, a first rear differential output coupled to the first rear axle, and a second rear differential output; and
a front differential having a front differential input coupled to the second rear differential output and a front differential output coupled to the front axle.

8. The vehicle of claim 1, further comprising:
a hood coupled to the chassis; and
a grille directly coupled to the hood.

9. The vehicle of claim 1, further comprising:
a hood coupled to the chassis; and
a cooling system positioned underneath the hood, the cooling system including:
a bracket coupled to the chassis proximate a front end of the hood and angled relative to a vertical axis; and
a radiator coupled to the bracket such that the radiator is angled relative to the vertical axis and positioned proximate the front end of the hood.

10. The vehicle of claim 1, further comprising a braking system including:
a first braking assembly associated with the first rear axle;
a second braking assembly associated with the second rear axle; and
a parking brake assembly including a parking brake lever coupled to at least one of the first braking assembly and the second braking assembly, wherein engagement of the parking brake lever actuates the at least one of the first braking assembly and the second braking assembly.

11. A vehicle comprising:
a chassis;
a suspension system coupled to the chassis;
a front axle, a first rear axle, and a second rear axle coupled to the chassis by the suspension system;

a powertrain coupled to the chassis and at least one of the front axle, the first rear axle, and the second rear axle, the powertrain configured to drive the at least one of the front axle, the first rear axle, and the second rear axle;
a cab coupled to the chassis, the cab including a front section and a rear section and
a rear module including:
   a cargo bed coupled to the chassis; and
   a seating assembly positioned forward of the cargo bed in the rear section of the cab, the seating assembly including:
      a pair of fixed side panels;
      a seat back coupled to the pair of fixed side panels; and
      a seat bottom coupled to the pair of fixed side panels;
wherein the seating assembly is selectively reconfigurable between (i) a seating configuration where the seat back is a headrest of the cargo bed and (ii) an extended bed configuration where the seat back forms a portion of the cargo bed and the seat bottom is the headrest of the cargo bed;
wherein the chassis, the suspension system, the front axle, the first rear axle, and the second rear axle provide a payload capacity rating of at least 1,750 pounds; and
wherein the vehicle has an overall width between 60 inches and 80 inches.

12. The vehicle of claim 11, wherein the seating assembly is selectively reconfigurable into an intermediate storage configuration where the seat bottom is oriented in an upright position, defining a cavity between the seat back and the seat bottom.

13. A vehicle comprising:
a chassis;
a suspension system coupled to the chassis;
a front axle, a first rear axle, and a second rear axle coupled to the chassis by the suspension system;
a powertrain coupled to the chassis and at least one of the front axle, the first rear axle, and the second rear axle, the powertrain configured to drive the at least one of the front axle, the first rear axle, and the second rear axle;
a cab coupled to the chassis, the cab including a front section and a rear section and
a rear module including:
   a first row of seats including a first plurality of seats facing a first direction; and
   a second row of seats including a second plurality of seats facing an opposing second direction;
wherein each of the first plurality of seats and the second plurality of seats is selectively reconfigurable between a sitting configuration and a litter configuration; and
wherein a first seat of the first plurality of seats and a second seat of the second plurality of seats aligned with the first seat are configured to cooperatively receive a litter when arranged in the litter configuration;
wherein the chassis, the suspension system, the front axle, the first rear axle, and the second rear axle provide a payload capacity rating of at least 1,750 pounds; and
wherein the vehicle has an overall width between 60 inches and 80 inches.

14. A vehicle comprising:
a chassis;
a suspension system coupled to the chassis;
a front axle, a first rear axle, and a second rear axle coupled to the chassis by the suspension system;
a powertrain coupled to the chassis and at least one of the front axle, the first rear axle, and the second rear axle, the powertrain configured to drive the at least one of the front axle, the first rear axle, and the second rear axle; and
a braking system including:
   a first braking assembly associated with the first rear axle;
   a second braking assembly associated with the second rear axle; and
   a parking brake assembly including a first parking brake lever coupled to the first braking assembly and a second parking brake lever coupled to the second braking assembly;
wherein engagement of the first parking brake lever actuates the first braking assembly and engagement of the second parking brake lever actuates the second braking assembly;
wherein the chassis, the suspension system, the front axle, the first rear axle, and the second rear axle provide a payload capacity rating of at least 1,750 pounds; and
wherein the vehicle has an overall width between 60 inches and 80 inches.

15. A vehicle comprising:
a chassis;
a front axle, a first rear axle, and a second rear axle coupled to the chassis;
a powertrain coupled to the chassis and configured to drive the front axle, the first rear axle, and the second rear axle, the powertrain including:
   an engine;
   a transmission having a transmission input coupled to the engine and a transmission output;
   a transaxle having a transaxle input coupled to the transmission output, a first transaxle output coupled to the second rear axle, and a second transaxle output;
   a rear differential having a rear differential input coupled to the second transaxle output, a first rear differential output coupled to the first rear axle, and a second rear differential output; and
   a front differential having a front differential input coupled to the second rear differential output and a front differential output coupled to the front axle;
an engine air intake coupled to the engine to provide clean air to the engine;
an exhaust system coupled to the engine to expel exhaust gases from the engine;
a suction conduit extending between the exhaust system and the engine air intake; and
a valve positioned to restrict a flow of the exhaust gases into the suction conduit;
wherein the flow of the exhaust gases through the exhaust system generates a vacuum across the valve, the vacuum providing suction within the engine air intake to facilitate pulling debris from the engine air intake into the suction conduit, through the valve, and into the flow of the exhaust gases.

* * * * *